(12) United States Patent
Kaneko et al.

(10) Patent No.: US 10,497,389 B2
(45) Date of Patent: *Dec. 3, 2019

(54) MAGNETIC TAPE AND MAGNETIC TAPE DEVICE

(71) Applicant: FUJIFILM Corporation, Tokyo (JP)

(72) Inventors: Tetsuya Kaneko, Minami-ashigara (JP); Norihito Kasada, Minami-ashigara (JP); Eiki Ozawa, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/100,289

(22) Filed: Aug. 10, 2018

(65) Prior Publication Data

US 2018/0350400 A1 Dec. 6, 2018

Related U.S. Application Data

(63) Continuation of application No. 15/615,871, filed on Jun. 7, 2017, now Pat. No. 10,074,393.

(30) Foreign Application Priority Data

Jun. 13, 2016 (JP) ................................. 2016-117339

(51) Int. Cl.
*G11B 5/78* (2006.01)
*G11B 5/706* (2006.01)
(Continued)

(52) U.S. Cl.
CPC .................. *G11B 5/78* (2013.01); *B22F 7/04* (2013.01); *G11B 5/584* (2013.01); *G11B 5/7023* (2013.01);
(Continued)

(58) Field of Classification Search
None
See application file for complete search history.

(56) References Cited

U.S. PATENT DOCUMENTS 3,966,686 A   6/1976 Asakura et al.
4,112,187 A   9/1978 Asakura et al.
(Continued)

FOREIGN PATENT DOCUMENTS

DE     101 46 429 A1   3/2002
GB        2495356 A    4/2013
(Continued)

OTHER PUBLICATIONS

Notice of Allowance dated Aug. 30, 2017, which issued during the prosecution of U.S. Appl. No. 15/466,143.
(Continued)

*Primary Examiner* — William J Klimowicz
(74) *Attorney, Agent, or Firm* — Sughrue Mion, PLLC

(57) ABSTRACT

The magnetic tape includes a magnetic layer having ferromagnetic powder and a binder on a non-magnetic support, in which the magnetic layer includes a timing-based servo pattern, the ferromagnetic powder is ferromagnetic hexagonal ferrite powder having an activation volume equal to or smaller than 1,600 nm$^3$, and an edge shape of the timing-based servo pattern specified by a magnetic force microscope observation is a shape in which a difference ($l_{99.9}-l_{0.1}$) between a value $l_{99.9}$ of a cumulative frequency function of 99.9% of a position deviation width from an ideal shape in a longitudinal direction of the magnetic tape and a value $l_{0.1}$ of the cumulative frequency function of 0.1% thereof is equal to or smaller than 180 nm.

17 Claims, 5 Drawing Sheets

(51) Int. Cl.
*G11B 5/714* (2006.01)
*G11B 5/584* (2006.01)
*G11B 5/702* (2006.01)
*H01F 1/11* (2006.01)
*B22F 7/04* (2006.01)

(52) U.S. Cl.
CPC ...... *G11B 5/70615* (2013.01); *G11B 5/70678* (2013.01); *G11B 5/714* (2013.01); *H01F 1/11* (2013.01); *B22F 2007/047* (2013.01); *B22F 2999/00* (2013.01); *C22C 2200/02* (2013.01)

(56) References Cited

U.S. PATENT DOCUMENTS

| | | | |
|---|---|---|---|
| 4,425,404 A | 1/1984 | Suzuki et al. | |
| 4,693,930 A | 9/1987 | Kuo et al. | |
| 4,746,569 A | 5/1988 | Takahashi et al. | |
| 4,825,317 A | 4/1989 | Rausch | |
| 5,242,752 A | 9/1993 | Isobe et al. | |
| 5,419,938 A | 5/1995 | Kagotani et al. | |
| 5,445,881 A | 9/1995 | Irie | |
| 5,474,814 A | 12/1995 | Komatsu et al. | |
| 5,496,607 A | 3/1996 | Inaba et al. | |
| 5,540,957 A | 7/1996 | Ueda et al. | |
| 5,585,032 A | 12/1996 | Nakata et al. | |
| 5,645,917 A | 7/1997 | Ejiri et al. | |
| 5,689,384 A | 11/1997 | Albrecht et al. | |
| 5,728,454 A | 3/1998 | Inaba et al. | |
| 5,786,074 A | 6/1998 | Soui | |
| 6,099,957 A | 8/2000 | Yamamoto et al. | |
| 6,183,606 B1 | 2/2001 | Kuo et al. | |
| 6,207,252 B1 | 3/2001 | Shimomura | |
| 6,228,461 B1 | 5/2001 | Sueki et al. | |
| 6,254,964 B1 | 7/2001 | Saito et al. | |
| 6,261,647 B1 | 7/2001 | Komatsu et al. | |
| 6,268,043 B1 | 7/2001 | Koizumi et al. | |
| 6,496,328 B1 | 12/2002 | Dugas | |
| 6,579,826 B2 | 6/2003 | Furuya et al. | |
| 6,649,256 B1 | 11/2003 | Buczek et al. | |
| 6,686,022 B2 | 2/2004 | Takano et al. | |
| 6,770,359 B2 | 8/2004 | Masaki | |
| 6,791,803 B2 | 9/2004 | Saito et al. | |
| 6,835,461 B1 | 12/2004 | Yamagata et al. | |
| 6,921,592 B2 | 7/2005 | Tani et al. | |
| 6,939,606 B2 | 9/2005 | Hashimoto et al. | |
| 6,950,269 B1 * | 9/2005 | Johnson | G11B 5/584 |
| | | | 360/31 |
| 6,994,925 B2 | 2/2006 | Masaki | |
| 7,014,927 B2 | 3/2006 | Sueki et al. | |
| 7,029,726 B1 | 4/2006 | Chen et al. | |
| 7,153,366 B1 | 12/2006 | Chen et al. | |
| 7,255,908 B2 | 8/2007 | Ishikawa et al. | |
| 7,511,907 B2 | 3/2009 | Dugas et al. | |
| 7,515,383 B2 | 4/2009 | Saito et al. | |
| 7,803,471 B1 | 9/2010 | Ota et al. | |
| 7,839,599 B2 * | 11/2010 | Bui | G11B 5/584 |
| | | | 360/75 |
| 8,000,057 B2 * | 8/2011 | Bui | G11B 5/584 |
| | | | 360/75 |
| 8,524,108 B2 | 9/2013 | Hattori | |
| 8,535,817 B2 | 9/2013 | Imaoka | |
| 8,576,510 B2 | 11/2013 | Cherubini et al. | |
| 8,681,451 B2 | 3/2014 | Harasawa et al. | |
| 9,105,294 B2 | 8/2015 | Jensen et al. | |
| 9,311,946 B2 | 4/2016 | Tanaka et al. | |
| 9,495,985 B2 | 10/2016 | Xia et al. | |
| 9,530,444 B2 | 12/2016 | Kasada | |
| 9,542,967 B2 | 1/2017 | Sekiguchi et al. | |
| 9,564,161 B1 * | 2/2017 | Cherubini | G11B 5/588 |
| 9,601,146 B2 | 3/2017 | Kasada et al. | |
| 9,704,425 B2 | 7/2017 | Zhang et al. | |
| 9,704,525 B2 | 7/2017 | Kasada | |
| 9,704,527 B2 | 7/2017 | Kasada | |
| 9,711,174 B2 | 7/2017 | Kasada et al. | |
| 9,721,605 B2 | 8/2017 | Oyanagi et al. | |
| 9,721,606 B2 | 8/2017 | Kasada | |
| 9,721,607 B2 | 8/2017 | Tada et al. | |
| 9,748,026 B2 | 8/2017 | Shirata | |
| 9,773,519 B2 | 9/2017 | Kasada et al. | |
| 9,779,772 B1 | 10/2017 | Kasada et al. | |
| 9,837,104 B1 | 12/2017 | Biskeborn | |
| 9,837,116 B2 | 12/2017 | Ozawa et al. | |
| 9,959,894 B2 | 5/2018 | Omura | |
| 9,972,351 B1 | 5/2018 | Kaneko et al. | |
| 9,978,414 B1 | 5/2018 | Kaneko et al. | |
| 9,984,710 B2 | 5/2018 | Kasada | |
| 9,984,712 B1 | 5/2018 | Ozawa | |
| 9,984,716 B1 | 5/2018 | Kaneko et al. | |
| 10,008,230 B1 | 6/2018 | Ozawa et al. | |
| 10,026,430 B2 | 7/2018 | Kasada et al. | |
| 10,026,433 B2 | 7/2018 | Kasada et al. | |
| 10,026,434 B2 | 7/2018 | Oyanagi et al. | |
| 10,026,435 B2 | 7/2018 | Kasada et al. | |
| 10,062,403 B1 | 8/2018 | Kasada et al. | |
| 10,074,393 B2 * | 9/2018 | Kaneko | G11B 5/70615 |
| 10,134,433 B2 | 11/2018 | Kasada et al. | |
| 2001/0038928 A1 | 11/2001 | Nakamigawa et al. | |
| 2001/0053458 A1 | 12/2001 | Suzuki et al. | |
| 2002/0072472 A1 | 7/2002 | Furuya et al. | |
| 2002/0122339 A1 | 9/2002 | Takano et al. | |
| 2003/0059649 A1 | 3/2003 | Saliba et al. | |
| 2003/0091866 A1 | 5/2003 | Ejiri et al. | |
| 2003/0124386 A1 | 7/2003 | Masaki | |
| 2003/0170498 A1 | 9/2003 | Inoue | |
| 2003/0228493 A1 | 12/2003 | Doushita et al. | |
| 2004/0018388 A1 | 1/2004 | Kitamura et al. | |
| 2004/0053074 A1 | 3/2004 | Jingu et al. | |
| 2004/0072025 A1 | 4/2004 | Kishimoto et al. | |
| 2004/0197605 A1 | 10/2004 | Seki et al. | |
| 2004/0213948 A1 | 10/2004 | Saito et al. | |
| 2004/0218304 A1 * | 11/2004 | Goker | G11B 5/584 |
| | | | 360/77.12 |
| 2004/0265643 A1 | 12/2004 | Ejiri | |
| 2005/0057838 A1 | 3/2005 | Ohtsu | |
| 2005/0153170 A1 | 7/2005 | Inoue et al. | |
| 2005/0196645 A1 | 9/2005 | Doi et al. | |
| 2005/0260456 A1 | 11/2005 | Hanai et al. | |
| 2005/0260459 A1 | 11/2005 | Hanai et al. | |
| 2005/0264935 A1 | 12/2005 | Sueki et al. | |
| 2006/0008681 A1 | 1/2006 | Hashimoto et al. | |
| 2006/0035114 A1 | 2/2006 | Kuse et al. | |
| 2006/0056095 A1 | 3/2006 | Saitou | |
| 2006/0068232 A1 | 3/2006 | Mikamo et al. | |
| 2006/0187589 A1 | 8/2006 | Harasawa et al. | |
| 2006/0232883 A1 | 10/2006 | Biskeborn et al. | |
| 2007/0009769 A1 | 1/2007 | Kanazawa | |
| 2007/0020489 A1 | 1/2007 | Yamazaki et al. | |
| 2007/0020490 A1 | 1/2007 | Harasawa et al. | |
| 2007/0224456 A1 | 9/2007 | Murao et al. | |
| 2007/0230054 A1 | 10/2007 | Takeda et al. | |
| 2007/0231606 A1 | 10/2007 | Hanai | |
| 2008/0057351 A1 | 3/2008 | Meguro et al. | |
| 2008/0144211 A1 | 6/2008 | Weber et al. | |
| 2008/0152956 A1 | 6/2008 | Murayama et al. | |
| 2008/0174897 A1 | 7/2008 | Bates et al. | |
| 2008/0297950 A1 | 12/2008 | Noguchi et al. | |
| 2008/0311308 A1 | 12/2008 | Lee et al. | |
| 2009/0027812 A1 | 1/2009 | Noguchi et al. | |
| 2009/0087689 A1 | 4/2009 | Doushita et al. | |
| 2009/0161249 A1 | 6/2009 | Takayama et al. | |
| 2009/0162701 A1 | 6/2009 | Jensen et al. | |
| 2010/0000966 A1 | 1/2010 | Kamata et al. | |
| 2010/0035086 A1 | 2/2010 | Inoue et al. | |
| 2010/0035088 A1 | 2/2010 | Inoue | |
| 2010/0053810 A1 | 3/2010 | Biskeborn et al. | |
| 2010/0073816 A1 | 3/2010 | Komori et al. | |
| 2010/0081011 A1 | 4/2010 | Nakamura | |
| 2010/0134929 A1 | 6/2010 | Ito | |
| 2010/0227201 A1 | 9/2010 | Sasaki et al. | |
| 2010/0246073 A1 | 9/2010 | Katayama | |
| 2011/0003241 A1 | 1/2011 | Kaneko et al. | |
| 2011/0051280 A1 | 3/2011 | Karp et al. | |
| 2011/0052908 A1 | 3/2011 | Imaoka | |

(56) References Cited

U.S. PATENT DOCUMENTS

| | | |
|---|---|---|
| 2011/0077902 A1 | 3/2011 | Awezec et al. |
| 2011/0151281 A1 | 6/2011 | Inoue |
| 2011/0244272 A1 | 10/2011 | Suzuki et al. |
| 2012/0045664 A1 | 2/2012 | Tanaka et al. |
| 2012/0152891 A1 | 6/2012 | Brown et al. |
| 2012/0177951 A1 | 7/2012 | Yamazaki et al. |
| 2012/0183811 A1 | 7/2012 | Hattori et al. |
| 2012/0196156 A1 | 8/2012 | Suzuki |
| 2012/0243120 A1 | 9/2012 | Harasawa et al. |
| 2012/0244387 A1 | 9/2012 | Mori et al. |
| 2012/0251845 A1 | 10/2012 | Wang et al. |
| 2013/0029183 A1 | 1/2013 | Omura |
| 2013/0084470 A1 | 4/2013 | Hattori et al. |
| 2013/0088794 A1 | 4/2013 | Cherubini et al. |
| 2013/0256584 A1 | 10/2013 | Yamazaki et al. |
| 2013/0260179 A1 | 10/2013 | Kasada et al. |
| 2013/0279040 A1 | 10/2013 | Cideciyan et al. |
| 2013/0286510 A1 | 10/2013 | Rothermel et al. |
| 2014/0011055 A1 | 1/2014 | Suzuki et al. |
| 2014/0130067 A1 | 5/2014 | Madison et al. |
| 2014/0139944 A1 | 5/2014 | Johnson et al. |
| 2014/0272474 A1 | 9/2014 | Kasada |
| 2014/0295214 A1 | 10/2014 | Tada et al. |
| 2014/0342189 A1 | 11/2014 | Tachibana et al. |
| 2014/0366990 A1 | 12/2014 | Lai et al. |
| 2015/0043101 A1 | 2/2015 | Biskeborn et al. |
| 2015/0098149 A1 | 4/2015 | Bates et al. |
| 2015/0111066 A1 | 4/2015 | Terakawa et al. |
| 2015/0123026 A1 | 5/2015 | Masada et al. |
| 2015/0302879 A1 | 10/2015 | Holmberg et al. |
| 2015/0380036 A1 | 12/2015 | Kasada et al. |
| 2016/0061447 A1 | 3/2016 | Kobayashi |
| 2016/0064025 A1 | 3/2016 | Kurokawa et al. |
| 2016/0092315 A1 | 3/2016 | Ashida et al. |
| 2016/0093321 A1 | 3/2016 | Aoshima et al. |
| 2016/0093322 A1 | 3/2016 | Kasada et al. |
| 2016/0093323 A1 | 3/2016 | Omura |
| 2016/0180875 A1 | 6/2016 | Tanaka et al. |
| 2016/0189739 A1 | 6/2016 | Kasada et al. |
| 2016/0189740 A1 | 6/2016 | Oyanagi et al. |
| 2016/0247530 A1 | 8/2016 | Kasada |
| 2016/0260449 A1 | 9/2016 | Ahmad et al. |
| 2016/0276076 A1 | 9/2016 | Kasada |
| 2017/0032812 A1 | 2/2017 | Kasada |
| 2017/0053669 A1 | 2/2017 | Kasada |
| 2017/0053670 A1 | 2/2017 | Oyanagi et al. |
| 2017/0053671 A1 | 2/2017 | Kasada et al. |
| 2017/0058227 A1 | 3/2017 | Kondo et al. |
| 2017/0092315 A1 | 3/2017 | Ozawa et al. |
| 2017/0130156 A1 | 5/2017 | Kondo et al. |
| 2017/0178675 A1 | 6/2017 | Kasada |
| 2017/0178676 A1 | 6/2017 | Kasada |
| 2017/0178677 A1 | 6/2017 | Kasada |
| 2017/0186456 A1 | 6/2017 | Tada et al. |
| 2017/0186460 A1 | 7/2017 | Kasada et al. |
| 2017/0221513 A1 | 8/2017 | Hiroi et al. |
| 2017/0221516 A1 | 8/2017 | Oyanagi et al. |
| 2017/0221517 A1 | 8/2017 | Ozawa et al. |
| 2017/0249963 A1 | 8/2017 | Oyanagi et al. |
| 2017/0249964 A1 | 8/2017 | Kasada et al. |
| 2017/0249965 A1 | 8/2017 | Kurokawa et al. |
| 2017/0249966 A1 | 8/2017 | Tachibana et al. |
| 2017/0287517 A1 | 10/2017 | Hosoya et al. |
| 2017/0355022 A1 | 12/2017 | Kaneko et al. |
| 2017/0358318 A1 | 12/2017 | Kasada et al. |
| 2017/0372726 A1 | 12/2017 | Kasada et al. |
| 2017/0372727 A1 | 12/2017 | Kasada et al. |
| 2017/0372736 A1 | 12/2017 | Kaneko et al. |
| 2017/0372737 A1 | 12/2017 | Oyanagi et al. |
| 2017/0372738 A1 | 12/2017 | Kasada |
| 2017/0372739 A1 | 12/2017 | Ozawa et al. |
| 2017/0372740 A1 | 12/2017 | Ozawa et al. |
| 2017/0372741 A1 | 12/2017 | Kurokawa et al. |
| 2017/0372742 A1 | 12/2017 | Kaneko et al. |
| 2017/0372743 A1 | 12/2017 | Kasada et al. |
| 2017/0372744 A1 | 12/2017 | Ozawa et al. |
| 2018/0061446 A1 | 3/2018 | Kasada |
| 2018/0061447 A1 | 3/2018 | Kasada |
| 2018/0082710 A1 | 3/2018 | Tada et al. |
| 2018/0137887 A1 | 5/2018 | Sekiguchi et al. |
| 2018/0182417 A1 | 6/2018 | Kaneko et al. |
| 2018/0182422 A1 | 6/2018 | Kawakami et al. |
| 2018/0182425 A1 | 6/2018 | Kasada et al. |
| 2018/0182426 A1 | 6/2018 | Ozawa et al. |
| 2018/0182427 A1 | 6/2018 | Kasada et al. |
| 2018/0182428 A1 | 6/2018 | Kasada et al. |
| 2018/0182429 A1 | 6/2018 | Kasada et al. |
| 2018/0182430 A1 | 6/2018 | Ozawa et al. |
| 2018/0240475 A1 | 8/2018 | Kasada |
| 2018/0240476 A1 | 8/2018 | Kasada et al. |
| 2018/0240478 A1 | 8/2018 | Kasada et al. |
| 2018/0240479 A1 | 8/2018 | Kasada et al. |
| 2018/0240481 A1 | 8/2018 | Kasada et al. |
| 2018/0240488 A1 | 8/2018 | Kasada |
| 2018/0240489 A1 | 8/2018 | Kasada et al. |
| 2018/0240490 A1 | 8/2018 | Kurokawa et al. |
| 2018/0240491 A1 | 8/2018 | Ozawa et al. |
| 2018/0240492 A1 | 8/2018 | Kasada |
| 2018/0240493 A1 | 8/2018 | Tada et al. |
| 2018/0240494 A1 | 8/2018 | Kurokawa et al. |
| 2018/0240495 A1 | 8/2018 | Kasada |
| 2018/0286439 A1 | 10/2018 | Ozawa et al. |
| 2018/0286442 A1 | 10/2018 | Ozawa et al. |
| 2018/0286443 A1 | 10/2018 | Ozawa et al. |
| 2018/0286444 A1 | 10/2018 | Kasada et al. |
| 2018/0286446 A1 | 10/2018 | Ozawa et al. |
| 2018/0286447 A1 | 10/2018 | Ozawa et al. |
| 2018/0286448 A1 | 10/2018 | Ozawa et al. |
| 2018/0286449 A1 | 10/2018 | Kasada et al. |
| 2018/0286450 A1 | 10/2018 | Kasada et al. |
| 2018/0286451 A1 | 10/2018 | Ozawa et al. |
| 2018/0286452 A1 | 10/2018 | Ozawa et al. |
| 2018/0286453 A1 | 10/2018 | Kasada et al. |
| 2018/0301165 A1 | 10/2018 | Oyanagi et al. |
| 2018/0350398 A1 | 12/2018 | Kawakami et al. |
| 2018/0358042 A1 | 12/2018 | Kasada et al. |
| 2018/0374507 A1 | 12/2018 | Kasada |
| 2019/0027167 A1 | 1/2019 | Tada et al. |
| 2019/0027168 A1 | 1/2019 | Kasada et al. |
| 2019/0027171 A1 | 1/2019 | Kasada |
| 2019/0027172 A1 | 1/2019 | Kasada |
| 2019/0027174 A1 | 1/2019 | Tada et al. |
| 2019/0027175 A1 | 1/2019 | Kurokawa et al. |
| 2019/0027176 A1 | 1/2019 | Kurokawa et al. |
| 2019/0027177 A1 | 1/2019 | Kasada |
| 2019/0027178 A1 | 1/2019 | Kasada |
| 2019/0027179 A1 | 1/2019 | Ozawa et al. |
| 2019/0027180 A1 | 1/2019 | Kasada et al. |
| 2019/0027181 A1 | 1/2019 | Ozawa et al. |
| 2019/0035424 A1 | 1/2019 | Endo |
| 2019/0051325 A1 | 2/2019 | Kasada et al. |
| 2019/0088278 A1 | 3/2019 | Kasada et al. |
| 2019/0096437 A1 | 3/2019 | Ozawa et al. |
| 2019/0103130 A1 | 4/2019 | Kasada et al. |
| 2019/0103131 A1 | 4/2019 | Kasada et al. |
| 2019/0103133 A1 | 4/2019 | Ozawa et al. |
| 2019/0103134 A1 | 4/2019 | Kasada et al. |
| 2019/0103135 A1 | 4/2019 | Ozawa et al. |
| 2019/0130936 A1 | 5/2019 | Kaneko et al. |
| 2019/0295590 A1 | 9/2019 | Kaneko et al. |

FOREIGN PATENT DOCUMENTS

| | | |
|---|---|---|
| JP | 61-11924 A | 1/1986 |
| JP | 61-139923 A | 6/1986 |
| JP | 61-139932 A | 6/1986 |
| JP | 63-129519 A | 6/1988 |
| JP | 63-249932 A | 10/1988 |
| JP | 64-57422 A | 3/1989 |
| JP | 64-60819 A | 3/1989 |
| JP | 5-258283 A | 10/1993 |
| JP | 5-298653 A | 11/1993 |
| JP | 7-57242 A | 3/1995 |
| JP | 11-110743 A | 4/1999 |

(56) References Cited

FOREIGN PATENT DOCUMENTS

| | | |
|---|---|---|
| JP | 11-175949 A | 7/1999 |
| JP | 11-273051 A | 10/1999 |
| JP | 2000-251240 A | 9/2000 |
| JP | 2002-157726 A | 5/2002 |
| JP | 2002-329605 A | 11/2002 |
| JP | 2002-367142 A | 12/2002 |
| JP | 2002-367318 A | 12/2002 |
| JP | 2003-77116 A | 3/2003 |
| JP | 2003-323710 A | 11/2003 |
| JP | 2004-005820 A | 1/2004 |
| JP | 2004-114492 A | 4/2004 |
| JP | 2004-133997 A | 4/2004 |
| JP | 2004-185676 A | 7/2004 |
| JP | 2005-038579 A | 2/2005 |
| JP | 2005-092967 A | 4/2005 |
| JP | 2005-243063 A | 9/2005 |
| JP | 2005-243162 A | 9/2005 |
| JP | 2006-92672 A | 4/2006 |
| JP | 2006-286114 A | 10/2006 |
| JP | 2007-265555 A | 10/2007 |
| JP | 2007-273039 A | 10/2007 |
| JP | 2007-287310 A | 11/2007 |
| JP | 2007-297427 A | 11/2007 |
| JP | 2008-047276 A | 2/2008 |
| JP | 2008-243317 A | 10/2008 |
| JP | 2009-283082 A | 12/2009 |
| JP | 2010-036350 A | 2/2010 |
| JP | 2010-49731 A | 3/2010 |
| JP | 2011-48878 A | 3/2011 |
| JP | 2011-138566 A | 7/2011 |
| JP | 2011-210288 A | 10/2011 |
| JP | 2011-225417 A | 11/2011 |
| JP | 2012-38367 A | 2/2012 |
| JP | 2012-43495 A | 3/2012 |
| JP | 2012-203955 A | 10/2012 |
| JP | 2013-25853 A | 2/2013 |
| JP | 2013-77360 A | 4/2013 |
| JP | 2013-164889 A | 8/2013 |
| JP | 2014-15453 A | 1/2014 |
| JP | 2014-179149 A | 9/2014 |
| JP | 2015-39801 A | 3/2015 |
| JP | 2015-111484 A | 6/2015 |
| JP | 2016-15183 A | 1/2016 |
| JP | 2016-502224 A | 1/2016 |
| JP | 2016-051493 A | 4/2016 |
| JP | 2016-71926 A | 5/2016 |
| JP | 2016-139451 A | 8/2016 |

OTHER PUBLICATIONS

Office Action dated May 2, 2018, which issued during the prosecution of U.S. Appl. No. 15/280,195.
Office Action dated May 4, 2018, which issued during the prosecution of U.S. Appl. No. 15/422,944.
Office Action dated May 4, 2018, which issued during the prosecution of U.S. Appl. No. 15/625,428.
Office Action dated May 7, 2018, which issued during the prosecution of U.S. Appl. No. 15/624,792.
Office Action dated May 7, 2018, which issued during the prosecution of U.S. Appl. No. 15/624,897.
Office Action dated May 7, 2018, which issued during the prosecution of U.S. Appl. No. 15/626,832.
Notice of Allowance dated Apr. 27, 2017, which issued during the prosecution of U.S. Appl. No. 15/052,115.
Office Action dated Apr. 26, 2017 which issued during the prosecution of U.S. Appl. No. 15/388,864.
Office Action dated Aug. 10, 2017, which issued during the prosecution of U.S. Appl. No. 14/870,618.
Office Action dated Aug. 3, 2018 which issued during the prosecution of U.S. Appl. No. 15/388,911.
Office Action dated Feb. 4, 2016 which issued during the prosecution of U.S. Appl. No. 14/753,227.
Office Action dated Jun. 7, 2018 which issued during the prosecution of U.S. Appl. No. 15/380,309.
Office Action dated Nov. 16, 2016 which issued during the prosecution of U.S. Appl. No. 15/072,550.
Office Action dated Oct. 12, 2018, which issued during the prosecution of U.S. Appl. No. 15/626,355.
Office Action dated Oct. 12, 2018, which issued during the prosecution of U.S. Appl. No. 15/627,696.
Office Action dated Oct. 15, 2018, which issued during the prosecution of U.S. Appl. No. 15/619,012.
Office Action dated Oct. 22, 2018, which issued during the prosecution of U.S. Appl. No. 15/854,439.
Office Action dated Oct. 9, 2018, which issued during the prosecution of U.S. Appl. No. 15/628,814.
Office Action dated Sep. 24, 2018, which issued during the prosecution of U.S. Appl. No. 15/690,400.
Office Action dated Sep. 27, 2018, which issued during the prosecution of U.S. Appl. No. 15/690,906.
Office Action dated Sep. 27, 2018, which issued during the prosecution of U.S. Appl. No. 15/854,383.
Communication dated Aug. 23, 2018 from the United States Patent and Trademark Office in counterpart U.S. Appl. No. 15/614,876.
Communication dated Aug. 23, 2018 from the United States Patent and Trademark Office in counterpart U.S. Appl. No. 15/621,464.
Communication dated Aug. 23, 2018 from the United States Patent and Trademark Office in counterpart U.S. Appl. No. 15/626,720.
Communication dated Aug. 24, 2018 from the United States Patent and Trademark Office in counterpart U.S. Appl. No. 15/620,916.
Communication dated Aug. 3, 2018 from the United States Patent and Trademark Office in U.S. Appl. No. 15/380,336.
Communication dated Dec. 5, 2016 from the United States Patent and Trademark Office in U.S. Appl. No. 14/978,834.
Communication dated Dec. 6, 2016 from the United States Patent and Trademark Office in U.S. Appl. No. 14/757,555.
Communication dated Jun. 9, 2017 which issued during the prosecution of U.S. Appl. No. 15/388,864.
Communication dated May 30, 2018 which issued during the prosecution of U.S. Appl. No. 15/388,911.
Communication dated Nov. 18, 2016 which issued during the prosecution of U.S. Appl. No. 14/753,227.
Final Office Action dated Aug. 15, 2016 which issued during the prosecution of U.S. Appl. No. 14/753,227.
Notice of Allowance dated Apr. 25, 2017, which issued during the prosecution of U.S. Appl. No. 15/072,550.
Notice of Allowance dated Apr. 5, 2018, which issued during the prosecution of U.S. Appl. No. 14/867,752.
Notice of Allowance dated Aug. 6, 2018, which issued during the prosecution of U.S. Appl. No. 15/920,768.
Notice of Allowance dated Aug. 9, 2018, which issued during the prosecution of U.S. Appl. No. 15/920,563.
Notice of Allowance dated Dec. 2, 2016 which issued during the prosecution of U.S. Appl. No. 14/753,227.
Notice of Allowance dated Dec. 3, 2018, which issued during the prosecution of U.S. Appl. No. 15/920,518.
Notice of Allowance dated Dec. 4, 2018, which issued during the prosecution of U.S. Appl. No. 15/625,428.
Notice of Allowance dated Feb. 14, 2018, which issued during the prosecution of U.S. Appl. No. 14/870,618.
Notice of Allowance dated Jul. 12, 2017 which issued during the prosecution of U.S. Appl. No. 15/388,864.
Notice of Allowance dated Jul. 13, 2018, which issued during the prosecution of U.S. Appl. No. 15/920,782.
Notice of Allowance dated Jun. 28, 2017, which issued during the prosecution of U.S. Appl. No. 15/464,991.
Notice of Allowance dated Mar. 14, 2018, which issued during the prosecution of U.S. Appl. No. 15/854,474.
Notice of Allowance dated Mar. 16, 2018 which issued during the prosecution of U.S. Appl. No. 15/854,410.
Notice of Allowance dated Mar. 19, 2018, which issued during the prosecution of U.S. Appl. No. 15/378,907.
Notice of Allowance dated Mar. 21, 2018, which issued during the prosecution of U.S. Appl. No. 15/241,286.

(56) References Cited

OTHER PUBLICATIONS

Notice of Allowance dated Mar. 21, 2018, which issued during the prosecution of U.S. Appl. No. 15/241,297.
Notice of Allowance dated Mar. 27, 2018, which issued during the prosecution of U.S. Appl. No. 15/241,631.
Notice of Allowance dated May 10, 2018 which issued during the prosecution of U.S. Appl. No. 15/615,871.
Notice of Allowance dated May 8, 2017, which issued during the prosecution of U.S. Appl. No. 14/757,555.
Notice of Allowance dated May 8, 2017, which issued during the prosecution of U.S. Appl. No. 14/978,834.
Notice of Allowance dated Oct. 11, 2018, which issued during the prosecution of U.S. Appl. No. 15/380,336.
Notice of Allowance dated Oct. 11, 2018, which issued during the prosecution of U.S. Appl. No. 15/422,944.
Notice of Allowance dated Oct. 11, 2018, which issued during the prosecution of U.S. Appl. No. 15/624,792.
Notice of Allowance dated Oct. 11, 2018, which issued during the prosecution of U.S. Appl. No. 15/624,897.
Notice of Allowance dated Oct. 12, 2018, which issued during the prosecution of U.S. Appl. No. 15/626,832.
Notice of Allowance dated Oct. 6, 2016, which issued during the prosecution of U.S. Appl. No. 14/209,065.
Notice of Allowance dated Sep. 24, 2018, which issued during the prosecution of U.S. Appl. No. 15/854,438.
Notice of Allowance dated Sep. 4, 2018, which issued during the prosecution of U.S. Appl. No. 15/625,428.
Office Action dated Apr. 19, 2018, which issued during the prosecution of U.S. Appl. No. 15/854,438.
Office Action dated Dec. 14, 2018, which issued during the prosecution of U.S. Appl. No. 15/920,517.
Office Action dated Dec. 17, 2018, which issued during the prosecution of U.S. Appl. No. 15/920,515.
Office Action dated Dec. 17, 2018, which issued during the prosecution of U.S. Appl. No. 15/920,533.
Office Action dated Dec. 17, 2018, which issued during the prosecution of U.S. Appl. No. 15/920,538.
Notice of Allowance dated Jun. 2, 2017, which issued during the prosecution of U.S. Appl. No. 15/218,190.
Office Action dated Dec. 17, 2018, which issued during the prosecution of U.S. Appl. No. 15/920,544.
Office Action dated Dec. 20, 2018, which issued during the prosecution of U.S. Appl. No. 15/900,164.
Office Action dated Dec. 21, 2018, which issued during the prosecution of U.S. Appl. No. 15/900,230.
Office Action dated Feb. 25, 2016, which issued during the prosecution of U.S. Appl. No. 14/867,752.
Office Action dated Jan. 27, 2015 from the Japanese Patent Office in Japanese Application No. 2013-053543.
Office Action dated Jan. 31, 2018, which issued during the prosecution of U.S. Appl. No. 14/867,752.
Office Action dated Jul. 3, 2018, which issued during the prosecution of U.S. Appl. No. 15/920,518.
Office Action dated Jul. 6, 2015, which issued during the prosecution of U.S. Appl. No. 14/209,065.
Office Action dated Jul. 6, 2018 from the United States Patent and Trademark Office in U.S. Appl. No. 15/848,173.
Office Action dated Mar. 13, 2015, which issued during the prosecution of U.S. Appl. No. 14/209,065.
Office Action dated Mar. 16, 2017, which issued during the prosecution of U.S. Appl. No. 14/867,752.
Office Action dated Mar. 24, 2016, which issued during the prosecution of U.S. Appl. No. 14/209,065.
Office Action dated Nov. 28, 2018, which issued during the prosecution of U.S. Appl. No. 15/899,587.
Office Action dated Nov. 28, 2018, which issued during the prosecution of U.S. Appl. No. 15/900,080.
Office Action dated Nov. 28, 2018, which issued during the prosecution of U.S. Appl. No. 15/900,144.
Office Action dated Nov. 29, 2018, which issued during the prosecution of U.S. Appl. No. 15/380,309.
Office Action dated Nov. 8, 2016 from the Japanese Patent Office in Japanese Application No. 2014-199022.
Office Action dated Oct. 15, 2018, which issued during the prosecution of U.S. Appl. No. 15/854,403.
Office Action dated Oct. 19, 2016, which issued during the prosecution of U.S. Appl. No. 14/867,752.
Office Action dated Oct. 3, 2018 from the United States Patent and Trademark Office in U.S. Appl. No. 15/280,195.
Office Action dated Oct. 5, 2017, which issued during the prosecution of U.S. Appl. No. 15/241,286.
Office Action dated Oct. 5, 2017, which issued during the prosecution of U.S. Appl. No. 15/241,297.
Office Action dated Oct. 5, 2017, which issued during the prosecution of U.S. Appl. No. 15/241,631.
Office Action dated Oct. 5, 2017, which issued during the prosecution of U.S. Appl. No. 15/378,907.
Office Action dated Sep. 10, 2015, which issued during the prosecution of U.S. Appl. No. 14/209,065.
Office Action dated Sep. 19, 2014, which issued during the prosecution of U.S. Appl. No. 14/209,065.
Office Action dated Sep. 26, 2017 issued by the Japanese Patent Office in JP Appln. No. 2014-265723.
Office Action dated Sep. 26, 2017 issued by the Japanese Patent Office in JP Appln. No. 2015-249264.
Office Action dated Sep. 28, 2018, which issued during the prosecution of U.S. Appl. No. 15/854,409.
Office Action dated Sep. 7, 2017, which issued during the prosecution of U.S. Appl. No. 14/867,752.
Office Action dated Dec. 20, 2018 in U.S. Appl. No. 15/900,106.
Office Action dated Dec. 25, 2018 in Japanese Application No. 2015-245144.
Office Action dated Dec. 25, 2018 in Japanese Application No. 2015-245145.
Office Action dated Dec. 25, 2018 in Japanese Application No. 2015-254192.
Office Action dated Dec. 31, 2018 in U.S. Appl. No. 16/009,603.
Office Action dated Feb. 5, 2019 in Japanese Application No. 2016-117339.
Office Action dated Feb. 5, 2019 in Japanese Application No. 2016-123205.
Office Action dated Feb. 5, 2019 in Japanese Application No. 2016-169871.
Office Action dated Jan. 10, 2019 in U.S. Appl. No. 15/899,430.
Office Action dated Jan. 29, 2019 in U.S. Appl. No. 15/614,876.
Office Action dated Jan. 30, 2019 in U.S. Appl. No. 15/620,916.
Notice of Allowance dated Jan. 10, 2019 in U.S. Appl. No. 15/848,173.
Notice of Allowance dated Jan. 17, 2019 in U.S. Appl. No. 15/422,944.
Notice of Allowance dated Jan. 17, 2019 in U.S. Appl. No. 15/626,720.
Notice of Allowance dated Jan. 30, 2019 in U.S. Appl. No. 15/854,409.
Office Action dated May 4, 2018 which issued during the prosecution of U.S. Appl. No. 15/422,821.
Notice of Allowance dated Aug. 28, 2018 from the US Patent & Trademark Office in U.S. Appl. No. 15/422,821.
Office Action dated Nov. 29, 2018, which issued during the prosecution of U.S. Appl. No. 15/422,821.
Office Action dated Feb. 7, 2019 in U.S. Appl. No. 15/621,464.
Office Action dated Dec. 19, 2018 in U.S. Appl. No. 15/900,345.
Office Action dated Dec. 19, 2018 in U.S. Appl. No. 15/900,379.
Office Action dated Dec. 21, 2018 in U.S. Appl. No. 15/900,160.
Office Action dated Nov. 19, 2018 in U.S. Appl. No. 15/900,141.
Notice of Allowance dated Mar. 5, 2019 in U.S. Appl. No. 16/009,603.
Office Action dated Dec. 20, 2018 in U.S. Appl. No. 15/900,242.
Office Action dated Dec. 21, 2018 in U.S. Appl. No. 15/920,616.
Office Action dated Dec. 27, 2018 in U.S. Appl. No. 15/900,334.
Office Action dated Dec. 7, 2018 in U.S. Appl. No. 15/920,592.
Office Action dated Feb. 21, 2019 in U.S. Appl. No. 15/854,383.
Office Action dated Feb. 26, 2019 in Japanese Application No. 2016-123207.
Office Action dated Feb. 26, 2019 in U.S. Appl. No. 15/380,336.
Office Action dated Feb. 26, 2019 in U.S. Appl. No. 15/624,792.
Office Action dated Feb. 26, 2019 in U.S. Appl. No. 15/624,897.

(56) References Cited

OTHER PUBLICATIONS

Office Action dated Feb. 26, 2019 in U.S. Appl. No. 15/626,832.
Office Action dated Feb. 28, 2019 in U.S. Appl. No. 15/920,518.
Office Action dated Mar. 5, 2019 in U.S. Appl. No. 15/443,026.
"Introduction to TMR Magnetic Sensors", Anonymous, Mar. 12, 2015, MR Sensor Technology, pp. 1-5 (Year: 2015).
Office Action dated Mar. 6, 2019 in U.S. Appl. No. 15/854,403.
Office Action dated Mar. 7, 2019 in U.S. Appl. No. 15/854,439.
Notice of Allowance dated Apr. 16, 2019 in U.S. Appl. No. 15/625,428.
Notice of Allowance dated Apr. 30, 2019 in U.S. Appl. No. 15/380,309.
Notice of Allowance dated Mar. 18, 2019 in U.S. Appl. No. 15/628,814.
Notice of Allowance dated May 13, 2019 in U.S. Appl. No. 15/900,379.
Notice of Allowance dated May 14, 2019 in U.S. Appl. No. 15/422,821.
Notice of Allowance dated May 14, 2019 in U.S. Appl. No. 15/900,164.
Notice of Allowance dated May 15, 2019 in U.S. Appl. No. 15/900,106.
Notice of Allowance dated May 15, 2019 in U.S. Appl. No. 15/900,242.
Notice of Allowance dated May 16, 2019 in U.S. Appl. No. 15/614,876.
Notice of Allowance dated May 16, 2019 in U.S. Appl. No. 15/621,464.
Notice of Allowance dated May 24, 2019 in U.S. Appl. No. 15/900,345.
Notice of Allowance dated May 24, 2019 in U.S. Appl. No. 16/143,646.
Notice of Allowance dated May 28, 2019 in U.S. Appl. No. 15/920,616.
Notice of Allowance dated May 29, 2019 in U.S. Appl. No. 15/900,160.
Notice of Allowance dated May 29, 2019 in U.S. Appl. No. 15/900,334.
Notice of Allowance dated May 30, 2019 in U.S. Appl. No. 15/900,230.
Office Action dated Apr. 15, 2019 in U.S. Appl. No. 16/182,083.
Office Action dated Apr. 16, 2019 in U.S. Appl. No. 16/232,165.
Office Action dated Apr. 23, 2019 in Japanese Application No. 2016-169851.
Office Action dated Apr. 23, 2019 in Japanese Application No. 2016-182230.
Office Action dated Apr. 4, 2019 in U.S. Appl. No. 16/184,312.
Office Action dated Feb. 5, 2019 in U.S. Appl. No. 16/038,339.
Office Action dated Mar. 15, 2019 in U.S. Appl. No. 15/280,195.
Office Action dated Mar. 15, 2019 in U.S. Appl. No. 15/619,012.
Office Action dated Mar. 15, 2019 in U.S. Appl. No. 15/627,696.
Office Action dated Mar. 15, 2019 in U.S. Appl. No. 15/690,906.
Office Action dated Mar. 18, 2019 in U.S. Appl. No. 15/442,961.
Office Action dated Mar. 19, 2019 in Japanese Application No. 2016-116261.
Office Action dated Mar. 19, 2019 in Japanese Application No. 2016-124515.
Office Action dated Mar. 19, 2019 in Japanese Application No. 2016-124529.
Office Action dated Mar. 19, 2019 in Japanese Application No. 2016-124932.
Office Action dated Mar. 19, 2019 in Japanese Application No. 2016-124933.
Office Action dated Mar. 19, 2019 in Japanese Application No. 2016-124935.
Office Action dated Mar. 19, 2019 in U.S. Appl. No. 15/443,094.
Office Action dated Mar. 21, 2019 in U.S. Appl. No. 15/900,144.
Office Action dated Mar. 21, 2019 in U.S. Appl. No. 16/160,377.
Office Action dated Mar. 27, 2019 in U.S. Appl. No. 15/690,400.
Office Action dated May 23, 2019 in U.S. Appl. No. 15/388,911.
Notice of Allowance dated Mar. 18, 2019 in U.S. Appl. No. 15/626,355.
Office Action dated Jun. 10, 2019 in U.S. Appl. No. 15/920,518.
Notice of Allowance dated Jun. 6, 2019 in U.S. Appl. No. 15/854,383.
Office Action dated Jun. 6, 2019 in U.S. Appl. No. 15/899,587.
Notice of Allowance dated Jul. 16, 2019 in U.S. Appl. No. 15/900,144.
Notice of Allowance dated Jun. 25, 2019 in U.S. Appl. No. 15/620,916.
Notice of Allowance dated Jun. 27, 2019 in U.S. Appl. No. 15/854,439.
Office Action dated Jun. 25, 2019 in Japanese Application No. 2015-245144.
Office Action dated Jul. 16, 2019 in Japanese Application No. 2016-124933.
Notice of Allowance dated Jul. 31, 2019 in U.S. Appl. No. 16/143,646.
Office Action dated Aug. 27, 2019 in Japanese Application No. 2016-254428.
Office Action dated Aug. 27, 2019 in Japanese Application No. 2016-254430.
Office Action dated Aug. 27, 2019 in Japanese Application No. 2016-254432.
Office Action dated Aug. 28, 2019 in U.S. Appl. No. 15/854,397.
Office Action dated Aug. 6, 2019 in Japanese Application No. 2016-254421.
Office Action dated Aug. 6, 2019 in Japanese Application No. 2016-254427.
Office Action dated Sep. 17, 2019 in Japanese Application No. 2017-029499.
Office Action dated Sep. 3, 2019 in Japanese Application No. 2016-254434.

* cited by examiner

MAGNETIC TAPE AND MAGNETIC TAPE DEVICE

CROSS-REFERENCE TO RELATED APPLICATIONS

This application is a continuation of U.S. application Ser. No. 15/615,871 filed on Jun. 7, 2017, which claims priority under 35 U.S.C 119 to Japanese Patent Application No. 2016-117339 filed on Jun. 13, 2016. The above applications are hereby expressly incorporated by reference, in their entirety.

BACKGROUND OF THE INVENTION

1. Field of the Invention

The present invention relates to a magnetic tape and a magnetic tape device.

2. Description of the Related Art

Magnetic recording media are divided into tape-shaped magnetic recording media and disk-shaped magnetic recording media, and tape-shaped magnetic recording media, that is, magnetic tapes (hereinafter, also simply referred to as "tapes") are mainly used for data storage such as data back-up or archive. The recording of information into magnetic tape is normally performed by recording a magnetic signal on a data band of the magnetic tape. Accordingly, data tracks are formed in the data band.

An increase in recording capacity (high capacity) of the magnetic tape is required in accordance with a great increase in information content in recent years. As means for realizing high capacity, a technology of disposing the larger amount of data tracks in a width direction of the magnetic tape by narrowing the width of the data track to increase recording density is used.

However, when the width of the data track is narrowed and the recording and/or reproduction of magnetic signals is performed by allowing the running of the magnetic tape in a magnetic tape device (normally referred to as a "drive"), it is difficult that a magnetic head properly follows the data tracks in accordance with the position change of the magnetic tape in the width direction, and errors may easily occur at the time of recording and/or reproduction. Thus, as means for preventing occurrence of such errors, a system using a head tracking servo using a servo signal (hereinafter, referred to as a "servo system") has been recently proposed and practically used (for example, see U.S. Pat. No. 5,689,384A).

SUMMARY OF THE INVENTION

In a magnetic servo type servo system among the servo systems, a servo signal (servo pattern) is formed in a magnetic layer of a magnetic tape, and this servo pattern is magnetically read to perform head tracking. More specific description is as follows.

First, a servo head reads a servo signal formed in a magnetic layer. A position of a magnetic head of the magnetic tape in a width direction is controlled in accordance with the read servo signal. Accordingly, when running the magnetic tape in the magnetic tape device for recording and/or reproducing a magnetic signal (information), it is possible to increase an accuracy of the position of the magnetic head following the data track, even when the position of the magnetic tape is changed in the width direction with respect to the magnetic head. By doing so, it is possible to properly record information on the magnetic tape and/or properly reproduce information recorded on the magnetic tape.

As the magnetic servo type servo system described above, a timing-based servo type is widely used in recent years. In a timing-based servo type servo system (hereinafter, referred to as a "timing-based servo system"), a plurality of servo patterns having two or more different shapes are formed in a magnetic layer, and a position of a servo head is recognized by an interval of time when the servo head has reproduced (read) the two servo patterns having different shapes and an interval of time when the two servo patterns having the same shapes are reproduced. The position of the magnetic head of the magnetic tape in the width direction is controlled based on the position of the servo head recognized as described above.

Meanwhile, it is required that recording density is increased (high-density recording is realized) in the magnetic tape, in accordance with a great increase in information content of recent years. As a method for achieving high-density recording, a method of decreasing a particle size of ferromagnetic powder included in a magnetic layer (hereinafter, referred to as "micronization") and increasing a filling percentage of the ferromagnetic powder of the magnetic layer is used. In regards to this point, as the ferromagnetic powder for satisfying both micronization and excellent magnetic properties, ferromagnetic hexagonal ferrite powder among various ferromagnetic powder forms is suitable. In addition, as an index of a particle size of the ferromagnetic powder, an activation volume which is a unit of magnetization reversal can be used.

With such a point, the inventors have examined a technology of applying a magnetic tape including ferromagnetic hexagonal ferrite powder having a small activation volume as ferromagnetic powder in a magnetic layer to a timing-based servo system. However, in the intensive studies of the inventors, it was clear that, a phenomenon which was not known in the related art occurred, in which an accuracy of the position of a magnetic head following a data track in a timing-based servo system (hereinafter, referred to as a "head positioning accuracy") is decreased in a magnetic tape including ferromagnetic hexagonal ferrite powder having an activation volume equal to or smaller than 1,600 nm$^3$ in a magnetic layer.

Therefore, an object of the invention is to improve a head positioning accuracy of a timing-based servo system in a magnetic tape including ferromagnetic hexagonal ferrite powder having an activation volume equal to or smaller than 1,600 nm$^3$ in a magnetic layer.

According to one aspect of the invention, there is provided a magnetic tape comprising: a magnetic layer including ferromagnetic powder and a binder on a non-magnetic support, in which the magnetic layer includes a timing-based servo pattern, the ferromagnetic powder is ferromagnetic hexagonal ferrite powder having an activation volume equal to or smaller than 1,600 nm$^3$, and an edge shape of the timing-based servo pattern specified by a magnetic force microscope observation is a shape in which a difference ($l_{99.9}-l_{0.1}$) between a value $l_{99.9}$ of a cumulative frequency function of 99.9% of a position deviation width from an ideal shape in a longitudinal direction of the magnetic tape and a value $l_{0.1}$ of the cumulative frequency function of 0.1% thereof (hereinafter, also simply referred to as a "difference ($l_{99.9}-l_{0.1}$)") is equal to or smaller than 180 nm. In the specification, the longitudinal direction of the magnetic tape may be simply referred to as a longitudinal direction, and the width direction of the magnetic tape may be referred to as a tape width direction or simply a width direction. The "width direction" of the invention and the specification means a direction orthogonal to the longitudinal direction. In addition, in the invention and the specification, the ferromagnetic hexagonal ferrite powder means an aggregate of a plurality of ferromagnetic hexagonal ferrite particles. Hereinafter, particles (ferromagnetic hexagonal ferrite particles) configuring the ferromagnetic hexagonal ferrite powder are also referred to as "hexagonal ferrite particles" or simply "particles". The aggregate not only includes an aspect in which particles configuring the aggregate directly come into contact with each other, but also includes an aspect in which a binder, an additive, or the like is interposed between the particles. The points described above are also applied to various powder forms of the invention and the specification such as non-magnetic powder, in the same manner.

The "activation volume" is a unit of magnetization reversal. Regarding the activation volume described in the invention and the specification, magnetic field sweep rates of a coercivity Hc measurement part at time points of 3 minutes and 30 minutes are measured by using an oscillation sample type magnetic-flux meter, and the activation volume is a value acquired from the following relational expression of Hc and an activation volume V.

$$Hc=2Ku/Ms\{1-[(kT/KuV)\ln(At/0.693)]^{1/2}\}$$

[In the expression, Ku: anisotropy constant, Ms: saturation magnetization, k: Boltzmann's constant, T: absolute temperature, V: activation volume, A: spin precession frequency, and t: magnetic field reversal time]

The "timing-based servo pattern" of the invention and the specification is a servo pattern with which the head tracking of the timing-based servo system can be performed. The timing-based servo system is as described above. The servo pattern with which the head tracking of the timing-based servo system can be performed, is formed in the magnetic layer by a servo pattern recording head (also referred to as a "servo write head") as a plurality of servo patterns having two or more different shapes. As an example, the plurality of servo patterns having two or more different shapes are continuously disposed at regular intervals for each of the plurality of servo patterns having the same shapes. As another example, different types of the servo patterns are alternately disposed. In regards to the servo patterns having the same shapes, positional deviations of edge shapes of the servo patterns may be ignored. The shapes of the servo pattern with which the head tracking of the timing-based servo system can be performed and the disposition thereof on a servo band are well known and specific aspect thereof will be described later. Hereinafter, the timing-based servo pattern is also simply referred to as a servo pattern. In the invention and the specification, the edge shape of the timing-based servo pattern specified by magnetic force microscope observation is a shape of an edge (end side) positioned on a downstream side with respect to a magnetic tape running direction (hereinafter, also simply referred to as a "running direction") when recording a magnetic signal (information). In the specification, as heads, a "servo write head", a "servo head", and a "magnetic head" are disclosed. The servo write head is a head which performs recording of a servo signal as described above (that is, formation of a servo pattern). The servo head is a head which performs reproduction of the servo signal (that is, reading of the servo pattern), and the magnetic head is a head which performs recording and/or reproduction of information, unless otherwise noted.

Next, the edge shape of the timing-based servo pattern specified by magnetic force microscope observation, a difference ($l_{99.9}-l_{0.1}$) between a value $l_{99.9}$ of a cumulative frequency function of 99.9% of a position deviation width from an ideal shape of the edge shape in a longitudinal direction of the magnetic tape and a value $l_{0.1}$ of the cumulative frequency function of 0.1% thereof, and the ideal shape of the invention and the specification will be described.

Hereinafter, a linear servo pattern which continuously extends from one side to the other side in a width direction of the magnetic tape and is tilted by an angle α with respect to the width direction of the magnetic tape will be mainly described as an example. The angle α is an angle formed by a line segment connecting two portions of end portions of the edge of the servo pattern positioned on a downstream side with respect to a magnetic tape running direction when recording a magnetic signal (information), in the tape width direction, and the width direction of the magnetic tape. Details are described as follows including this point.

In a magnetic tape used in a linear recording system which is widely used as a recording system of the magnetic tape device, for example, a plurality of regions (referred to as "servo bands") where servo patterns are formed are normally present in the magnetic layer along a longitudinal direction of the magnetic tape. A region interposed between two servo bands is referred to as a data band. The recording of information (magnetic signals) is performed on the data band and a plurality of data tracks are formed in each data band along the longitudinal direction. FIG. 1 shows an example of disposition of data bands and servo bands. In FIG. 1, a plurality of servo bands 10 are disposed to be interposed between guide bands 12 in a magnetic layer of a magnetic tape 1. A plurality of regions 11 each of which is interposed between two servo bands are data bands. The servo pattern is a magnetized region and is formed by magnetizing a specific region of the magnetic layer by a servo write head. The region magnetized by the servo write head (position where a servo pattern is formed) is determined by standards. For example, in a LTO Ultrium format tape which is based on a local standard, a plurality of servo patterns tilted in a tape width direction as shown in FIG. 2 are formed on a servo band when manufacturing a magnetic tape. Specifically, in FIG. 2, a servo frame SF on the servo band 10 is configured with a servo sub-frame 1 (SSF1) and a servo sub-frame 2 (SSF2). The servo sub-frame 1 is configured with an A burst (in FIG. 2, reference numeral A) and a B burst (in FIG. 2, reference numeral B). The A burst is configured with servo patterns A1 to A5 and the B burst is configured with servo patterns B1 to B5. Meanwhile, the servo sub-frame 2 is configured with a C burst (in FIG. 2, reference numeral C) and a D burst (in FIG. 2, reference numeral D). The C burst is configured with servo patterns C1 to C4 and the D burst is configured with servo patterns D1 to D4. Such 18 servo patterns are disposed in the sub-frames in the arrangement of 5, 5, 4, 4, as the sets of 5 servo patterns and 4 servo patterns, and are used for recognizing the servo frames. FIG. 2 shows one servo frame, but a plurality of servo frames are disposed in each servo band in a running direction. In FIG. 2, an arrow shows the running direction.

FIG. 3 and FIG. 4 are explanatory diagrams of the angle α. Regarding the servo patterns tilted towards an upstream side of the running direction such as the servo patterns A1 to A5 and C1 to C4 in the servo patterns shown in FIG. 2, an angle formed by a line segment (broken line L1 in FIG. 3) connecting two portions of end portions of an edge $E_L$ on the downstream side and a tape width direction (broken line L2 in FIG. 3) is set as the angle α. Meanwhile, regarding the servo patterns tilted towards a downstream side of the running direction such as the servo patterns B1 to B5 and D1 to D4, an angle formed by a line segment (broken line L1 in FIG. 4) connecting two portions of end portions of an edge $E_L$ on the downstream side and a tape width direction (broken line L2 in FIG. 4) is set as the angle α. This angle α is normally called an azimuth angle and is determined by setting a servo write head when forming a magnetized region (servo pattern) on a servo band.

When the servo pattern is ideally formed when forming a magnetized region (servo pattern) on a servo band, the edge shape of the servo pattern tilted by the angle α with respect to the magnetic tape width direction is identical to the shape of the line segment (broken line L1 in FIGS. 3 and 4) connecting two portions of end portions of the edge. That is, the edge shape is a shape of a linear line. Accordingly, in each portion on the edge, a position deviation width from the ideal shape in the longitudinal direction of the magnetic tape (hereinafter, also simply referred to as a "position deviation width") becomes zero. However, in the intensive studies of the inventors, the inventors have considered that, in the magnetic tape including ferromagnetic hexagonal ferrite powder having an activation volume equal to or smaller than 1,600 nm$^3$ in a magnetic layer as ferromagnetic powder, as shown in FIG. 5, a high tendency of a deviation of the edge shape of the servo pattern from the ideal shape, a great position deviation width, and a great variation in values of the position deviation width at each portion of the edge may cause a decrease in the head positioning accuracy of the timing-based servo system. The inventors have surmised that the reason of the high tendency of the deviation of the edge shape of the servo pattern from the ideal shape, in the magnetic tape including ferromagnetic hexagonal ferrite powder having an activation volume equal to or smaller than 1,600 nm$^3$ in a magnetic layer as ferromagnetic powder, is because the arrangement of particles of the ferromagnetic hexagonal ferrite powder of the magnetic layer is easily disordered due to a small activation volume which is equal to or smaller than 1,600 nm$^3$, and thus, a magnetic strain may easily occur. However, this is merely a surmise. In regards to this point, it is considered that the capacity of the servo write head is increased, specifically, a servo write head having a great magnetic field (leakage field) is used, in order to prevent a deviation of the edge shape of the servo pattern from the ideal shape. However, even with the intensive studies of the inventors, it was clear that there is a limit for the edge shape of the servo pattern to be close to the ideal shape, in the magnetic tape including ferromagnetic hexagonal ferrite powder having an activation volume equal to or smaller than 1,600 nm$^3$ in a magnetic layer as ferromagnetic powder, only by increasing the capacity of the servo write head. Therefore, the inventors have thought that the edge shape of the servo pattern should be close to the ideal shape according to the performance of the magnetic tape in which the servo pattern is formed, and have made a further intensive research regarding the performance of the magnetic tape. As a result, the inventors have newly found that a servo pattern having an edge shape close to an ideal shape can be formed in the magnetic tape including ferromagnetic hexagonal ferrite powder having an activation volume equal to or smaller than 1,600 nm$^3$ in a magnetic layer as ferromagnetic powder, and accordingly, improvement of the head positioning accuracy of the timing-based servo system can be achieved, and have completed the invention regarding the magnetic tape.

The difference $(l_{99.9}-l_{0.1})$ is a value which can be an index indicating that the position deviation width from the ideal shape at each position of the edge of the servo pattern is small and a variation in values of the position deviation width at each portion of the edge is small. The difference $(l_{99.9}-l_{0.1})$ is a value acquired by the following method.

A surface of the magnetic layer of the magnetic tape in which the servo pattern is formed is observed with a magnetic force microscope (MFM). A measurement range is set as a range including five servo patterns. For example, in a LTO Ultrium format tape, five servo patterns of the A burst or B burst can be observed by setting the measurement range as a range of 90 μm×90 μm. The servo pattern (magnetized region) is extracted by performing the measurement (rough measurement) regarding the measurement range at a pitch of 100 nm. In the invention and the specification, the expression of the surface of the magnetic layer is used as the same meaning of the surface of the magnetic tape on the magnetic layer side.

After that, in order to detect a boundary between a magnetized region and a non-magnetized region of the servo pattern in the edge positioning on the downstream of the running direction, a magnetic profile is obtained by performing the measurement in the vicinity of the boundary at a pitch of 5 nm. In a case where the obtained magnetic profile is tilted by the angle α with respect to the width direction of the magnetic tape, rotation correction of the magnetic profile is performed so as to be along the magnetic tape width direction (so that α=0°) by analysis software. After that, a position coordinate of a peak value of each profile measured at a pitch of 5 nm is calculated by the analysis software. This position coordinate of the peak value shows a position of a boundary between the magnetized region and the non-magnetized region. The position coordinate is, for example, specified by an xy coordinate system in which a running direction is set as an x coordinate and a width direction is set as a y coordinate.

In a case in which the ideal shape is a shape of a linear line and the position coordinate of a position on the linear line is (x,y)=(a,b), for example, when the edge shape (position coordinate of the boundary) actually acquired is identical to the ideal shape, the calculated position coordinate becomes (x,y)=(a,b). In this case, the position deviation width becomes zero. With respect to this, when the edge shape actually acquired is deviated from the ideal shape, the x coordinate of the position of y=b of the boundary becomes x=a+c or x=a−c. The coordinate x=a+c, for example, indicates a case of the edge shape deviated by a width c on the upstream side of the running direction, and the coordinate x=a−c, for example, indicates a case of the edge shape deviated by a width c (that is, when the upstream side is set as the base, −c) on the downstream side of the running direction. Here, c is the position deviation width. That is, an absolute value of the position deviation width of the x coordinate from the ideal shape is a position deviation width from the ideal shape in the longitudinal direction of the magnetic tape. By doing so, the position deviation width at each position of edge on the downstream side of the running direction acquired by the measurement at a pitch of 5 nm is acquired.

A cumulative frequency function is obtained from the values obtained regarding each servo pattern by analysis software. The value $l_{99.9}$ of cumulative frequency function of 99.9% and the value $l_{0.1}$ of the cumulative frequency function of 0.1% are acquired from the obtained cumulative frequency function, and the difference $(l_{99.9}-l_{0.1})$ of each servo pattern is acquired from the obtained values.

The measurement described above is performed in a measurement range of three different portions (measurement number N=3).

An arithmetical mean of the obtained differences ($l_{99.9}-l_{0.1}$) of servo patterns is defined as the difference ($l_{99.9}-l_{0.1}$) regarding the magnetic tape.

The "ideal shape" of the edge shape of the servo pattern of the invention and the specification indicates an edge shape in a case where the servo pattern is formed without a position deviation. For example, in one aspect, the servo pattern is a linear servo pattern which continuously or discontinuously extends from one side to the other side in the width direction of the magnetic tape. The "linear shape" of the servo pattern does not include a curved portion as the pattern shape, regardless of the position deviation of the edge shape. The "continuous state" means that the line does not have an inflection point at a tilt angle, is not broken, and extends from one side to the other side in the tape width direction. An example of the servo pattern which continuously extends from one side to the other side in the width direction of the magnetic tape is the servo pattern shown in FIG. 2. In contrast, the "discontinuous state" means that the line has one or more inflection points at a tilt angle and/or extends while being broken at one or more portions. A shape of the line which has an inflection point at a tilt angle but extends without being broken is a so-called polygonal line shape. An example of a discontinuous servo pattern which has one inflection point at a tilt angle and extends from one side to the other side in the tape width direction without being broken is a servo pattern shown in FIG. 6. Meanwhile, an example of a discontinuous servo pattern which does not have an inflection point at a tilt angle and extends from one side to the other side in the tape width direction while being broken at one portion is a servo pattern shown in FIG. 7. In addition, an example of a discontinuous servo pattern has one inflection point at a tilt angle and extends from one side to the other side in the tape width direction while being broken at one portion is a servo pattern shown in FIG. 8.

The "ideal shape" of the edge shape of the linear servo pattern which continuously extends from one side to the other side in the tape width direction is a shape (linear shape) of a line segment connecting two portions of end portions of the edge on the downstream side of the running direction of the linear servo pattern. For example, the linear servo pattern shown in FIG. 2 has a linear shape shown as L1 in FIG. 3 or FIG. 4. Meanwhile, the ideal shape of the linear servo pattern which discontinuously extends is a shape (linear shape) of a line segment connecting one end to the other end of portions having the same tilt angle regarding a shape having an inflection point of tilt angles. In addition, the shape extending while being broken at one or more portions is a shape (linear shape) of a line segment connecting one end to the other end of each portion which continuously extends. For example, a servo pattern shown in FIG. 6 includes a line segment connecting e1 and e2 to each other and a line segment connecting e2 and e3 to each other. A servo pattern shown in FIG. 7 includes a line segment connecting e4 and e5 to each other and a line segment connecting e6 and e7 to each other. A servo pattern shown in FIG. 8 includes a line segment connecting e8 and e9 to each other and a line segment connecting e10 and e11 to each other.

Hereinabove, the linear servo pattern has been described as an example, but the servo pattern may be a servo pattern in which the ideal shape of the edge shape is a curved shape. For example, regarding a servo pattern in which an edge shape on a downstream side with respect to the running direction is ideally a partial arc shape, the difference ($l_{99.9}-l_{0.1}$) can be acquired from a position deviation width acquired with a position coordinate of the edge shape on the downstream side with respect to the running direction acquired by using a magnetic force microscope, with respect to a position coordinate of the partial arc.

As the magnetic force microscope used in the measurement described above, a commercially available magnetic force microscope or a magnetic force microscope having a well-known configuration can be used in a frequency modulation (FM) mode. As a probe of the magnetic force microscope, for example, SSS-MFMR (nominal radius of curvature of 15 nm) manufactured by Nanoworld can be used. A distance between the surface of the magnetic layer and a tip of the probe at the time of the magnetic force microscope observation is in a range of 20 to 50 nm.

In addition, as the analysis software, commercially available analysis software or analysis software with a well-known operational expression can be used.

In one aspect, the timing-based servo pattern is a linear servo pattern which continuously extends from one side to the other side in a width direction of the magnetic tape and is tilted by an angle α with respect to the width direction, and has the ideal shape which is a linear shape extending in a direction of the angle α. An example of the aspect is a servo pattern shown in FIG. 2.

In one aspect, a tilt $\cos \theta$ (hereinafter, also simply referred to as "$\cos \theta$") of the ferromagnetic hexagonal ferrite powder with respect to a surface of the magnetic layer acquired by cross section observation performed by using a scanning transmission electron microscope in the magnetic tape is 0.85 to 1.00.

Regarding the $\cos \theta$, as a result of the intensive studies of the inventors, a new finding which was not known in the related art, in which the $\cos \theta$ correlates with the difference ($l_{99.9}-l_{0.1}$) was obtained. The setting of the $\cos \theta$ to be 0.85 to 1.00 is one of preferred means for preventing the difference ($l_{99.9}-l_{0.1}$) to be equal to or smaller than 180 nm. The $\cos \theta$ will be described later in detail.

In one aspect, the $\cos \theta$ is 0.89 to 1.00.

In one aspect, the magnetic layer further includes a polyester chain-containing compound having a weight-average molecular weight of 1,000 to 80,000.

In one aspect, the difference ($l_{99.9}-l_{0.1}$) is equal to or smaller than 100 nm.

In one aspect, the activation volume of the ferromagnetic hexagonal ferrite powder is 800 $nm^3$ to 1,600 $nm^3$.

In one aspect, the magnetic tape includes a non-magnetic layer including non-magnetic powder and a binder, between the non-magnetic support and the magnetic layer.

According to another aspect of the invention, there is provided a magnetic tape device comprising: the magnetic tape; a magnetic head; and a servo head.

According to one aspect of the invention, it is possible to provide a magnetic tape in which a servo pattern is formed and which has an improved head positioning accuracy of a timing-based servo system at the time of drive running, and a magnetic tape device which records and/or reproduces a magnetic signal to the magnetic tape.

DESCRIPTION OF THE PREFERRED EMBODIMENTS

Magnetic Tape

Figure 1:
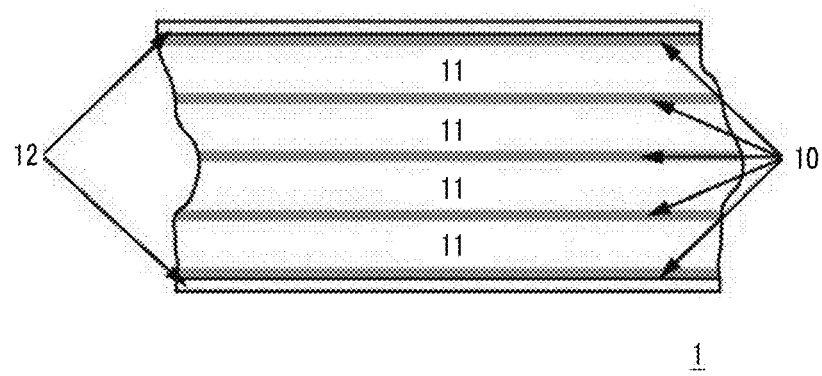
FIG. 1 shows an example of disposition of data bands and servo bands.

According to one aspect of the invention, there is provided a magnetic tape including: a magnetic layer including ferromagnetic powder and a binder on a non-magnetic support, in which the magnetic layer includes a timing-based servo pattern, the ferromagnetic powder is ferromagnetic hexagonal ferrite powder having an activation volume equal to or smaller than 1,600 nm$^3$, and an edge shape of the timing-based servo pattern specified by a magnetic force microscope observation is a shape in which a difference ($l_{99.9}-l_{0.1}$) between a value $l_{99.9}$ of a cumulative frequency function of 99.9% of a position deviation width from an ideal shape in a longitudinal direction of the magnetic tape and a value $l_{0.1}$ of the cumulative frequency function of 0.1% thereof is equal to or smaller than 180 nm.

Hereinafter, the magnetic tape will be further described in detail. The specification contains surmise of the inventors. The invention is not limited by such surmise. In addition, in the specification, the examples are described with reference to the drawings. However, the invention is not limited to such exemplified aspects.

Activation Volume

The magnetic layer of the magnetic tape includes ferromagnetic hexagonal ferrite powder having an activation volume equal to or smaller than 1,600 nm$^3$. As a result of the studies of the inventors, it was clear that, in the magnetic tape including the ferromagnetic hexagonal ferrite powder having an activation volume equal to or smaller than 1,600 nm$^3$ in the magnetic layer, a phenomenon of a decrease in a positioning accuracy occurs, which does not occur in a magnetic tape including ferromagnetic hexagonal ferrite powder having an activation volume exceeding 1,600 nm$^3$ in a magnetic layer. Such a decrease in a positioning accuracy can be prevented by controlling the difference ($l_{99.9}-l_{0.1}$) to be equal to or smaller than 180 nm. The difference ($l_{99.9}-l_{0.1}$) will be further described later. The activation volume of the ferromagnetic hexagonal ferrite powder is equal to or smaller than 1,600 nm$^3$, and may be, for example, equal to or smaller than 1,500 nm$^3$ or equal to or smaller than 1,400 nm$^3$. Generally, as the activation volume decreases, high-density recording can be suitably performed. Here, the activation volume of the ferromagnetic hexagonal ferrite powder included in the magnetic layer of the magnetic tape may be equal to or smaller than 1,600 nm$^3$. Meanwhile, from a viewpoint of stability of magnetization, the lower limit of the activation volume is preferably, for example, equal to or greater than 800 nm$^3$, and more preferably equal to or greater than 1,000 nm$^3$, and even more preferably equal to or greater than 1,200 nm$^3$.

The above-mentioned activation volume of the ferromagnetic hexagonal ferrite powder existing as powder can be acquired by using the powder as a measurement sample. Meanwhile, regarding the ferromagnetic hexagonal ferrite powder included in the magnetic layer of the magnetic tape, a measurement sample can be obtained by collecting powder from the magnetic layer. The collection of the measurement sample can be performed by the following method, for example.

1. The surface treatment is performed with respect to the surface of the magnetic layer with a plasma reactor manufactured by Yamato Scientific Co., Ltd. for 1 to 2 minutes, and organic components (binder and the like) of the surface of the magnetic layer are incinerated and removed.

2. A filter paper impregnated with an organic solvent such as cyclohexanone or acetone is attached to an edge portion of a metal bar, the surface of the magnetic layer after the treatment of the section 1. is rubbed against the upper portion thereof, and the components of the magnetic layer is transferred and stripped to the filter paper from the magnetic tape.

3. The components stripped in the section 2. are shaken off in the organic solvent such as cyclohexanone or acetone (the filter paper is put into the organic solvent to shake off the components with an ultrasonic disperser), the organic solvent is dried to extract the stripped components.

4. The components scraped in the section 3. are put into a glass test tube which is sufficiently washed, for example, approximately 20 ml of n-butylamine is added thereto, and the glass test tube is sealed. (The amount of n-butylamine to be added is an amount which can decompose the organic components remaining without being incinerated.)

5. The glass test tube is heated to an internal temperature of 170° C. for 20 hours or longer, and the organic components are decomposed.

6. The precipitates after the decomposition of the section 5. are sufficiently washed with pure water and dried, and the powder is extracted.

7. A neodymium magnet is brought to be close to the powder collected in the section 6. and the adsorbed powder (that is, ferromagnetic hexagonal ferrite powder) is extracted.

By performing the steps described above, the ferromagnetic hexagonal ferrite powder for measuring the activation volume can be collected from the magnetic layer. Since the ferromagnetic hexagonal ferrite powder is not substantially negatively affected by performing the processes described above, it is possible to measure the activation volume of the ferromagnetic hexagonal ferrite powder included in the magnetic layer by the method described above.

The ferromagnetic hexagonal ferrite powder included in the magnetic layer of the magnetic tape will be described later in detail. Hereinafter, unless otherwise noted, the ferromagnetic hexagonal ferrite powder indicates ferromagnetic hexagonal ferrite powder having an activation volume equal to or smaller than 1,600 nm$^3$.

Difference ($l_{99.9}-l_{0.1}$)

The measurement and the calculation method of the difference ($l_{99.9}-l_{0.1}$) of the timing-based servo pattern included in the magnetic tape are as described above. As a result of the intensive studies of the inventors, it was newly found that, in the magnetic tape including the ferromagnetic hexagonal ferrite powder having an activation volume equal to or smaller than 1,600 nm$^3$ in the magnetic layer, by setting the difference ($l_{99.9}-l_{0.1}$) to be equal to or smaller than 180 nm, it is possible to improve a head positioning accuracy of the timing-based servo system.

The difference ($l_{99.9}-l_{0.1}$) is equal to or smaller than 180 nm. When the difference ($l_{99.9}-l_{0.1}$) is equal to or smaller than 180 nm, in the magnetic tape including the ferromagnetic hexagonal ferrite powder having an activation volume equal to or smaller than 1,600 nm$^3$ in the magnetic layer, it is possible to improve the head positioning accuracy of the timing-based servo system. The difference ($l_{99.9}-l_{0.1}$) can also be set to be, for example, equal to or smaller than 170 nm, equal to or smaller than 160 nm, equal to or smaller than 150 nm, equal to or smaller than 140 nm, equal to or smaller than 130 nm, equal to or smaller than 120 nm, equal to or smaller than 110 nm, or equal to or smaller than 100 nm. As the value of the difference ($l_{99.9}-l_{0.1}$) decreases, the head positioning accuracy tends to be further improved. In addition, the difference ($l_{99.9}-l_{0.1}$) can be set to be, for example, equal to or greater than 50 nm, equal to or greater than 60 nm, or equal to or greater than 70 nm. Here, the difference ($l_{99.9}-l_{0.1}$) may be equal to or smaller than 180 nm and may be lower than the lower limit described above. The difference ($l_{99.9}-l_{0.1}$) can be controlled, for example, by the cos θ and types (specifically, leakage field) of the servo write head used for forming the servo pattern. It is difficult to set the difference ($l_{99.9}-l_{0.1}$) to be equal to or smaller than 180 nm, only by simply increasing the capacity of the servo write head (specifically, using a servo write head having a great leakage field). With respect to this, by setting the cos θ to be 0.85 to 1.00, for example, in the magnetic tape including the ferromagnetic hexagonal ferrite powder having an activation volume equal to or smaller than 1,600 nm$^3$ in the magnetic layer, it is possible to realize the difference ($l_{99.9}-l_{0.1}$) equal to or smaller than 180 nm.

Cos θ

In the magnetic tape, the tilt cos θ of the ferromagnetic hexagonal ferrite powder with respect to the surface of the magnetic layer acquired by the cross section observation performed by using a scanning transmission electron microscope is preferably 0.85 to 1.00. The cos θ is preferably equal to or greater than 0.89, more preferably equal to or greater than 0.90, even more preferably equal to or greater than 0.92, and sill more preferably equal to or greater than 0.95. Meanwhile, in a case where all of the hexagonal ferrite particles having an aspect ratio and a length in a long axis direction which will be described later are present to be parallel to the surface of the magnetic layer, the cos θ becomes 1.00 which is the maximum value. According to the research of the inventors, it is found that, as the value of the cos θ increases, the value of the difference ($l_{99.9}-l_{0.1}$) tends to be decreased, and in the magnetic tape including the ferromagnetic hexagonal ferrite powder having an activation volume equal to or smaller than 1,600 nm$^3$ in the magnetic layer, it is possible to improve the head positioning accuracy of the timing-based servo system. That is, in the magnetic tape including the ferromagnetic hexagonal ferrite powder having an activation volume equal to or smaller than 1,600 nm$^3$ in the magnetic layer, a great value of the cos θ is preferable, from a viewpoint of further improving the head positioning accuracy of the timing-based servo system. Accordingly, in the magnetic tape, the upper limit of the cos θ is equal to or smaller than 1.00. The cos θ may be, for example, equal to or smaller than 0.99. However, as described above, a great value of the cos θ is preferable, and thus, the cos θ may exceed 0.99.

Calculation Method of cos θ

The cos θ is acquired by the cross section observation performed by using a scanning transmission electron microscope (hereinafter, also referred to as a "STEM"). The cos θ of the invention and the specification is a value measured and calculated by the following method.

(1) A cross section observation sample is manufactured by performing the cutting out from an arbitrarily determined position of the magnetic tape which is a target for acquiring the cos θ. The manufacturing of the cross section observation sample is performed by focused ion beam (FIB) processing using a gallium ion (Ga$^+$) beam. A specific example of such a manufacturing method will be described later with an example.

(2) The manufactured cross section observation sample is observed with the STEM, and a STEM images are captured. The STEM images are captured at positions of the same cross section observation sample arbitrarily selected, except for selecting so that the imaging ranges are not overlapped, and total 10 images are obtained. The STEM image is a STEM-high-angle annular dark field (HAADF) image which is captured at an acceleration voltage of 300 kV and an imaging magnification of 450,000, and the imaging is performed so that entire region of the magnetic layer in a thickness direction is included in one image. The entire region of the magnetic layer in the thickness direction is a region from the surface of the magnetic layer observed in the cross section observation sample to an interface between the magnetic layer and the adjacent layer or the non-magnetic support. The adjacent layer is a non-magnetic layer, in a case where the magnetic tape which is a target for acquiring the cos θ includes the non-magnetic layer which will be described later between the magnetic layer and the non-magnetic support. Meanwhile, in a case where the magnetic tape which is a target for acquiring the cos θ includes the magnetic layer directly on the non-magnetic support, the interface is an interface between the magnetic layer and the non-magnetic support.

(3) In each STEM image obtained as described above, a linear line connecting both ends of a line segment showing the surface of the magnetic layer is determined as a reference line. In a case where the STEM image is captured so that the magnetic layer side of the cross section observation sample is positioned on the upper side of the image and the non-magnetic support side is positioned on the lower side, for example, the linear line connecting both ends of the line segment described above is a linear line connecting an intersection between a left side of the image (normally, having a rectangular or square shape) of the STEM image and the line segment, and an intersection between a right side of the STEM image and the line segment to each other.

(4) Among the hexagonal ferrite particles observed in the STEM image, an angle θ formed by the reference line and the long axis direction of the hexagonal ferrite particles (primary particles) having an aspect ratio in a range of 1.5 to 6.0 and a length in the long axis direction equal to or greater than 10 nm is measured, and regarding the measured angle θ, the cos θ is calculated as a cos θ based on a unit circuit. The calculation of the cos θ is performed with 30 particles arbitrarily extracted from the hexagonal ferrite particles having the aspect ratio and the length in the long axis direction in each STEM image.

(5) The measurement and the calculation are respectively performed for 10 images, the values of the acquired cos θ of the 30 hexagonal ferrite particles of each image, that is, 300 hexagonal ferrite particles in total of the 10 images, are averaged. The arithmetical mean acquired as described above is set as the tilt cos θ of the ferromagnetic hexagonal ferrite powder with respect to the surface of the magnetic layer acquired by the cross section observation performed by using the scanning transmission electron microscope.

Here, the "aspect ratio" observed in the STEM image is a ratio of "length in the long axis direction/length in a short axis direction" of the hexagonal ferrite particles.

The "long axis direction" means a direction when an end portion close to the reference line and an end portion far from the reference line are connected to each other, among the end portions which are most separated from each other, in the image of one hexagonal ferrite particle observed in the STEM image. In a case where a line segment connecting one end portion and the other end portion is parallel with the reference line, a direction parallel to the reference line becomes the long axis direction.

The "length in the long axis direction" means a length of a line segment drawn by connecting end portions which are most separated from each other, in the image of one hexagonal ferrite particle observed in the STEM image. Meanwhile, the "length in the short axis direction" means a length of the longest line segment, among the line segments connecting two intersections between an outer periphery of the image of the particle and a perpendicular line with respect to the long axis direction.

In addition, the angle θ formed by the reference line and the tilt of the particle in the long axis direction is determined to be in a range of 0° to 90°, by setting an angle of the long axis direction parallel to the reference line as 0°. Hereinafter, the angle θ will be further described with reference to the drawings.

Figure 9:
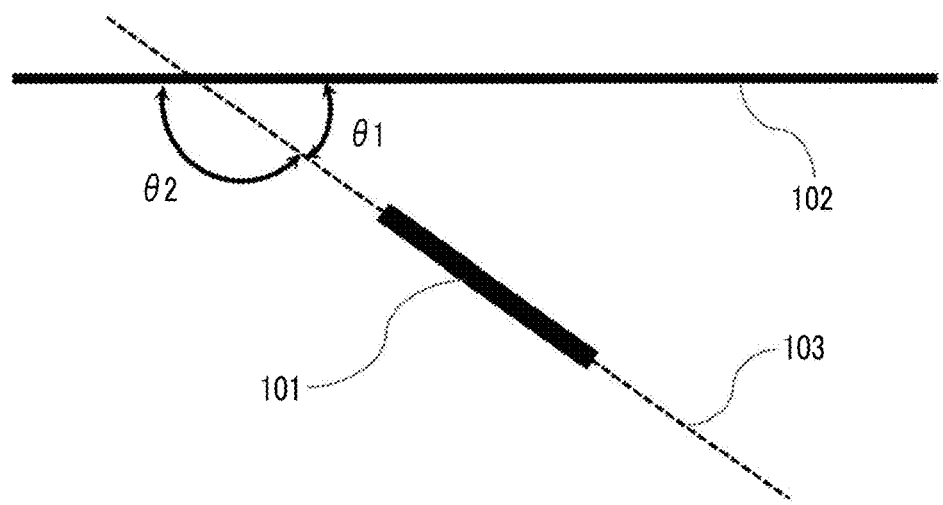
FIG. 9 is an explanatory diagram of an angle θ regarding a cos θ.
Figure 10:
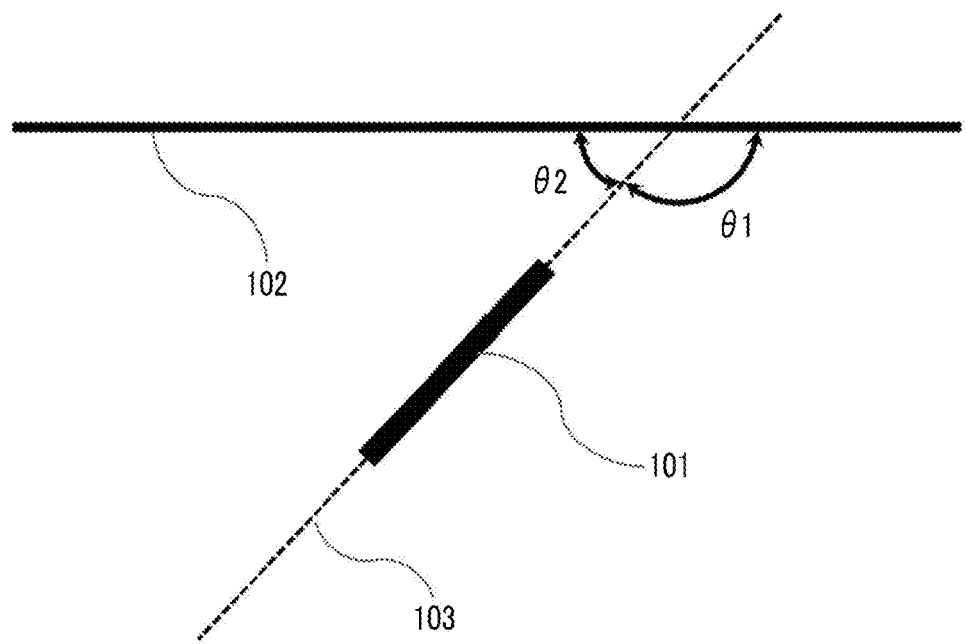
FIG. 10 is an explanatory diagram of another angle θ regarding a cos θ.

FIG. 9 and FIG. 10 are explanatory diagrams of the angle θ. In FIG. 9 and FIG. 10, a reference numeral 101 indicates a line segment (length in the long axis direction) drawn by connecting end portions which are most separated from each other, a reference numeral 102 indicates the reference line, and a reference numeral 103 indicates an extended line of the line segment (reference numeral 101). In this case, as the angle formed by the reference line 102 and the extended line 103, θ1 and θ2 are exemplified as shown in FIG. 9 and FIG. 10. Here, a smaller angle is used from the θ1 and θ2, and this is set as the angle θ. Accordingly, in the aspect shown in FIG. 9, the θ1 is set as the angle θ, and in the aspect shown in FIG. 10, θ2 is set as the angle θ. A case where θ1=θ2 is a case where the angle θ=90°. The cos θ based on the unit circle becomes 1.00, in a case where the θ=0°, and becomes 0, in a case where the θ=90°.

A squareness ratio is known as an index of a presence state (orientation state) of the ferromagnetic hexagonal ferrite powder of the magnetic layer. However, according to the studies of the inventors, in the magnetic tape including the ferromagnetic hexagonal ferrite powder having an activation volume equal to or smaller than 1,600 nm$^3$ in the magnetic layer, an excellent correlation was not observed between the squareness ratio and the difference ($l_{99.9}-l_{0.1}$) or the head positioning accuracy of the timing-based servo system. The squareness ratio is a value indicating a ratio of residual magnetization with respect to saturated magnetization, and is measured using all of the particles as targets, regardless of the shapes and size of the particles included in the ferromagnetic hexagonal ferrite powder. With respect to this, the cos θ is a value measured by selecting the hexagonal ferrite particles having the aspect ratio and the length in the longitudinal direction in the ranges described above. With such a difference, the inventors have thought that an excellent correlation may be found between the cos θ and the difference ($l_{99.9}-l_{0.1}$), and between the cos θ and the head positioning accuracy of the timing-based servo system. However, this is merely a surmise, and the invention is not limited thereto.

Adjustment Method of Cos θ

The magnetic tape can be manufactured through a step of applying a magnetic layer forming composition onto the non-magnetic support. As an adjustment method of the cos θ, a method of controlling a dispersion state of the ferromagnetic hexagonal ferrite powder of the magnetic layer forming composition is used. Regarding this viewpoint, the inventors have thought that, as dispersibility of the ferromagnetic hexagonal ferrite powder having an activation volume equal to or smaller than 1,600 nm$^3$ in the magnetic layer forming composition (hereinafter, also simply referred to as "dispersibility of the ferromagnetic hexagonal ferrite powder" or "dispersibility") is increased, the hexagonal ferrite particles having the aspect ratio and the length in the long axis direction in the ranges described above in the magnetic layer formed by using this magnetic layer forming composition are easily oriented in a state closer to parallel to the surface of the magnetic layer. As means for increasing dispersibility, any one or both of the following methods (1) and (2) are used.

(1) Adjustment of Dispersion Conditions (2) Use of Dispersing Agent

In addition, in the magnetic tape including an abrasive in the magnetic layer, as means for increasing dispersibility, a method of separately dispersing the ferromagnetic hexagonal ferrite powder and the abrasive is also used. The separate dispersing is more specifically a method of preparing the magnetic layer forming composition through a step of mixing a magnetic solution including the ferromagnetic hexagonal ferrite powder having an activation volume equal to or smaller than 1,600 nm$^3$, a binder, and a solvent (here, substantially not including an abrasive), and an abrasive liquid including an abrasive and a solvent with each other. By performing the mixing after separately dispersing the abrasive and the ferromagnetic hexagonal ferrite powder as described above, it is possible to increase the dispersibility of the ferromagnetic hexagonal ferrite powder of the magnetic layer forming composition. The expression of "substantially not including an abrasive" means that the abrasive is not added as a constituent component of the magnetic solution, and a small amount of the abrasive present as impurities by being mixed without intention is allowed. In addition, it is also preferable that any one or both of the methods (1) and (2) are combined with the separate dispersing described above. In this case, by controlling the dispersion state of the ferromagnetic hexagonal ferrite powder of the magnetic solution, it is possible to control the dispersion state of the ferromagnetic hexagonal ferrite powder of the magnetic layer forming composition obtained through the step of mixing the magnetic solution with the abrasive liquid.

Hereinafter, specific aspects of the methods (1) and (2) will be described.

(1) Adjustment of Dispersion Conditions

A dispersing process of the magnetic layer forming composition, preferably the magnetic solution can be performed by adjusting the dispersion conditions thereof by using a well-known dispersing method. The dispersion conditions of the dispersing process, for example, include the types of a dispersion device, the types of dispersion media used in the dispersion device, and a retention time in the dispersion device (hereinafter, also referred to as a "dispersion retention time").

As the dispersion device, various well-known dispersion devices using a shear force such as a ball mill, a sand mill, or a homomixer. A dispersing process having two or more stages may be performed by connecting two or more dispersion devices to each other, or different dispersion devices may be used in combination. A circumferential speed of a tip of the dispersion device is preferably 5 to 20 m/sec and more preferably 7 to 15 m/sec.

As the dispersion medium, ceramic beads or glass beads are used, and zirconia beads are preferable. Two or more types of beads may be used in combination. A particle diameter of the dispersion medium is, for example, 0.03 to 1 mm and is preferably 0.05 to 0.5 mm. In a case of performing the dispersing process having two or more stages by connecting the dispersion devices as described above, the dispersion medium having different particle diameters may be used in each stage. It is preferable that the dispersion medium having a smaller particle diameter is used, as the stages are passed. A filling percentage of the dispersion medium can be, for example, 30% to 80% and preferably 50% to 80% based on the volume.

The dispersion retention time may be suitably set b considering the circumferential speed of the tip of the dispersion device and the filling percentage of the dispersion medium, and can be, for example, 15 to 45 hours and preferably 20 hours to 40 hours. In a case of performing the dispersing process having two or more stages by connecting the dispersion devices as described above, the total dispersion retention time of each stage is preferably in the range described above. By performing the dispersing process described above, it is possible to increase the dispersibility of the ferromagnetic hexagonal ferrite powder and to adjust the cos θ to be 0.85 to 1.00.

(2) Use of Dispersing Agent

It is possible to increase the dispersibility of the ferromagnetic hexagonal ferrite powder by using a dispersing agent at the time of preparing the magnetic layer forming composition, preferably at the time of preparing the magnetic solution. Here, the dispersing agent is a component which can increase the dispersibility of the ferromagnetic hexagonal ferrite powder of the magnetic layer forming composition and/or the magnetic solution, compared to a state where the agent is not present. It is also possible to control the dispersion state of the ferromagnetic hexagonal ferrite powder by changing the type and the amount of the dispersing agent included in the magnetic layer forming composition and/or the magnetic solution. As the dispersing agent, a dispersing agent which prevents aggregation of the hexagonal ferrite particles configuring the ferromagnetic hexagonal ferrite powder and imparts suitable plasticity to the magnetic layer is also preferably used, from a viewpoint of increasing durability of the magnetic layer.

As an aspect of the dispersing agent preferable for improving the dispersibility of the ferromagnetic hexagonal ferrite powder having an activation volume equal to or smaller than 1,600 nm$^3$, a polyester chain-containing compound can be used. The polyester chain-containing compound is preferable from a viewpoint of imparting suitable plasticity to the magnetic layer. Here, the polyester chain is shown as E in General Formula A which will be described later. Specific aspects thereof include a polyester chain contained in General Formula 1, a polyester chain represented by Formula 2-A, and a polyester chain represented by Formula 2-B which will be described later. The inventors have surmised that, by mixing the polyester chain-containing component with the magnetic layer forming composition and/or the magnetic solution together with the ferromagnetic hexagonal ferrite powder, it is possible to prevent aggregation of particles, due to the polyester chain interposed between the hexagonal ferrite particles. However, this is merely the surmise, and the invention is not limited thereto. A weight-average molecular weight of the polyester chain-containing compound is preferably equal to or greater than 1,000, from a viewpoint of improving the dispersibility of the ferromagnetic hexagonal ferrite powder. In addition, the weight-average molecular weight of the polyester chain-containing compound is preferably equal to or smaller than 80,000. The inventors have thought that the polyester chain-containing compound having a weight-average molecular weight equal to or smaller than 80,000 can increase the durability of the magnetic layer by exhibiting an operation of a plasticizer. The weight-average molecular weight of the invention and the specification is a value obtained by performing polystyrene conversion of a value measured by gel permeation chromatography (GPC). Specific examples of the measurement conditions will be described later. In addition, the preferred range of the weight-average molecular weight will be also described later.

As a preferred aspect of the polyester chain-containing compound, a compound having a partial structure represented by the following General Formula A is used. In the invention and the specification, unless otherwise noted, a group disclosed may include a substituent or may be non-substituted. In a case where a given group includes a substituent, examples of the substituent include an alkyl group (for example, alkyl group having 1 to 6 carbon atoms), a hydroxyl group, an alkoxy group (for example, alkoxy group having 1 to 6 carbon atoms), a halogen atom (for example, a fluorine atom, a chlorine atom, or a bromine atom), a cyano group, an amino group, a nitro group, an acyl group, carboxyl (salt) group. In addition, the "number of carbon atoms" of the group including a substituent means the number of carbon atoms of a portion not including a substituent.

General Formula A

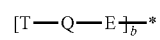

In General Formula A, Q represents —O—, —CO—, —S—, —NR$^a$—, or a single bond, T and R$^a$ each independently represent a hydrogen atom or a monovalent substituent, E represents —(O-L$^A$-CO)a- or —(CO-L$^A$-O)a-, L$^A$ represents a divalent linking group, a represents an integer equal to or greater than 2, b represents an integer equal to or greater than 1, and * represents a bonding site with another partial structure configuring the polyester chain-containing compound.

In General Formula A, the number of L$^A$ included is a value of a×b. In addition, the numbers of T and Q included are respectively the value of b. In a case where a plurality of L$^A$ are included in General Formula A, the plurality of L$^A$ may be the same as each other or different from each other. The same applies to T and Q.

It is considered that the compound described above can prevent aggregation of hexagonal ferrite particles due to a steric hindrance caused by the partial structure, in the magnetic solution and the magnetic layer forming composition.

As a preferred aspect of the polyester chain-containing component, a compound including a group which can be adsorbed to the surface of the hexagonal ferrite particles or the partial structure (hereinafter, referred to as an "adsorption part") together with the polyester chain in a molecule is used. It is preferable that the polyester chain is included in the partial structure represented by General Formula A. In addition, it is more preferable that the partial structure and the adsorption part represented by General Formula A form a bond through * in General Formula A.

In one aspect, the adsorption part can be a functional group (polar group) having polarity to be an adsorption point to the surface of the hexagonal ferrite particles. As a specific example, at least one polar group selected from a carboxyl group (—COOH) and a salt thereof (—COO$^-$M$^+$), a sulfonic acid group (—SO$_3$H) and a salt thereof (—SO$_3^-$M$^+$), a sulfuric acid group (—OSO$_3$H) and a salt thereof (—OSO$_3^-$M$^+$), a phosphoric acid group (—P=O(OH)$_2$) and a salt thereof (—P=O(O$^-$M$^+$)$_2$), an amino group (—NR$_2$), —N$^+$R$_3$, an epoxy group, a thiol group (—SH), and a cyano group (—CN) (here, M$^+$ represents a cation such as an alkali metal ion and R represents a hydrogen atom or a hydrocarbon group) can be used. In addition, the "carboxyl (salt) group" means one or both of a carboxyl group and a slat thereof (carboxylic salt). The carboxylic salt is a state of a salt of the carboxyl group (—COOH) as described above.

As one aspect of the adsorption part, a polyalkyleneimine chain can also be used.

The types of the bond formed by the partial structure and the adsorption part represented by General Formula A are not particularly limited. Such a bond is preferably selected from a covalent bond, a coordinate bond, and an ion bond, and a bond of different types may be included in the same molecular. It is considered that by efficiently performing the adsorption with respect to the hexagonal ferrite particles through the adsorption part, it is possible to further increase an aggregation prevention effect of the hexagonal ferrite particles based on the steric hindrance caused by the partial structure represented by General Formula A.

In one aspect, the polyester chain-containing compound can include at least one polyalkyleneimine chain. The polyester chain-containing compound can preferably include a polyester chain in the partial structure represented by General Formula A. As a preferred example of the polyester chain-containing compound, a polyalkyleneimine derivative including a polyester chain selected from the group consisting of a polyester chain represented by the following Formula 2-A and a polyester chain represented by the following Formula 2-B as General Formula A is used. These examples will be described later in detail.

Formula 2-A

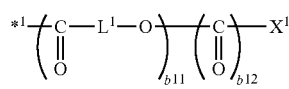

Formula 2-B

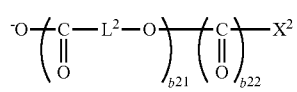

L$^1$ in Formula 2-A and L$^2$ in Formula 2-B each independently represent a divalent linking group, b11 in Formula 2-A and b21 in Formula 2-B each independently represent an integer equal to or greater than 2, b12 in Formula 2-A and b22 in Formula 2-B each independently represent 0 or 1, and X$^1$ in Formula 2-A and X$^2$ in Formula 2-B each independently represent a hydrogen atom or a monovalent substituent.

In General Formula A, Q represents —O—, —CO—, —S—, —NR$^a$—, or a single bond, and is preferably a portion represented by X in General Formula 1 which will be described later, (—CO—)b12 in Formula 2-A or (—CO—)b22 in Formula 2-B.

In General Formula A, T and R$^a$ each independently represent a hydrogen atom or a monovalent substituent and is preferably a portion represented by R in General Formula 1 which will be described later, X$^1$ in Formula 2-A or X$^2$ in Formula 2-B.

In General Formula A, E represents —(O-L$^A$-CO)a- or —(CO-L$^A$-O)a-, L$^A$ represents a divalent linking group, and a represents an integer equal to or greater than 2.

As a divalent linking group represented by L$^A$, L in General Formula 1 which will be described later, L$^1$ in Formula 2-A or L$^2$ in Formula 2-B is preferably used.

In one aspect, the polyester chain-containing compound can include at least one group selected from the group consisting of a carboxyl group and a carboxylic salt. Such a polyester chain-containing compound can preferably include a polyester chain in the partial structure represented by General Formula A. As a preferred example of the polyester chain-containing compound, a compound represented by the following General Formula 1 is used.

Compound Represented by General Formula 1
General Formula 1 is as described below.

General Formula 1

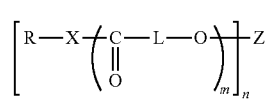

(In General Formula 1, X represents —O—, —S—, or —NR$^1$—, R and R$^1$ each independently represent a hydrogen atom or a monovalent substituent, L represents a divalent linking group, Z represents a n-valent partial structure including at least one group (carboxylic (salt) group) selected from the group consisting of a carboxyl group and a carboxylic salt, m represents an integer equal to or greater than 2, and n represents an integer equal to or greater than 1.)

In General Formula 1, the number of L included is a value of m×n. In addition, the numbers of R and X included are respectively the value of n. In a case where a plurality of L are included in General Formula 1, the plurality of L may be the same as each other or different from each other. The same applies to R and X.

The compound represented by General Formula 1 has a structure (polyester chain) represented by —((C=O)-L-O) m-, and a carboxylic (salt) group is included in the Z part as the adsorption part. It is considered that, when the compound represented by General Formula 1 is effectively adsorbed to the hexagonal ferrite particles by setting the carboxylic (salt) group included in the Z part as the adsorption part to the surface of the hexagonal ferrite particles, it is possible to prevent aggregation of the hexagonal ferrite particles caused by steric hindrance caused by the polyester chain.

In General Formula 1, X represents —O—, —S—, or —NR$^1$—, and R$^1$ represents a hydrogen atom or a monovalent substituent. As the monovalent substituent represented by R$^1$, an alkyl group, a hydroxyl group, an alkoxy group, a hydrogen atom, a cyano group, an amino group, a nitro group, an acyl group, and a carboxyl (salt) group which is the substituent described above can be used, an alkyl group is preferably used, an alkyl group having 1 to 6 carbon atoms is more preferably used, and a methyl group or an ethyl group is even more preferably used. R$^1$ is still more preferably a hydrogen atom. X preferably represents —O—.

R represents a hydrogen atom or a monovalent substituent. R preferably represents a monovalent substituent. As the monovalent substituent represented by R, a monovalent group such as an alkyl group, an aryl group, a heteroaryl group, an alicyclic group, or a nonaromatic heterocyclic group, and a structure in which a divalent linking group is bonded to the monovalent group (that is, R has a structure in which a divalent linking group is bonded to the monovalent group and is a monovalent substituent bonding with X through the divalent linking group) can be used, for example. As the divalent linking group, a divalent linking group configured of a combination of one or two or more selected from the group consisting of —C(=O)—O—, —O—, —C(=O)—NR$^{10}$— (R$^{10}$ represents a hydrogen atom or an alkyl group having 1 to 4 carbon atoms), —O—C(=O)—NH—, a phenylene group, an alkylene group having 1 to 30 carbon atoms, and an alkenylene group having 2 to 30 carbon atoms can be used, for example. As a specific example of the monovalent substituent represented by R, the following structure is used, for example. In the following structures, * represents a bonding site with X. However, R is not limited to the following specific example.

group which is configured of a combination of one or two or more selected from the group consisting of an alkylene group which may have a linear, branched, or cyclic structure, an alkenylene group which may have a linear, branched, or cyclic structure, —C(=O)—, —O—, and an arylene group, and which may include a substituent in the divalent linking group or a halogen atom as an anion can be used. More specifically, a divalent linking group configured of a combination of one or two or more selected from an alkylene group having 1 to 12 carbon atoms which may have a linear, branched, or cyclic structure, an alkenylene group having 1 to 6 carbon atoms which may have a linear, branched, or cyclic structure, —C(=O)—, —O—, and a phenylene group can be used. The divalent linking group is preferably a divalent linking group formed of 1 to 10 carbon atoms, 0 to 10 oxygen atoms, 0 to 10 halogen atoms, and 1 to 30 hydrogen atoms. As a specific example, an alkylene group and the following structure are used. In the following structures, * represents a bonding site with the other structure in General Formula 1. However, the divalent linking group is not limited to the following specific example.

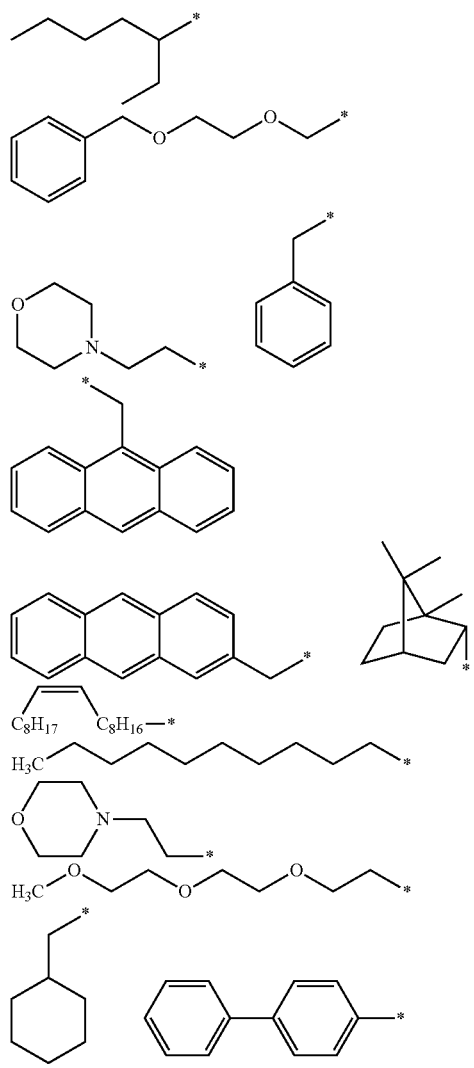

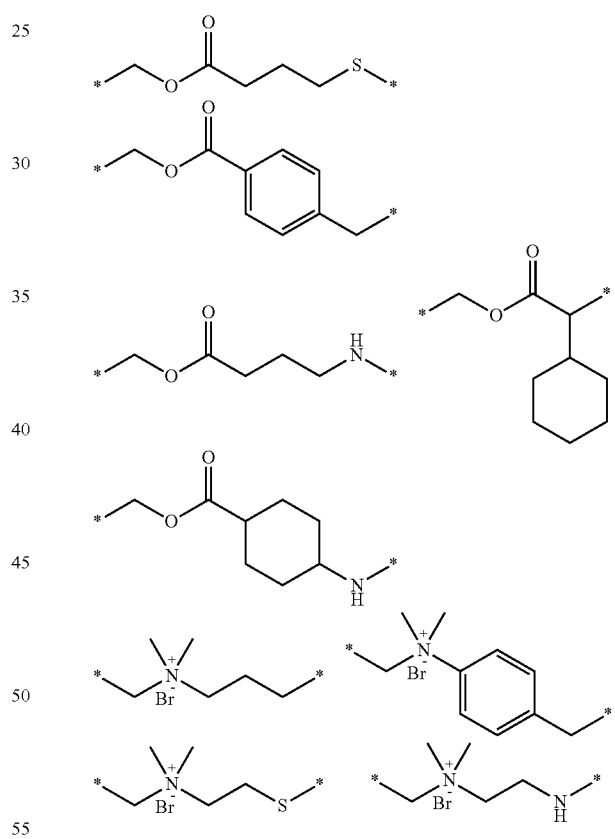

In General Formula 1, L represents a divalent linking group. As the divalent linking group, a divalent linking L is preferably an alkylene group, more preferably an alkylene group having 1 to 12 carbon atoms, even more preferably an alkylene group having 1 to 5 carbon atoms, and still more preferably a non-substituted alkylene group having 1 to 5 carbon atoms.

Z represents an n-valent partial structure including at least one group (carboxylic (salt) group) selected from the group consisting of a carboxyl group and a carboxylic salt.

The number of the carboxylic (salt) group included in Z is at least 1, preferably equal to or greater than 2, and more preferably 2 to 4, for one Z.

Z can have a structure of one or more selected from the group consisting of a linear structure, a branched structure, and a cyclic structure. From a viewpoint of easiness of synthesis, Z is preferably a reactive residue of a carboxylic acid anhydride. For example, as a specific example, the following structure is used. In the following structures, * represents a bonding site with the other structure in General Formula 1. However, Z is not limited to the following specific example.

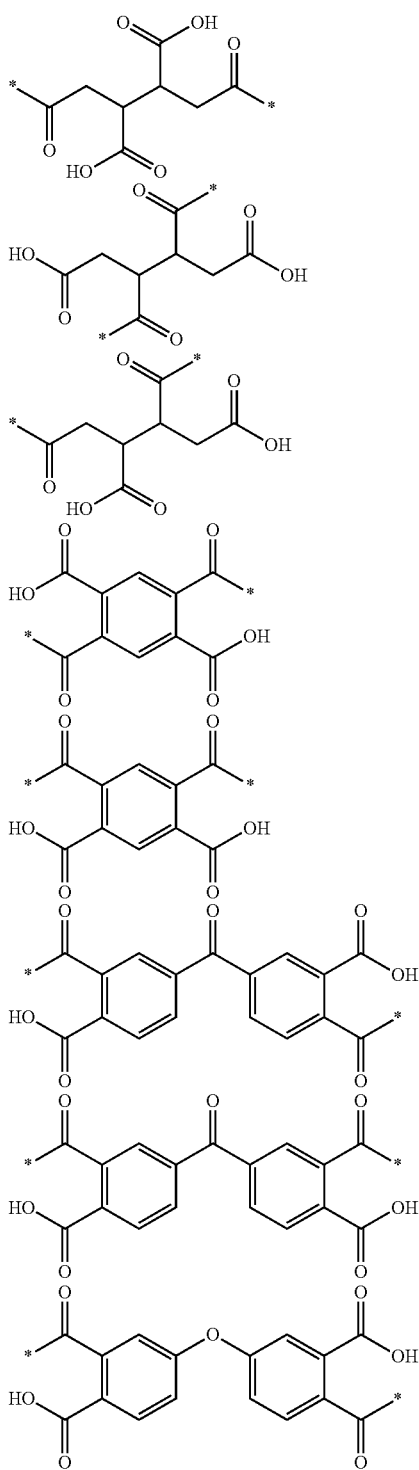

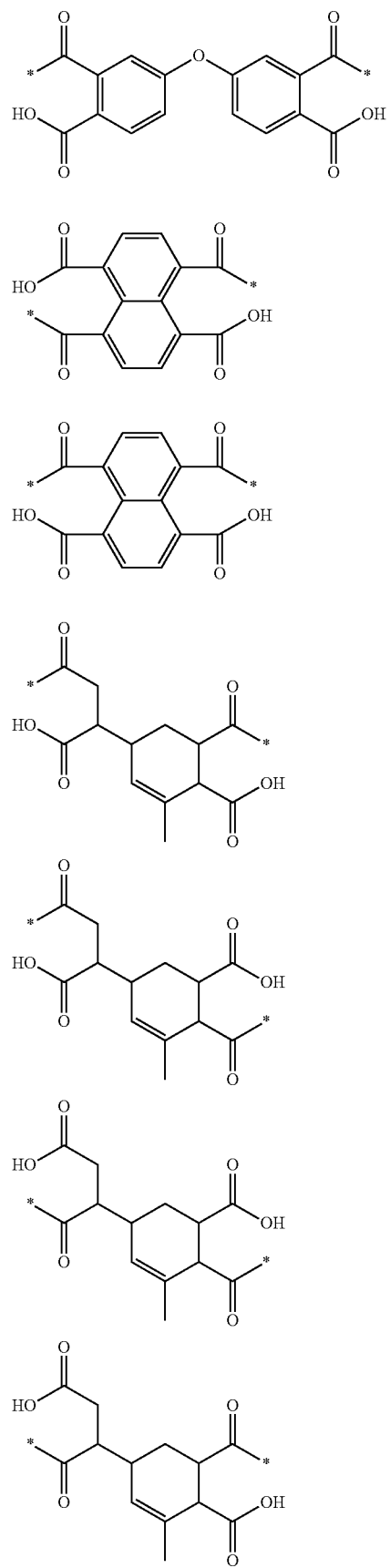

-continued

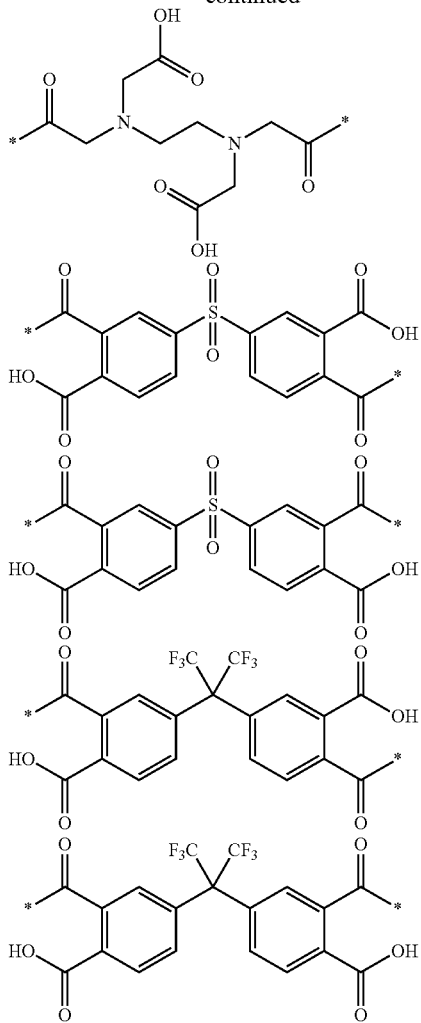

The carboxylic acid anhydride is a compound having a partial structure represented by —(C=O)—O—(C=O)—. In the carboxylic acid anhydride, the partial structure becomes a reactive site, and an oxygen atom and Z of —((C=O)-L-O)m- in General Formula 1 are bonded to each other through a carbonyl bond (—(C=O)—), and a carboxylic (salt) group is obtained. The partial structure generated as described above is a reactive residue of a carboxylic acid anhydride. By synthesizing the compound represented by General Formula 1 by using a compound having one partial structure —(C=O)—O—(C=O)—, as the carboxylic acid anhydride, it is possible to obtain a compound represented by General Formula 1 including a monovalent reactive residue of the carboxylic acid anhydride, and it is possible to obtain a compound represented by General Formula 1 including a divalent reactive residue of the carboxylic acid anhydride, by using the compound having two partial structures described above. The same applies to the compound represented by General Formula 1 including a trivalent reactive residue of the carboxylic acid anhydride. As described above, n is an integer equal to or greater than 1, is, for example, an integer of 1 to 4, and is preferably an integer of 2 to 4.

It is possible to obtain a compound represented by General Formula 1 in a case of n=2, by using the tetracarboxylic acid anhydride, for example, as the carboxylic acid anhydride. The tetracarboxylic acid anhydride is a carboxylic acid anhydride having two partial structures described above in one molecule, by dehydration synthesis of two carboxyl groups, in the compound including four carboxyl groups in one molecule. In General Formula 1, the compound in which Z represents a reactive residue of the tetracarboxylic acid anhydride is preferable, from viewpoints of further improving dispersibility of ferromagnetic hexagonal ferrite powder and durability of the magnetic layer. Examples of the tetracarboxylic acid anhydride include various tetracarboxylic acid anhydrides such as aliphatic tetracarboxylic acid anhydride, aromatic tetracarboxylic acid anhydride, and polycyclic tetracarboxylic acid anhydride.

As the aliphatic tetracarboxylic acid anhydride, for example, various aliphatic tetracarboxylic acid anhydrides disclosed in a paragraph 0040 of JP2016-071926A can be used. As the aromatic tetracarboxylic acid anhydride, for example, various aromatic tetracarboxylic acid anhydrides disclosed in a paragraph 0041 of JP2016-071926A can be used. As the polycyclic tetracarboxylic acid anhydride, various polycyclic tetracarboxylic acid anhydrides disclosed in a paragraph 0042 of JP2016-071926 can be used.

In General Formula 1, m represents an integer equal to or greater than 2. As described above, it is though that the structure (polyester chain) represented by —((C=O)-L-O)m- of the compound represented by General Formula 1 contributes to the improvement of dispersibility and the durability. From these viewpoints, m is preferably an integer of 5 to 200, more preferably an integer of 5 to 100, and even more preferably an integer of 5 to 60.

Weight-Average Molecular Weight

The weight-average molecular weight of the compound represented by General Formula 1 is preferably 1,000 to 80,000 as described above and more preferably 1,000 to 20,000. The weight-average molecular weight of the compound represented by General Formula 1 is even more preferably smaller than 20,000, further more preferably equal to or smaller than 12,000, and sill more preferably equal to or smaller than 10,000. In addition, the weight-average molecular weight of the compound represented by General Formula 1 is preferably equal to or greater than 1,500 and more preferably equal to or greater than 2,000. Regarding the compound represented by General Formula 1, the weight-average molecular weight shown in examples which will be described later is a value obtained by performing reference polystyrene conversion of a value measured by GPC under the following measurement conditions. In addition, the weight-average molecular weight of a mixture of two or more kinds of structural isomers is a weight-average molecular weight of two or more kinds of structural isomers included in this mixture.

GPC device: HLC-8220 (manufactured by Tosoh Corporation)

Guard column: TSK guard column Super HZM-H

Column: TSK gel Super HZ 2000, TSK gel Super HZ 4000, TSK gel Super HZ-M (manufactured by Tosoh Corporation, 4.6 mm (inner diameter)×15.0 cm, three types of columns are connected in series)

Eluent: Tetrahydrofuran (THF), containing a stabilizer (2,6-di-t-butyl-4-methylphenol)

Flow rate of eluent: 0.35 mL/min

Column temperature: 40° C.

Inlet temperature: 40° C.

Refractive index (RI) measurement temperature: 40° C.

Sample concentration: 0.3 mass %

Sample introduction amount: 10 μL

Analysis Method

The compound represented by General Formula 1 described above can be synthesized by a well-known method. As an example of the synthesis method, a method of allowing a reaction such as a ring-opening addition reaction between the carboxylic acid anhydride and a compound represented by the following General Formula 2 can be used, for example. In General Formula 2, R, X, L, and m are the same as those in General Formula 1. A represents a hydrogen atom, an alkali metal atom, or quaternary ammonium base and is preferably a hydrogen atom.

General Formula 2

In a case of using a butanetetracarboxylic acid anhydride, for example, the reaction between the carboxylic acid anhydride and a compound represented by the following General Formula 2 is performed by mixing the butanetetracarboxylic acid anhydride at a percentage of 0.4 to 0.5 moles with respect to 1 equivalent of a hydroxyl group, and heating and stirring the mixture approximately for 3 to 12 hours, under the absence of solvent, if necessary, under the presence of an organic solvent having a boiling point equal to or higher than 50° C., further, a catalyst such as tertiary amine or inorganic base. Even in a case of using other carboxylic acid anhydride, a reaction between the carboxylic acid anhydride and the compound represented by General Formula 2 can be performed under the reaction conditions described above or under well-known reaction conditions.

After the reaction, post-process such as purification may be performed, if necessary.

In addition, the compound represented by General Formula 2 can also be obtained by using a commercially available product or by a well-known polyester synthesis method. For example, as the polyester synthesis method, ring-opening polymerization of lactone can be used. As the ring-opening polymerization of lactone, descriptions disclosed in paragraphs 0050 to 0051 of JP2016-071926A can be referred to. However, the compound represented by General Formula 2 is not limited to a compound obtained by the ring-opening polymerization of lactone, and can also be a compound obtained by a well-known polyester synthesis method, for example, polycondensation of polyvalent carboxylic acid and polyhydric alcohol or polycondensation of hydroxycarboxylic acid.

The synthesis method described above is merely an example and there is no limitation regarding the synthesis method of the compound represented by General Formula 1. Any well-known synthesis method can be used without limitation, as long as it is a method capable of synthesizing the compound represented by General Formula 1. The reaction product after the synthesis can be used for forming the magnetic layer, as it is, or by purifying the reaction product by a well-known method, if necessary. The compound represented by General Formula 1 may be used alone or in combination of two or more kinds having different structures, in order to form the magnetic layer. In addition, the compound represented by General Formula 1 may be used as a mixture of two or more kinds of structural isomers. For example, in a case of obtaining two or more kinds of structural isomers by the synthesis reaction of the compound represented by General Formula 1, the mixture can also be used for forming the magnetic layer.

As the compound represented by General Formula 1, various compounds included in reaction products shown in synthesis examples in examples disclosed in JP2016-071926 can be used. For example, as a specific example thereof, compounds shown in the following Table 1 can be used. A weight-average molecular weight shown in Table 1 is a weight-average molecular weight of the compound represented by structural formula shown in Table 1 or a weight-average molecular weight of the compound represented by structural formula shown in Table 1 and a mixture of structural isomers thereof.

TABLE 1

| Types | Structural Formula | Weight-average molecular weight |
|---|---|---|
| Compound 1 | | 9200 |
| Compound 2 | | 6300 |
| Compound 3 | | 5300 |

TABLE 1-continued

| Types | Structural Formula | Weight-average molecular weight |
|---|---|---|
| Compound 4 | | 8000 |
| Compound 5 | | 8700 |
| Compound 6 | | 8600 |
| Compound 7 | | 6200 |
| Compound 8 | | 8000 |

As an aspect of a preferred example of the compound having the partial structure and the adsorption part represented by General Formula A, a polyalkyleneimine derivative including a polyester chain represented by the following Formula 2-A or 2-B as General Formula A is used. Hereinafter, the polyalkyleneimine derivative will be described.

Polyalkyleneimine Derivative

The polyalkyleneimine derivative is a compound including at least one polyester chain selected from the group consisting of a polyester chain represented by the following Formula 2-A and a polyester chain represented by the following Formula 2-B, and a polyalkyleneimine chain having a number average molecular weight of 300 to 3,000. A percentage of the polyalkyleneimine chain occupying the compound is preferably smaller than 5.0 mass %.

The polyalkyleneimine derivative includes a polyalkyleneimine chain which is an aspect of the adsorption part described above. In addition, it is thought that, the steric hindrance caused by the polyester chain included in the polyalkyleneimine derivative is caused in the magnetic layer forming composition and/or the magnetic solution, and accordingly, it is possible to prevent aggregation of the hexagonal ferrite particles.

Hereinafter, the polyester chain and the polyalkyleneimine chain included in the polyalkyleneimine derivative will be described.

Polyester Chain

Structure of Polyester Chain

The polyalkyleneimine derivative includes at least one polyester chain selected from the group consisting of a polyester chain represented by the following Formula 2-A and a polyester chain represented by the following Formula 2-B, together with a polyalkyleneimine chain which will be described later. In one aspect, the polyester chain is bonded to an alkyleneimine chain represented by Formula A which will be described later by a nitrogen atom N included in Formula A and a carbonyl bond —(C=O)— at *$^1$ of Formula A, and —N—(C=O)— can be formed. In addition, in another aspect, an alkyleneimine chain represented by Formula B which will be described later and the polyester chain can form a salt crosslinking group by a nitrogen cation $N^+$ in Formula B and an anionic group including a polyester chain. As the salt crosslinking group, a component formed by an oxygen anion $O^-$ included in the polyester chain and $N^+$ in Formula B can be used.

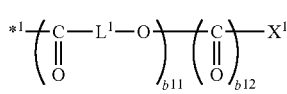

Formula 2-A

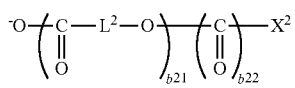

Formula 2-B

As the polyester chain bonded to the alkyleneimine chain represented by Formula A by a nitrogen atom N included in Formula A and a carbonyl bond —(C=O)—, the polyester chain represented by Formula 2-A can be used. The polyester chain represented by Formula 2-A can be bonded to the alkyleneimine chain represented by Formula A by forming —N—(C=O)— by a nitrogen atom included in the alkyleneimine chain and a carbonyl group —(C=O)— included in the polyester chain at the bonding site represented by *1.

In addition, as the polyester chain bonded to the alkyleneimine chain represented by Formula B by forming a salt crosslinking group by $N^+$ in Formula B and an anionic group including the polyester chain, the polyester chain represented by Formula 2-B can be used. The polyester chain represented by Formula 2-B can form $N^+$ in Formula B and a salt crosslinking group by an oxygen anion $O^-$.

$L^1$ in Formula 2-A and $L^2$ in Formula 2-B each independently represent a divalent linking group. As the divalent linking group, an alkylene group having 3 to 30 carbon atoms can be preferably used. In a case where the alkylene group includes a substituent, the number of carbon atoms of the alkylene group is the number of carbon atoms of a part (main chain part) excluding the substituent, as described above.

b11 in Formula 2-A and b21 Formula 2-B each independently represent an integer equal to or greater than 2, for example, an integer equal to or smaller than 200. The number of lactone repeating units shown in Table 3 which will be described later corresponds to b11 in Formula 2-A or b21 Formula 2-B.

b12 in Formula 2-A and b22 Formula 2-B each independently represent 0 or 1.

$X^1$ in Formula 2-A and $X^2$ Formula 2-B each independently represent a hydrogen atom or a monovalent substituent. As the monovalent substituent, a monovalent substituent selected from the group consisting of an alkyl group, a haloalkyl group (for example, fluoroalkyl group), an alkoxy group, a polyalkyleneoxyalkyl group, and an aryl group can be used.

The alkyl group may include a substituent or may be non-substituted. As the alkyl group including a substituent, an alkyl group (hydroxyalkyl group) substituted with a hydroxyl group, and an alkyl group substituted with one or more halogen atoms are preferable. In addition, an alkyl group (haloalkyl group) in which all of hydrogen atoms bonded to carbon atoms are substituted with halogen atoms is also preferable. As the halogen atom, a fluorine atom, a chlorine atom, or a bromine atom can be used. The alkyl group is more preferably an alkyl group having 1 to 30 carbon atoms, and even more preferably an alkyl group having 1 to 10 carbon atoms. The alkyl group may have any of a linear, branched, and cyclic structure. The same applies to the haloalkyl group.

Specific examples of substituted or non-substituted alkyl group or haloalkyl group include a methyl group, an ethyl group, a propyl group, a butyl group, a pentyl group, a hexyl group, a heptyl group, an octyl group, a nonyl group, a decyl group, a undecyl group, a dodecyl group, a tridecyl group, a pentadecyl group, a hexadecyl group, a heptadecyl group, an octadecyl group, an eicosyl group, an isopropyl group, an isobutyl group, an isopentyl group, a 2-ethylhexyl group, a tert-octyl group, a 2-hexyldecyl group, a cyclohexyl group, a cyclopentyl group, a cyclohexylmethyl group, an octylcyclohexyl group, a 2-norbornyl group, a 2,2,4-trimethylpentyl group, an acetylmethyl group, an acetylethyl group, a hydroxymethyl group, a hydroxyethyl group, a hydroxypropyl group, a hydroxybutyl group, a hydroxypentyl group, a hydroxyhexyl group, a hydroxyheptyl group, a hydroxyoctyl group, a hydroxynonyl group, a hydroxydecyl group, a chloromethyl group, a dichloromethyl group, a trichloromethyl group, a bromomethyl group, a 1,1,1,3,3,3-hexafluoroisopropyl group, a heptafluoropropyl group, a pentadecafluoroheptyl group, a nonadecafluorononyl group, a hydroxyundecyl group, a hydroxydodecyl group, a hydroxypentadecyl group, a hydroxyheptadecyl group, and a hydroxyoctadecyl group.

Examples of the alkoxy group include a methoxy group, an ethoxy group, a propyloxy group, a hexyloxy group, a methoxyethoxy group, a methoxyethoxyethoxy group, and a methoxyethoxyethoxymethyl group.

The polyalkyleneoxyalkyl group is a monovalent substituent represented by $R^{10}(OR^{11})n1(O)m1$-. $R^{10}$ represents an alkyl group, $R^{11}$ represents an alkylene group, n1 represents an integer equal to or greater than 2, and m1 represents 0 or 1.

The alkyl group represented by $R^{10}$ is as described regarding the alkyl group represented by $X^1$ or $X^2$. For the specific description of the alkyl group represented by $R^{11}$, the description regarding the alkyl group represented by $X^1$ or $X^2$ can be applied by replacing the alkyl group with an alkylene group obtained by removing one hydrogen atom from the alkylene group (for example, by replacing the methyl group with a methylene group). n1 is an integer equal to or greater than 2, for example, is an integer equal to or smaller than 10, and preferably an integer equal to or smaller than 5.

The aryl group may include a substituent or may be annelated, and more preferably an aryl group having 6 to 24 carbon atoms, and examples thereof include a phenyl group, a 4-methylphenyl group, 4-phenylbenzoic acid, a 3-cyanophenyl group, a 2-chlorophenyl group, and a 2-naphthyl group.

The polyester chain represented by the following Formula 2-A and the polyester chain represented by the following Formula 2-B can have a polyester-derived structure obtained by a well-known polyester synthesis method. As the polyester synthesis method, ring-opening polymerization of lactone disclosed in paragraphs 0056 and 0057 of JP2015-28830A can be used. However, the structure of the polyester chain is not limited to the polyester-derived structure obtained by the ring-opening polymerization of lactone, and can be a polyester-derived structure obtained by a well-known polyester synthesis method, for example, polycondensation of polyvalent carboxylic acid and polyhydric alcohol or polycondensation of hydroxycarboxylic acid.

Number Average Molecular Weight of Polyester Chain

A number average molecular weight of the polyester chain is preferably equal to or greater than 200, more preferably equal to or greater than 400, and even more preferably equal to or greater than 500, from a viewpoint of improvement of dispersibility of ferromagnetic hexagonal ferrite powder. In addition, from the same viewpoint, the number average molecular weight of the polyester chain is preferably equal to or smaller than 100,000 and more preferably equal to or smaller than 50,000. As described above, it is considered that the polyester chain functions to cause steric hindrance in the magnetic layer forming composition and/or the magnetic solution and preventing the aggregation of the hexagonal ferrite particles. It is assumed that the polyester chain having the number average molecular weight described above can exhibit such an operation in an excellent manner. The number average molecular weight of the polyester chain is a value obtained by performing reference polystyrene conversion of a value measured by GPC, regarding polyester obtained by hydrolysis of a polyalkyleneimine derivative.

The value acquired as described above is the same as a value obtained by performing reference polystyrene conversion of a value measured by GPC regarding polyester used for synthesis of the polyalkyleneimine derivative. Accordingly, the number average molecular weight acquired regarding polyester used for synthesis of the polyalkyleneimine derivative can be used as the number average molecular weight of the polyester chain included in the polyalkyleneimine derivative. For the measurement conditions of the number average molecular weight of the polyester chain, the measurement conditions of the number average molecular weight of polyester in a specific example which will be described later can be referred to.

Polyalkyleneimine Chain

Number Average Molecular Weight

The number average molecular weight of the polyalkyleneimine chain included in the polyalkyleneimine derivative is a value obtained by performing reference polystyrene conversion of a value measured by GPC, regarding polyalkyleneimine obtained by hydrolysis of a polyalkyleneimine derivative. The value acquired as described above is the same as a value obtained by performing reference polystyrene conversion of a value measured by GPC regarding polyalkyleneimine used for synthesis of the polyalkyleneimine derivative. Accordingly, the number average molecular weight acquired regarding polyalkyleneimine used for synthesis of the polyalkyleneimine derivative can be used as the number average molecular weight of the polyalkyleneimine chain included in the polyalkyleneimine derivative. For the measurement conditions of the number average molecular weight of the polyalkyleneimine chain, a specific example which will be described later can be referred to. In addition, the polyalkyleneimine is a polymer which can be obtained by ring-opening polymerization of alkyleneimine. In the polyalkyleneimine derivative, the term "polymer" is used to include a homopolymer including a repeating unit in the same structure and a copolymer including a repeating unit in two or more kinds of different structures.

The hydrolysis of the polyalkyleneimine derivative can be performed by various methods which are normally used as a hydrolysis method of ester. For details of such a method, description of a hydrolysis method disclosed in "The Fifth Series of Experimental Chemistry Vol. 14 Synthesis of Organic Compounds II—Alcohol •Amine" (Chemical Society of Japan, Maruzen Publication, issued August, 2005) pp. 95 to 98, and description of a hydrolysis method disclosed in "The Fifth Series of Experimental Chemistry Vol. 16 Synthesis of Organic Compounds IV—Carboxylic acid •Amino Acid •Peptide" (Chemical Society of Japan, Maruzen Publication, issued March, 2005) pp. 10 to 15 cam be referred to, for example.

The polyalkyleneimine is decomposed from the obtained hydrolyzate by well-known separating means such as liquid chromatography, and the number average molecular weight thereof can be acquired.

The number average molecular weight of the polyalkyleneimine chain included in the polyalkyleneimine derivative is in a range of 300 to 3,000. The inventors have surmised that when the number average molecular weight of the polyalkyleneimine chain is in the range described above, the polyalkyleneimine derivative can be effectively adsorbed to the surface of the hexagonal ferrite particles. The number average molecular weight of the polyalkyleneimine chain is preferably equal to or greater than 500, from a viewpoint of adsorption properties to the surface of the hexagonal ferrite particles. From the same viewpoint, the number average molecular weight is preferably equal to or smaller than 2,000.

Percentage of Polyalkyleneimine Chain Occupying Polyalkyleneimine Derivative

As described above, the inventors have considered that the polyalkyleneimine chain included in the polyalkyleneimine derivative can function as an adsorption part to the surface of the hexagonal ferrite particles. A percentage of the polyalkyleneimine chain occupying the polyalkyleneimine derivative (hereinafter, also referred to as a "polyalkyleneimine chain percentage") is preferably smaller than 5.0 mass %, from a viewpoint of increasing the dispersibility of the ferromagnetic hexagonal ferrite powder. From a viewpoint of improving the dispersibility of the ferromagnetic hexagonal ferrite powder, the polyalkyleneimine chain percentage is more preferably equal to or smaller than 4.9 mass %, even more preferably equal to or smaller than 4.8 mass %, further more preferably equal to or smaller than 4.5 mass %, still more preferably equal to or smaller than 4.0 mass %, and still even more preferably equal to or smaller than 3.0 mass %. In addition, from a viewpoint of improving the dispersibility of the ferromagnetic hexagonal ferrite powder, the polyalkyleneimine chain percentage is preferably equal to or greater than 0.2 mass %, more preferably equal to or greater than 0.3 mass %, and even more preferably equal to or greater than 0.5 mass %.

The percentage of the polyalkyleneimine chain described above can be controlled, for example, according to a mixing ratio of polyalkyleneimine and polyester used at the time of synthesis.

The percentage of the polyalkyleneimine chain occupying the polyalkyleneimine derivative can be calculated from an analysis result obtained by element analysis such as nuclear magnetic resonance (NMR), more specifically, $^1$H-NMR and $^{13}$C-NMR, and a well-known method. The value calculated as described is the same as a theoretical value acquired from a compounding ratio of a synthesis raw material in the polyalkyleneimine derivative, and thus, the theoretical value acquired from the compounding ratio can be used as the percentage of the polyalkyleneimine chain occupying the polyalkyleneimine derivative.

Structure of Polyalkyleneimine Chain

The polyalkyleneimine chain has a polymer structure including the same or two or more different alkyleneimine chains. As the alkyleneimine chain included, an alkyleneimine chain represented by the following Formula A and an alkyleneimine chain represented by Formula B can be used. In the alkyleneimine chains represented by the following Formulae, the alkyleneimine chain represented by Formula A can include a bonding site with a polyester chain. In addition, the alkyleneimine chain represented by Formula B can be bonded to a polyester chain by the salt crosslinking agent described above. The polyalkyleneimine derivative can have a structure in which one or more polyester chains are bonded to the polyalkyleneimine chain, by including one or more alkyleneimine chains. In addition, the polyalkyleneimine chain may be formed of only a linear structure or may have a branched tertiary amine structure. It is preferable that the polyalkyleneimine chain has a branched structure, from a viewpoint of further improving the dispersibility. As a component having a branched structure, a component bonded to an adjacent alkyleneimine chain at *$^1$ in the following Formula A and a component bonded to an adjacent alkyleneimine chain at *$^2$ in the following Formula B can be used.

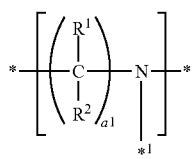

Formula A

In Formula A, $R^1$ and $R^2$ each independently represent a hydrogen atom or an alkyl group, a1 represents an integer equal to or greater than 2, and *$^1$ represents a bonding site with a polyester chain, an adjacent alkyleneimine chain, a hydrogen atom, or a substituent.

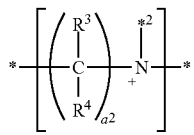

Formula B

In Formula B, $R^3$ and $R^4$ each independently represent a hydrogen atom or an alkyl group, and a2 represents an integer equal to or greater than 2. The alkyleneimine chain represented by Formula B is bonded to a polyester chain including an anionic group by forming a salt crosslinking group by $N^+$ in Formula B and an anionic group included in the polyester chain.

* in Formula A and Formula B and *$^2$ in Formula B each independently represent a site to be bonded to an adjacent alkyleneimine chain, a hydrogen atom, or a substituent.

Hereinafter, Formula A and Formula B will be further described in detail.

$R^1$ and $R^2$ in Formula A and $R^3$ and $R^4$ in Formula B each independently represent a hydrogen atom or an alkyl group. As the alkyl group, for example, an alkyl group having 1 to 6 carbon atoms can be used, and the alkyl group is preferably an alkyl group having 1 to 3 carbon atoms, more preferably a methyl group or an ethyl group, and even more preferably a methyl group. As an aspect of a combination of $R^1$ and $R^2$ in Formula A, an aspect in which one is a hydrogen atom and the other is an alkyl group, an aspect in which both of them are hydrogen atoms, and an aspect in which both of them are alkyl groups (alkyl groups which are the same as each other or different from each other) are used, and the aspect in which both of them are hydrogen atoms is preferably used. The point described above is also applied to $R^3$ and $R^4$ in Formula B in the same manner.

Ethyleneimine has a structure having the minimum number of carbon atoms configuring a ring as alkyleneimine, and the number of carbons of a main chain of the alkyleneimine chain (ethyleneimine chain) obtained by ring opening of ethyleneimine is 2. Accordingly, the lower limit of a1 in Formula A and a2 in Formula B is 2. That is, a1 in Formula A and a2 in Formula B each independently represent an integer equal to or greater than 2. a1 in Formula A and a2 in Formula B are each independently preferably equal to or smaller than 10, more preferably equal to or smaller than 6, even more preferably equal to or smaller than 4, still more preferably 2 or 3, and still even more preferably 2, from a viewpoint of adsorption properties to the surface of the particles of the ferromagnetic powder.

The details of the bonding between the alkyleneimine chain represented by Formula A or the alkyleneimine chain represented by Formula B and the polyester chain are as described above.

Each alkyleneimine chain is bonded to an adjacent alkyleneimine chain, a hydrogen atom, or a substituent, at a position represented by * in each Formula. As the substituent, for example, a monovalent substituent such as an alkyl group (for example, an alkyl group having 1 to 6 carbon atoms) can be used, but there is no limitation. In addition, the polyester chain may be bonded as the substituent.

Weight-Average Molecular Weight of Polyalkyleneimine Derivative

A molecular weight of the polyalkyleneimine derivative is preferably 1,000 to 80,000 as the weight-average molecular weight as described above. The weight-average molecular weight of the polyalkyleneimine derivative is more preferably equal to or greater than 1,500, even more preferably equal to or greater than 2,000, and further more preferably equal to or greater than 3,000. In addition, the weight-average molecular weight of the polyalkyleneimine derivative is more preferably equal to or smaller than 60,000, even more preferably equal to or smaller than 40,000, and further more preferably equal to or smaller than 35,000, and still more preferably equal to or smaller than 34,000. For measurement conditions of the weight-average molecular weight of the polyalkyleneimine derivative, a specific example which will be described later can be referred to.

Synthesis Method

The synthesis method is not particularly limited, as long as the polyalkyleneimine derivative includes the polyester chain and the polyalkyleneimine chain having a number average molecular weight of 300 to 3,000 at the ratio described above. As a preferred aspect of the synthesis method, descriptions disclosed in paragraphs 0061 to 0069 of JP2015-28830A can be referred to.

As a specific example of the polyalkyleneimine derivative, various polyalkyleneimine derivatives shown in Table 2 synthesized by using polyethyleneimine and polyester shown in Table 2 can be used. For the details of the synthesis reaction, descriptions disclosed in examples which will be described later and/or examples of JP2015-28830A can be referred to.

TABLE 2

| Polyalkyleneimine (polyethyleneimine) derivative | Polyethyleneimine* | Polyethyleneimine amount (g) | Percentage of Polyalkyleneimine chain (polyethyleneimine chain) (mass %) | Polyester | Acid value (mgKOH/g) | Amine value (mgKOH/g) | Weight-average molecular weight |
|---|---|---|---|---|---|---|---|
| (J-1) | SP-018 | 5 | 4.8 | (i-1) | 22.2 | 28.6 | 15,000 |
| (J-2) | SP-006 | 2.4 | 2.3 | (i-2) | 35 | 17.4 | 7,000 |
| (J-3) | SP-012 | 4.5 | 4.3 | (i-3) | 6.5 | 21.2 | 22,000 |
| (J-4) | SP-006 | 5 | 4.8 | (i-4) | 4.9 | 11.8 | 34,000 |
| (J-5) | SP-003 | 5 | 4.8 | (i-5) | 10.1 | 15.2 | 19,000 |
| (J-6) | SP-018 | 1.2 | 1.2 | (i-6) | 68.5 | 22.4 | 8,000 |
| (J-7) | SP-018 | 3 | 2.9 | (i-7) | 39.9 | 16.8 | 13,000 |
| (J-8) | SP-012 | 2.5 | 2.4 | (i-8) | 15.5 | 18.9 | 18,000 |
| (J-9) | SP-006 | 5 | 4.8 | (i-9) | 11.1 | 16.8 | 22,000 |
| (J-10) | SP-003 | 4 | 3.8 | (i-10) | 4.4 | 14.1 | 24,000 |
| (J-11) | SP-012 | 0.3 | 0.3 | (i-10) | 8.1 | 7.8 | 28,000 |
| (J-12) | SP-018 | 1 | 1 | (i-1) | 28.8 | 6.7 | 15,000 |
| (J-13) | SP-012 | 5 | 4.8 | (i-6) | 61 | 28.2 | 4,000 |
| (J-14) | SP-006 | 2.4 | 2.3 | (i-11) | 30 | 17.4 | 6,000 |
| (J-15) | SP-006 | 2.4 | 2.3 | (i-12) | 42.8 | 18.1 | 6,300 |
| (J-16) | SP-006 | 2.4 | 2.3 | (i-13) | 43.7 | 17.9 | 5,900 |
| (J-17) | SP-006 | 2.4 | 2.3 | (i-14) | 42.5 | 17.1 | 5,300 |
| (J-18) | SP-006 | 2.3 | 2.4 | (i-15) | 37.5 | 19.4 | 7,300 |
| (J-19) | SP-006 | 2.3 | 2.4 | (i-16) | 24.6 | 16 | 9,800 |
| (J-20) | SP-006 | 2.3 | 2.4 | (i-17) | 27.5 | 26.1 | 9,300 |
| (J-21) | SP-006 | 2.3 | 2.4 | (i-18) | 31.7 | 8.9 | 8,900 |
| (J-22) | SP-006 | 2.3 | 2.4 | (i-19) | 15.3 | 13.9 | 15,100 |
| (J-23) | SP-006 | 2.3 | 2.4 | (i-20) | 38.1 | 22.4 | 7,580 |

(*Note) Polyethyleneimine shown in Table 2 is as described below.
SP-003 (Polyethyleneimine (manufactured by Nippon Shokubai Co., Ltd.) number average molecular weight of 300)
SP-006 (Polyethyleneimine (manufactured by Nippon Shokubai Co., Ltd.) number average molecular weight of 600)
SP-012 (Polyethyleneimine (manufactured by Nippon Shokubai Co., Ltd.) number average molecular weight of 1,200)
SP-018 (Polyethyleneimine (manufactured by Nippon Shokubai Co., Ltd.) number average molecular weight of 1,800)

The polyester shown in Table 2 is polyester synthesized by the ring-opening polymerization of lactone by using lactone and a nucleophilic reagent (carboxylic acid) shown in Table 3. For the details of the synthesis reaction, descriptions disclosed in examples which will be described later and/or examples of JP2015-28830A can be referred to.

The acid value and amine value described above are determined by a potentiometric method (solvent: tetrahydrofuran/water=100/10 (volume ratio), titrant: 0.01 N (0.01 mol/l), sodium hydroxide aqueous solution (acid value), 0.01 N (0.01 mol/l) hydrochloric acid (amine value)).

The average molecular weight (number average molecular weight and weight-average molecular weight) is acquired

TABLE 3

| Polyester | Carboxylic acid | Amount of carboxylic acid (g) | Lactone | Weight-average molecular weight | Number average molecular weight | Number of lactone repeating units |
|---|---|---|---|---|---|---|
| (i-1) | n-octanoic acid | 12.6 | ε-caprolactone | 9,000 | 7,500 | 20 |
| (i-2) | n-octanoic acid | 16.8 | ε-caprolactone | 7,000 | 5,800 | 15 |
| (i-3) | n-octanoic acid | 3.3 | L-lactide | 22,000 | 18,000 | 60 |
| (i-4) | Palmitic acid | 4.5 | ε-caprolactone | 38,000 | 31,000 | 100 |
| (i-5) | Palmitic acid | 12.8 | δ-valerolactone | 16,000 | 13,000 | 40 |
| (i-6) | Stearic acid | 99.7 | ε-caprolactone | 2,500 | 2,000 | 5 |
| (i-7) | Glycol acid | 13.3 | ε-caprolactone | 4,800 | 4,000 | 10 |
| (i-8) | 12-hydroxystearic acid | 20 | δ-valerolactone | 13,000 | 10,000 | 30 |
| (i-9) | 12-hydroxystearic acid | 13.2 | ε-caprolactone | 17,000 | 14,000 | 40 |
| (i-10) | 2-naphthoic acid | 3.8 | ε-caprolactone | 27,000 | 22,500 | 80 |
| (i-11) | [2-(2-methoxyethoxy)ethoxy] acetic acid | 15.6 | ε-caprolactone | 8,700 | 6,300 | 15 |
| (i-12) | n-octanoic acid | 16.8 | Lactide | 8,100 | 4,100 | 15 |
| (i-13) | n-octanoic acid | 17.31 | L-lactide ε-caprolactone | 6,900 | 3,500 | 10 (L-lactide derived) 5 (ε-caprolactone derived) |
| (i-14) | n-octanoic acid | 17.31 | L-lactide ε-caprolactone | 6,200 | 3,200 | 5 (L-lactide derived) 10 (ε-caprolactone derived) |
| (i-15) | Nonafluorovaleric acid | 30.8 | ε-caprolactone | 9,000 | 7,500 | 15 |
| (i-16) | Heptadecafluorononanoic acid | 54.2 | ε-caprolactone | 8,000 | 5,000 | 15 |
| (i-17) | 3,5,5-trimethylhexanoic acid | 18.5 | ε-caprolactone | 10,000 | 5,800 | 15 |
| (i-18) | 4-oxovaleric acid | 13.6 | ε-caprolactone | 7,400 | 4,100 | 15 |
| (i-19) | [2-(2-methoxyethoxy)ethoxy] acetic acid | 20.8 | ε-caprolactone | 15,300 | 11,500 | 30 |
| (i-20) | Benzoic acid | 14.3 | ε-caprolactone | 7,000 | 3,000 | 15 | by performing reference polystyrene conversion of a value measured by GPC.

Specific examples of the measurement conditions of the average molecular weights of polyester, polyalkyleneimine, and a polyalkyleneimine derivative are respectively as described below.

Measurement Conditions of Average Molecular Weight of Polyester

Measurement device: HLC-8220 GPC (manufactured by Tosoh Corporation)

Column: TSK gel Super HZ2000/TSK gel Super HZ 4000/TSK gel Super HZ-H (manufactured by Tosoh Corporation)

Eluent: Tetrahydrofuran (THF)

Flow rate: 0.35 mL/min

Column temperature: 40° C.

Detector: differential refractometry (RI) detector

Measurement Conditions of Average Molecular Weight of Polyalkyleneimine and Average Molecular Weight of Polyalkyleneimine Derivative Measurement device: HLC-8320 GPC (manufactured by Tosoh Corporation)

Column: three TSK gel Super AWM-H (manufactured by Tosoh Corporation)

Eluent: N-methyl-2-pyrrolidone (10 mmol/l of lithium bromide is added as an additive)

Flow rate: 0.35 mL/min

Column temperature: 40° C.

Detector: differential refractometry (RI) detector

The dispersing agent described above is mixed with ferromagnetic hexagonal ferrite powder having an activation volume equal to or smaller than 1,600 nm$^3$, a binder, and a solvent, and thus, the magnetic layer forming composition can be prepared. In addition, the magnetic layer of the magnetic tape can include the dispersing agent, together with the ferromagnetic hexagonal ferrite powder having an activation volume equal to or smaller than 1,600 nm$^3$ and the binder. The dispersing agent may be used alone or in combination of two or more kinds having different structures. In a case of using two more kinds thereof in combination, the content thereof means the total content of the compounds used in combination. The point described above is also applied to the content of various components disclosed in the specification.

The content of the dispersing agent is preferably 0.5 to 25.0 parts by mass with respect to 100.0 parts by mass of the ferromagnetic hexagonal ferrite powder. The content of the dispersing agent is preferably equal to or greater than 0.5 parts by mass, more preferably equal to or greater than 1.0 part by mass, even more preferably equal to or greater than 5.0 parts by mass, and still more preferably equal to or greater than 10.0 parts by mass, with respect to 100.0 parts by mass of the ferromagnetic hexagonal ferrite powder, from viewpoints of improving the dispersibility of the ferromagnetic hexagonal ferrite powder and the durability of the magnetic layer. Meanwhile, it is preferable to increase the filling percentage of the ferromagnetic hexagonal ferrite powder of the magnetic layer, in order to improve recording density. From this point, it is preferable that the content of the components other than the ferromagnetic hexagonal ferrite powder is relatively low. From the viewpoints described above, the content of the dispersing agent is preferably equal to or smaller than 25.0 parts by mass, more preferably equal to or smaller than 20.0 parts by mass, even more preferably equal to or smaller than 18.0 parts by mass, and still more preferably equal to or smaller than 15.0 parts by mass with respect to 100.0 parts by mass of the ferromagnetic hexagonal ferrite powder.

Hereinabove, the preferred method for setting the cos θ to be 0.85 to 1.00 has been described. Here, setting the cos θ to be 0.85 to 1.00 is an example of preferred means for setting the difference ($l_{99.9}-l_{0.1}$) to be equal to or smaller than 180 nm. A magnetic tape in which the cos θ is smaller than 0.85 is included in the magnetic tape according to one aspect of the invention, as long as it is a magnetic tape including a magnetic layer including ferromagnetic hexagonal ferrite powder having an activation volume equal to or smaller than 1,600 nm$^3$ and a binder on a non-magnetic support, in which the magnetic layer includes a timing-based servo pattern, and the difference ($l_{99.9}-l_{0.1}$) is equal to or smaller than 180 nm.

Hereinafter, the magnetic tape will be further described in detail.

Magnetic Layer

Ferromagnetic Powder

The magnetic layer includes ferromagnetic powder and a binder. The ferromagnetic powder is ferromagnetic hexagonal ferrite powder having an activation volume equal to or smaller than 1,600 nm$^3$. The details of the activation volume of the ferromagnetic hexagonal ferrite powder are as described above. A percentage of the hexagonal ferrite particles having the aspect ratio and the length in the long axis direction described above in all of the hexagonal ferrite particles observed in the STEM image, can be, for example, equal to or greater than 50%, as a percentage with respect to all of the hexagonal ferrite particles observed in the STEM image, based on the particle number. In addition, the percentage can be, for example, equal to or smaller than 95% and can exceed 95%. For other details of ferromagnetic hexagonal ferrite powder, for example, descriptions disclosed in paragraphs 0012 to 0030 of JP2011-225417A, paragraphs 0134 to 0136 of JP2011-216149A, and paragraphs 0013 to 0030 of JP2012-204726A can be referred to.

The content (filling percentage) of the ferromagnetic hexagonal ferrite powder of the magnetic layer is preferably in a range of 50 to 90 mass % and more preferably in a range of 60 to 90 mass %. The component other than the ferromagnetic hexagonal ferrite powder of the magnetic layer is at least a binder and arbitrarily one or more kinds of additives can be included. The high filling percentage of the ferromagnetic hexagonal ferrite powder of the magnetic layer is preferable, from a viewpoint of improving recording density.

Binder

The magnetic tape includes the ferromagnetic hexagonal ferrite powder and the binder in the magnetic layer. The binder is one or more kinds of resin. As the binder, a resin from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be a homopolymer or a copolymer. These resins can be used as the binder even in the non-magnetic layer and/or a back coating layer which will be described later. For the binder described above, description disclosed in paragraphs 0028 to 0031 of JP2010-24113A can be referred to. In addition, the binder may be a radiation curable resin such as an electron beam-curable resin. For the radiation curable resin, descriptions disclosed in paragraphs 0044 and 0045 of JP2011-48878A can be referred to.

In addition, a curable agent can be used together with a resin which can be used as the binder. The curable agent is a compound including at least one and preferably two or more cross-linking functional groups in one molecule. As the curable agent, polyisocyanate is suitable. For the details of polyisocyanate, descriptions disclosed in paragraphs 0124 and 0125 of JP2011-216149A can be referred to. The amount of the curable agent used can be, for example, 0 to 80.0 parts by mass with respect to 100.0 parts by mass of the binder, and is preferably 50.0 to 80.0 parts by mass, from a viewpoint of improvement of strength of each layer such as the magnetic layer.

Additive

The magnetic layer includes the ferromagnetic powder and the binder, and may include one or more kinds of additives, if necessary. As the additives, the dispersing agent and the curable agent described above are used, for example. At least a part of the curable agent is included in the magnetic layer in a state of being reacted (crosslinked) with other components such as the binder, by proceeding the curing reaction in the magnetic layer forming step. In addition, examples of the additive which can be included in the magnetic layer include a non-magnetic filler, a lubricant, a dispersing agent, a dispersing assistant, an antibacterial agent, an antistatic agent, an antioxidant, and carbon black. The non-magnetic filler is identical to the non-magnetic powder. As the non-magnetic filler, a non-magnetic filler (hereinafter, referred to as a "projection formation agent") which can function as a projection formation agent which forms projections suitably protruded from the surface of the magnetic layer, and a non-magnetic filler (hereinafter, referred to as an "abrasive") which can function as an abrasive can be used. The projection formation agent is a component which can contribute to the control of friction properties of the surface of the magnetic layer. It is preferable that at least one of the projection formation agent and the abrasive is included in the magnetic layer of the magnetic tape, and it is preferable that both of them are included. As the additives, a suitable amount of a commercially available product or an additive prepared by a well-known method can be used according to desired properties.

Non-Magnetic Layer

Next, the non-magnetic layer will be described. The magnetic tape may directly include a magnetic layer on a non-magnetic support, or may include a non-magnetic layer including non-magnetic powder and a binder between the non-magnetic support and the magnetic layer. The non-magnetic powder used in the non-magnetic layer may be inorganic substances or organic substances. In addition, carbon black and the like can be used. Examples of the inorganic substances include metal, metal oxide, metal carbonate, metal sulfate, metal nitride, metal carbide, and metal sulfide. The non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113 can be referred to. The content (filling percentage) of the non-magnetic powder of the non-magnetic layer is preferably in a range of 50 to 90 mass % and more preferably in a range of 60 to 90 mass %.

In regards to other details of a binder or additives of the non-magnetic layer, the well-known technology regarding the non-magnetic layer can be applied. In addition, in regards to the type and the content of the binder, and the type and the content of the additive, for example, the well-known technology regarding the magnetic layer can be applied.

The non-magnetic layer of the invention and the specification also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

Back Coating Layer

The magnetic tape can also include a back coating layer including non-magnetic powder and a binder on a side of the non-magnetic support opposite to the side including the magnetic layer. The back coating layer preferably includes any one or both of carbon black and inorganic powder. In regards to the binder included in the back coating layer and various additives which can be arbitrarily included in the back coating layer, a well-known technology regarding the treatment of the magnetic layer and/or the non-magnetic layer can be applied.

Non-Magnetic Support

Next, the non-magnetic support (hereinafter, also simply referred to as a "support") will be described. As the non-magnetic support, well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heating treatment may be performed with respect to these supports in advance.

Thicknesses of Non-Magnetic Support and Each Layer

A thickness of the non-magnetic support is preferably 3.0 to 20.0 μm, more preferably 3.0 to 10.0 μm, and even more preferably 3.0 to 6.0 μm.

A thickness of the magnetic layer is preferably equal to or smaller than 100 nm, from a viewpoint of high-density recording which is required in recent years. The thickness of the magnetic layer is more preferably in a range of 10 nm to 100 nm and even more preferably in a range of 20 to 90 nm. The magnetic layer may be at least single layer, the magnetic layer may be separated into two or more layers having different magnetic properties, and a configuration of a well-known multilayered magnetic layer can be applied. A thickness of the magnetic layer in a case where the magnetic layer is separated into two or more layers is the total thickness of the layers.

A thickness of the non-magnetic layer is, for example, 0.1 to 1.5 μm and is preferably 0.1 to 1.0 μm.

A thickness of the back coating layer is preferably equal to or smaller than 0.9 μm and even more preferably 0.1 to 0.7 μm.

The thicknesses of various layers of the magnetic tape and the non-magnetic support can be acquired by a well-known film thickness measurement method. As an example, a cross section of the magnetic tape in a thickness direction is, for example, exposed by a well-known method of ion beams or microtome, and the exposed cross section is observed with a scan electron microscope. In the cross section observation, various thicknesses can be acquired as a thickness acquired at one position of the cross section in the thickness direction, or an arithmetical mean of thicknesses acquired at a plurality of positions of two or more positions, for example, two positions which are arbitrarily extracted. In addition, the thickness of each layer may be acquired as a designed thickness calculated according to the manufacturing conditions.

Measurement Method

Manufacturing of Magnetic Tape in which Servo Pattern is Formed

Each composition for forming the magnetic layer, the non-magnetic layer, or the back coating layer normally includes a solvent, together with various components described above. As the solvent, various organic solvents generally used for manufacturing a coating type magnetic tape can be used. The steps of preparing a composition for forming each layer generally include at least a kneading step, a dispersing step, and a mixing step provided before and after these steps, if necessary. Each step may be divided into two or more stages. All of raw materials used in the invention may be added at an initial stage or in a middle stage of each step. In addition, each raw material may be separately added in two or more steps. In the preparation of the magnetic layer forming composition, it is preferable that the abrasive and the ferromagnetic powder are separately dispersed as described above. In order to manufacture the magnetic tape, a well-known manufacturing technology can be used. In the kneading step, an open kneader, a continuous kneader, a pressure kneader, or a kneader having a strong kneading force such as an extruder is preferably used. The details of the kneading processes of these kneaders are disclosed in JP1989-106338A (JP-H01-106338A) and JP1989-79274A (JP-H01-79274A). In addition, in order to disperse each layer forming composition, glass beads and one or more kinds of other dispersion beads can be used as the dispersion medium. As such dispersion beads, zirconia beads, titania beads, and steel beads which are dispersion beads having high specific gravity are preferable. These dispersion beads can be used by optimizing a particle diameter (bead diameter) and a filling percentage. As a dispersing machine, a well-known dispersing machine can be used. As one of means for obtaining a magnetic tape having cos θ of 0.85 to 1.00, a technology of reinforcing the dispersion conditions (for example, increasing the dispersion time, decreasing the diameter of the dispersion beads used for dispersion and/or increasing the filling percentage of the dispersion beads, using the dispersing agent, and the like) is also preferable. A preferred aspect regarding the reinforcing of the dispersion conditions is as described above. For other details of the manufacturing method of the magnetic tape, for example, descriptions disclosed in paragraphs 0051 to 0057 of JP2010-24113A can be referred to.

For the orientation process, a description disclosed in a paragraph 0052 of JP2010-24113A can be referred to. As one of means for obtaining a magnetic tape having cos θ of 0.85 to 1.00, a vertical orientation process is preferably performed.

Formation of Servo Pattern

Figure 2:
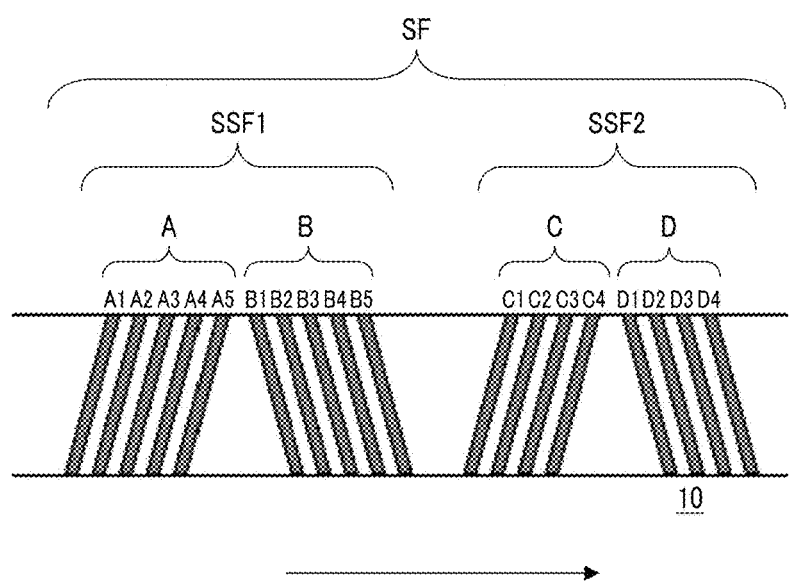
FIG. 2 shows a servo pattern disposition example of a LTO Ultrium format tape.
Figure 3:
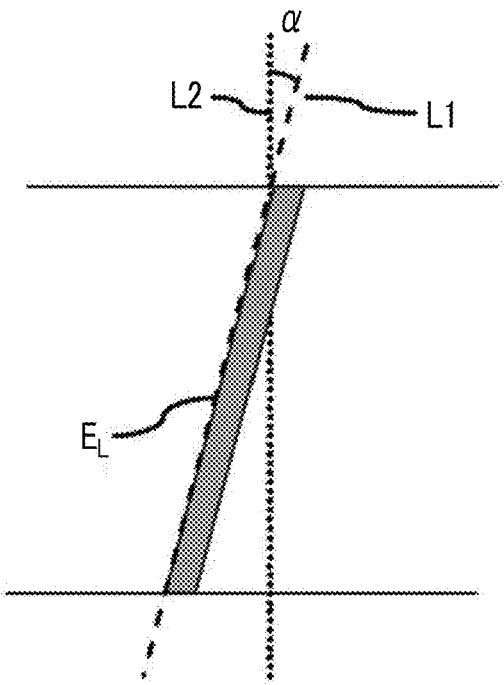
FIG. 3 is an explanatory diagram of an angle α regarding an edge shape of the servo pattern.
Figure 4:
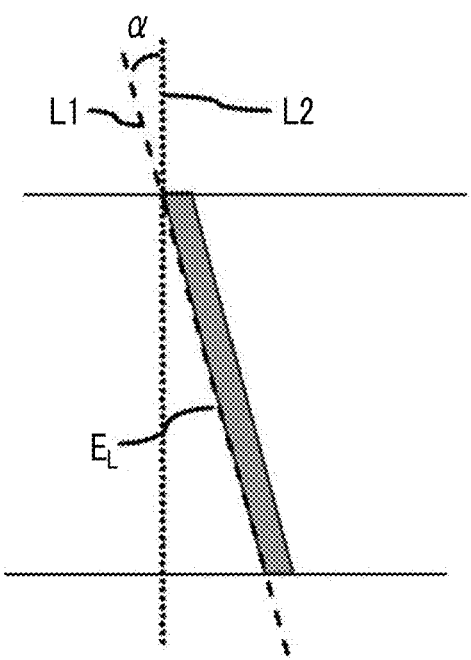
FIG. 4 is an explanatory diagram of another angle α regarding an edge shape of the servo pattern.
Figure 5:
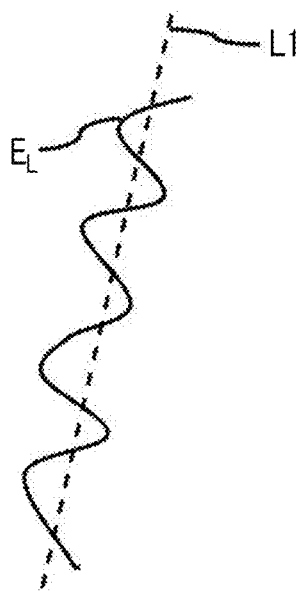
FIG. 5 shows an example of the edge shape of the servo pattern.
Figure 6:
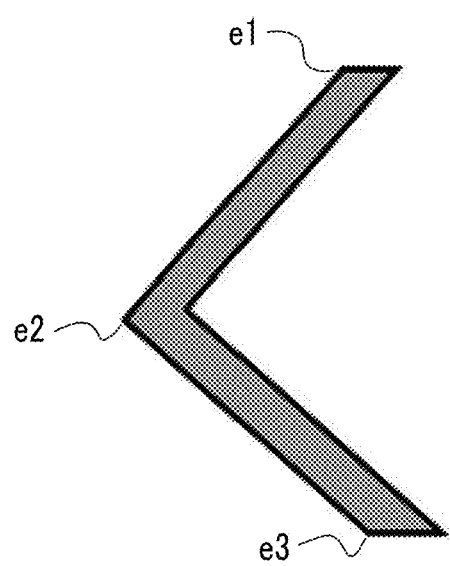
FIG. 6 shows an example of the servo pattern.
Figure 7:
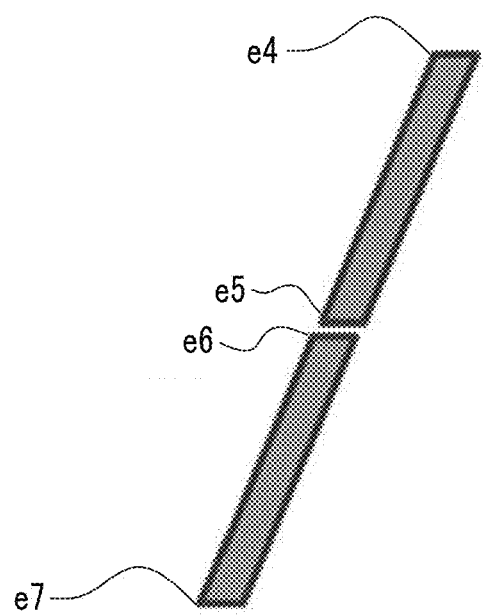
FIG. 7 shows another example of the servo pattern.
Figure 8:
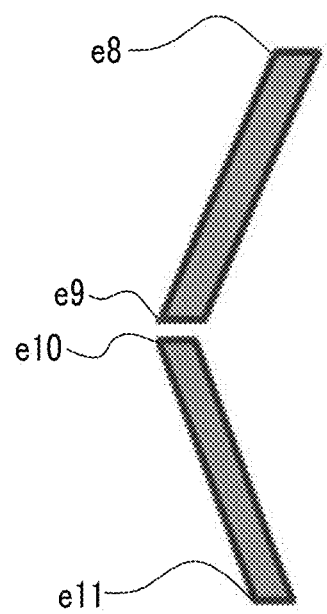
FIG. 8 shows still another example of the servo pattern.

The magnetic tape includes a timing-based servo pattern in the magnetic layer. FIG. 1 shows a disposition example of a region (servo band) in which the timing-based servo pattern is formed and a region (data band) interposed between two servo bands. FIG. 2 shows a disposition example of the timing-based servo patterns. Specific examples of the shapes of the timing-based servo patterns are shown in FIGS. 2 to 4 and FIGS. 6 to 8. Here, the disposition example and/or shape shown in each drawing is merely an example, and the servo pattern, the servo bands, and the data bands may be disposed as the shape and disposition according to a system of the magnetic tape device (drive). In addition, for the shape and the disposition of the timing-based servo pattern, a well-known technology such as disposition examples shown in FIG. 4, FIG. 5, FIG. 6, FIG. 9, FIG. 17, and FIG. 20 of U.S. Pat. No. 5,689,384A can be applied without any limitation, for example.

The servo pattern can be formed by magnetizing a specific region of the magnetic layer by a servo write head mounted on a servo writer. A region to be magnetized by the servo write head (position where the servo pattern is formed) is determined by standards. As the servo writer, a commercially available servo writer or a servo writer having a well-known configuration can be used. For the configuration of the servo writer, well-known technologies such as technologies disclosed in JP2011-175687A, U.S. Pat. Nos. 5,689,384A, and 6,542,325B can be referred to without any limitation.

The magnetic tape described above includes the magnetic layer including the ferromagnetic hexagonal ferrite powder having an activation volume of 1,600 nm$^3$, and it is possible to improve head positioning accuracy of the timing-based servo system.

Magnetic Tape Device

One aspect of the invention relates to a magnetic tape device including the magnetic tape, a magnetic head, and a servo head.

The details of the magnetic tape mounted on the magnetic tape device are as described above. Such a magnetic tape includes timing-based servo patterns. Accordingly, a magnetic signal is recorded on the data band by the magnetic head to form a data track, and/or, when reproducing the recorded signal, a head tracking of a timing-based servo type is performed based on the read servo pattern, while reading the servo pattern by the servo head, and accordingly, it is possible to cause the magnetic head to follow the data track with high accuracy. As an index of the head positioning accuracy, a position error signal (PES) acquired by a method shown in examples which will be described later can be used. The PES is an index showing that the magnetic head runs a position deviated from a position where the magnetic head should run, even when the head tracking is performed by the servo system, when the magnetic tape runs in the magnetic tape device. A high value means that the deviation becomes great and the head positioning accuracy of the servo system is low. In the magnetic tape according to one aspect of the invention, for example, the PES equal to or smaller than 9.0 nm (for example, range of 7.0 to 9.0 nm) can be achieved.

As the magnetic head mounted on the magnetic tape device, a well-known magnetic head which can perform the recording and/or reproducing of the magnetic signal with respect to the magnetic tape can be used. A recording head and a reproduction head may be one magnetic head or may be separated magnetic heads. As the servo head, a well-known servo head which can read the timing-based servo pattern of the magnetic tape can be used. At least one or two or more servo heads may be included in the magnetic tape device.

For details of the head tracking of the timing-based servo system, for example, well-known technologies such as technologies disclosed in U.S. Pat. Nos. 5,689,384A, 6,542, 325B, and 7,876,521B can be used without any limitation.

A commercially available magnetic tape device generally includes a magnetic head and a servo head in accordance to a standard. In addition, a commercially available magnetic tape device generally has a servo controlling mechanism for realizing head tracking of the timing-based servo system in accordance to a standard. The magnetic tape device according to one aspect of the invention can be configured by incorporating the magnetic tape according to one aspect of the invention to a commercially available magnetic tape device.

EXAMPLES

Hereinafter, the invention will be described with reference to examples. However, the invention is not limited to aspects shown in the examples. "Parts" and "%" in the following description mean "parts by mass" and "mass %", unless otherwise noted.

An average particle size described below is a value measured by a method disclosed in paragraphs 0058 to 0061 of JP2016-071926A. The measurement was performed by using transmission electron microscope H-9000 manufactured by Hitachi, Ltd. as the transmission electron microscope, and image analysis software KS-400 manufactured by Carl Zeiss as the image analysis software.

Examples 1 to 7 and Comparative Examples 1 to 7

1. Preparation of Alumina Dispersion (Abrasive Liquid)

3.0 parts of 2,3-dihydroxynaphthalene (manufactured by Tokyo Chemical Industry Co., Ltd.), 31.3 parts of 32% solution (solvent is a mixed solvent of methyl ethyl ketone and toluene) of a polyester polyurethane resin having a $SO_3Na$ group as a polar group (UR-4800 manufactured by Toyobo Co., Ltd. (amount of a polar group: 80 meq/kg)), and 570.0 parts of a mixed liquid of methyl ethyl ketone and cyclohexanone at 1:1 (mass ratio) as a solvent were mixed with 100.0 parts of alumina powder (HIT-80 manufactured by Sumitomo Chemical Co., Ltd., Mohs hardness of 9) having an gelatinization ratio of approximately 65% and Brunauer-Emmett-Teller (BET) specific surface area of 20 $m^2/g$, and dispersed in the presence of zirconia beads by a paint shaker for 5 hours. After the dispersion, the dispersion liquid and the beads were separated by a mesh and an alumina dispersion (abrasive liquid) was obtained.

2. Magnetic Layer Forming Composition List
Magnetic Solution
Ferromagnetic hexagonal ferrite powder (activation volume: see Table 4): 100.0 parts
  $SO_3Na$ group-containing polyurethane resin: 14.0 parts
  (Weight-average molecular weight: 70,000, $SO_3Na$ group: 0.2 meq/g)
  Dispersing agent: see Table 4
  Cyclohexanone: 150.0 parts
  Methyl ethyl ketone: 150.0 parts
  Abrasive liquid
  Alumina dispersion prepared in the section 1.: 6.0 parts
  Silica Sol (Projection Formation Agent Liquid)
  Colloidal silica (average particle size of 100 nm): 2.0 parts
  Methyl ethyl ketone: 1.4 parts
  Other Components
  Stearic acid: 2.0 parts
  Butyl stearate: 6.0 parts
  Polyisocyanate (CORONATE (registered trademark) manufactured by Nippon Polyurethane Industry): 2.5 parts
  Finishing Additive Solvent
  Cyclohexanone: 200.0 parts
  Methyl ethyl ketone: 200.0 parts
The synthesis method or the like of the dispersing agent shown in Table 4 will be described later in detail.

3. Non-Magnetic Layer Forming Composition List
Nonmagnetic inorganic powder: α-iron oxide: 100.0 parts
Average particle size (average long axis length): 0.15 μm
Average acicular ratio: 7
BET specific surface area: 52 $m^2/g$
Carbon black: 20.0 parts
Average particle size: 20 nm
$SO_3Na$ group-containing polyurethane resin: 18.0 parts
(Weight-average molecular weight: 70,000, $SO_3Na$ group: 0.2 meq/g)
Stearic acid: 1.0 part
Cyclohexanone: 300.0 parts
Methyl ethyl ketone: 300.0 parts 4. Back Coating Layer Forming Composition List
Nonmagnetic inorganic powder: α-iron oxide: 80.0 parts
Average particle size (average long axis length): 0.15 μm
Average acicular ratio: 7
BET specific surface area: 52 $m^2/g$
Carbon black: 20.0 parts
Average particle size: 20 nm
Vinyl chloride copolymer: 13.0 parts
Sulfonate group-containing polyurethane resin: 6.0 parts
Phenylphosphonic acid: 3.0 parts
Methyl ethyl ketone: 155.0 parts
Stearic acid: 3.0 parts
Butyl stearate: 3.0 parts
Polyisocyanate: 5.0 parts
Cyclohexanone: 355.0 parts 5. Preparation of Each Layer Forming Composition
(1) Preparation of Magnetic Layer Forming Composition
The magnetic layer forming composition was prepared by the following method.

A magnetic solution was prepared by performing beads dispersing of the magnetic solution components described above by using beads as the dispersion medium in a batch type vertical sand mill. Specifically, the dispersion process was performed for the dispersion retention time shown in Table 4 by using zirconia beads having a bead diameter shown in Table 4, as the beads dispersion of each stage (first stage and second stage, or first to third stages). In the beads stage, dispersion liquid obtained by using filter (average hole diameter of 5 μm) was filtered after completion of each stage. In the beads dispersion of each stage, the filling percentage of the dispersion medium was set to be approximately 50 to 80 volume %.

The magnetic solution obtained as described above was mixed with the abrasive liquid, silica sol, other components, and the finishing additive solvent and beads-dispersed for 5 minutes by using the sand mill, and ultrasonic dispersion was performed with a batch type ultrasonic device (20 kHz, 300 W) for 0.5 minutes. After that, the obtained mixed liquid was filtered by using a filter (average hole diameter of 0.5 μm), and the magnetic layer forming composition was prepared.

A circumferential speed of a tip of the sand mill at the time of beads dispersion was in a range of 7 to 15 m/sec.

(2) Preparation of Non-Magnetic Layer Forming Composition

The non-magnetic layer forming composition was prepared by the following method.

Each component excluding stearic acid, cyclohexanone, and methyl ethyl ketone was beads-dispersed by using batch type vertical sand mill (dispersion medium: zirconia beads (beads diameter: 0.1 mm), dispersion retention time: 24 hours) to obtain dispersion liquid. After that, the remaining components were added into the obtained dispersion liquid and stirred with a dissolver. Then, the obtained dispersion liquid was filtered by using the filter (average hole diameter of 0.5 μm), and a non-magnetic layer forming composition was prepared.

(3) Preparation of Back Coating Layer Forming Composition

The back coating layer forming composition was prepared by the following method.

Each component excluding stearic acid, butyl stearate, polyisocyanate, and cyclohexanone was kneaded and diluted by an open kneader. Then, the obtained mixed liquid was subjected to a dispersion process of 12 passes, with a transverse beads mill by using zirconia beads having a bead diameter of 1 mm, by setting a bead filling percentage as 80 volume %, a circumferential speed of rotor tip as 10 m/sec, and a retention time for 1 pass as 2 minutes. After that, the remaining components were added into the obtained dispersion liquid and stirred with a dissolver. Then, the obtained dispersion liquid was filtered with a filter (average hole diameter of 1 μm) and a back coating layer forming composition was prepared.

6. Manufacturing of Magnetic Tape and Formation of Timing-Based Servo Pattern

The non-magnetic layer forming composition prepared in the section 5.(2) was applied onto a surface of a support made of polyethylene naphthalate having a thickness of 5.0 μm so that the thickness after the drying becomes 0.1 μm and was dried to form a non-magnetic layer. Then, the magnetic layer forming composition prepared in the section 5.(1) was applied onto a non-magnetic layer so that the thickness after the drying becomes 70 nm. In examples and comparative examples in which "performed" was shown in the column of the vertical orientation process in Table 4, the vertical orientation process was performed by applying a magnetic field having a magnetic field strength of 0.3 T to the surface of the coating layer in a vertical direction, while the coated magnetic layer forming composition was dried, and then, the drying was performed, to form a magnetic layer. In comparative examples in which "not performed" was shown in the column of the vertical orientation process in Table 4, the coated magnetic layer forming composition was dried without performing the vertical orientation process, and a magnetic layer was formed.

After that, the back coating layer forming composition prepared in the section 5.(3) was applied to the surface of the support made of polyethylene naphthalate on a side opposite to the surface where the non-magnetic layer and the magnetic layer are formed, so that the thickness after the drying becomes 0.4 μm, and drying was performed to obtain a laminate.

Then, a surface smoothing treatment (calender process) was performed with respect to the obtained laminate with a calender configured of only a metal roll, at a calender process speed of 100 m/min, linear pressure of 294 kN/m (300 kg/cm), and a surface temperature of a calendering roll of 100°. After that, a heating process was performed in the environment of the atmosphere temperature of 70° C. for 36 hours. The laminate subjected to the heating process was cut to have a width of ½ inches (0.0127 meters) by using a slitter, and a magnetic tape was manufactured.

In a state where the magnetic layer of the manufactured magnetic tape was demagnetized, servo patterns having dispositions and shapes according to the LTO Ultrium format were formed on the magnetic layer by using a servo write head mounted on a servo writer. Accordingly, each magnetic tape of Examples and Comparative Examples including data bands, servo bands, and guide bands in the disposition according to the LTO Ultrium format in the magnetic layer, and including servo patterns having the disposition and the shape according to the LTO Ultrium format on the servo band was obtained.

It can be said that the servo write head used for forming the servo pattern has high capability of recording the servo pattern, as the value of leakage field is great. In Examples and Comparative Examples, two or more servo write heads having different leakage fields were used. The leakage fields are shown in Table 4.

7. Preparation of Dispersing Agent

Dispersing agents 1 to 4 shown in Table 4 were prepared by the following method. Hereinafter, a temperature shown regarding the synthesis reaction is a temperature of a reaction liquid.

In Comparative Example 7, 2,3-dihydroxynaphthalene was used instead of the dispersing agents 1 to 4. 2,3-dihydroxynaphthalene is a compound used as an additive for adjusting a squareness ratio in JP2012-203955A.

(1) Preparation of Dispersing Agent 1

Synthesis of Precursor 1

197.2 g of ε-caprolactone and 15.0 g of 2-ethyl-1-hexanol were introduced into a 500 mL three-neck flask and stirred and decomposed while blowing nitrogen. 0.1 g of monobutyltin oxide was added thereto and heated to 100° C. After 8 hours, the elimination of the raw material was confirmed by gas chromatography, the resultant material was cooled to room temperature, and 200 g of a solid precursor 1 (following structure) was obtained.

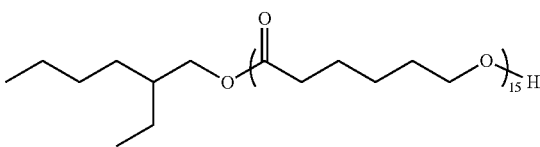

Synthesis of Dispersing Agent 1

40.0 g of the obtained precursor 1 was introduced into 200 mL three-neck flask, and stirred and decomposed at 80° C. while blowing nitrogen. 2.2 g of meso-butane-1,2,3,4-tetracarboxylic dianhydride was added thereto and heated to 110° C. After 5 hours, the elimination of a peak derived from the precursor 1 was confirmed by ¹H-NMR, and then, the resultant material was cooled to room temperature, and 38 g of a solid reaction product 1 (mixture of the following structural isomer) was obtained. The reaction product 1 obtained as described above is a mixture of the compound 1 shown in Table 1 and the structural isomer. The reaction product 1 is called a "dispersing agent 1".

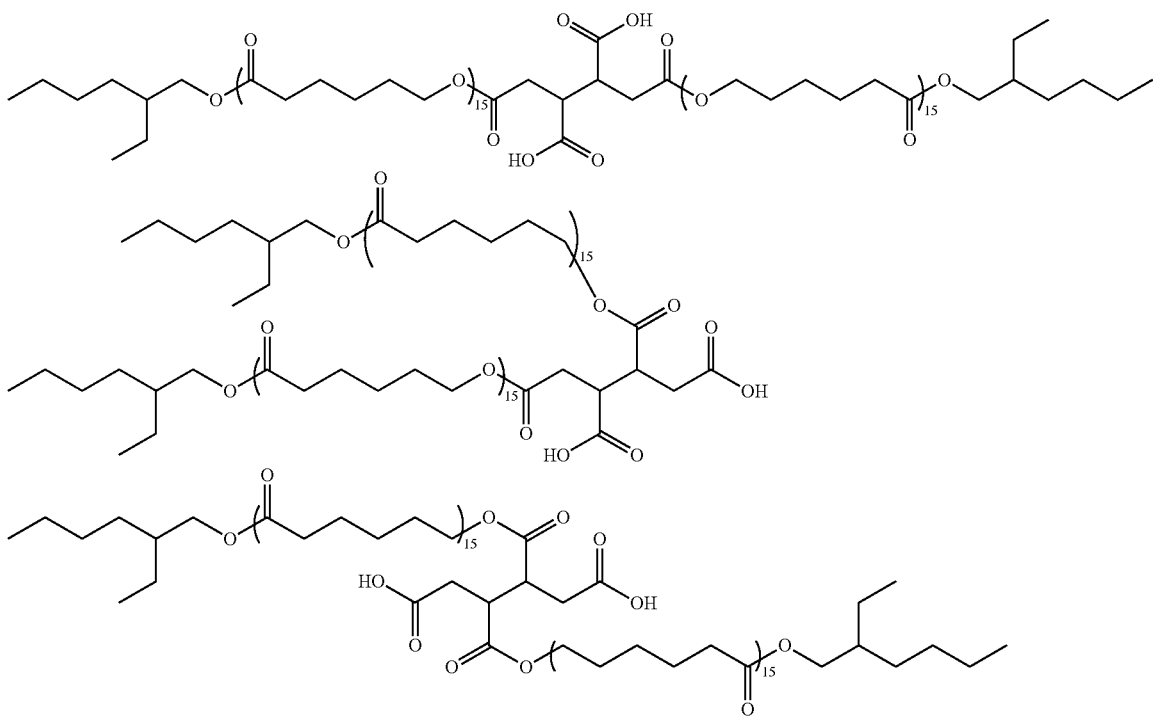

Dispersing Agent 1 (Reaction Product 1)

(2) Preparation of Dispersing Agent 2
Synthesis of Dispersing Agent 2

The synthesis was performed in the same manner as in the synthesis of the dispersing agent 1, except for changing 2.2 g of butanetetracarboxylic acid anhydride and 2.4 g of pyromellitic acid dianhydride, and 38 g of a solid reaction product 2 (mixture of the following structural isomer) was obtained. The reaction product 2 obtained as described above is a mixture of the compound 2 shown in Table 1 and the structural isomer. The reaction product 2 is called a "dispersing agent 2".

(3) Preparation of Dispersing Agent 3
Synthesis of Polyester (i-1)

12.6 g of n-octanoic acid (manufactured by Wako Pure Chemical Industries, Ltd.) as carboxylic acid, 100 g of ε-caprolactone (PLACCEL M manufactured by Daicel Corporation) as lactone, and 2.2 g of monobutyl tin oxide (manufactured by Wako Pure Chemical Industries, Ltd.) ($C_4H_9Sn(O)OH$) were mixed with each other in a 500 mL three-neck flask, and heated at 160° C. for 1 hour. 100 g of ε-caprolactone was added dropwise for 5 hours, and further stirred for 2 hours. After that, the cooling was performed to room temperature, and polyester (i-1) was obtained.

The synthesis scheme will be described below.

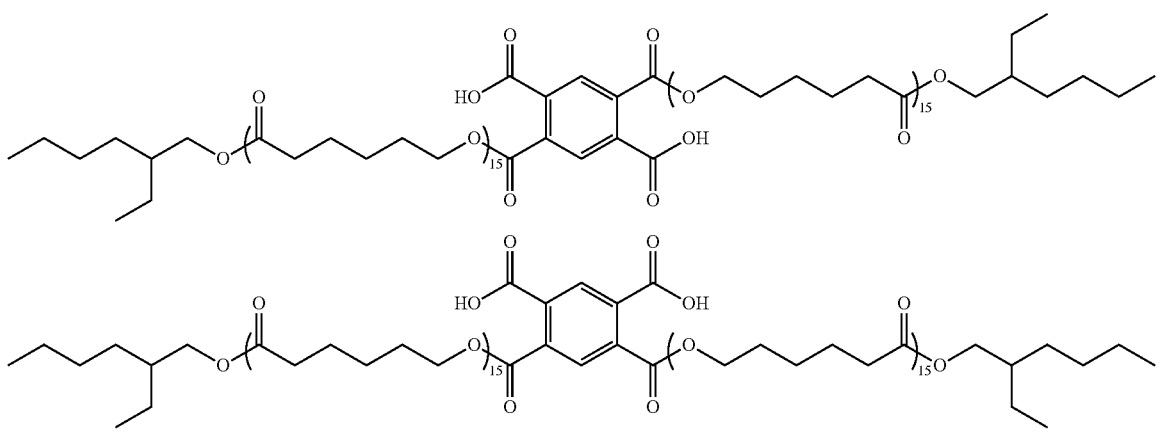

Dispersing Agent 2 (Reaction Product 2)

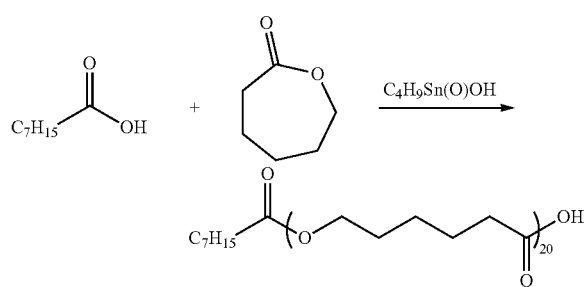

Synthesis of Dispersing Agent 3 (Polyethyleneimine Derivative (J-1))

5.0 g of polyethyleneimine (SP-018 manufactured by Nippon Shokubai Co., Ltd., number average molecular weight of 1,800) and 100 g of the obtained polyester (i-1) were mixed with each other and heated at 110° C. for 3 hours, to obtain a polyethyleneimine derivative (J-1). The polyethyleneimine derivative (J-1) is called a "dispersing agent 3".

The synthesis scheme is shown below. In the following synthesis scheme, a, b, c respectively represent a polymerization molar ratio of the repeating unit and is 0 to 50, and a relationship of a+b+c=100 is satisfied. l, m, n1, and n2 respectively represent a polymerization molar ratio of the repeating unit, l is 10 to 90, m is 0 to 80, n1 and n2 are 0 to 70, and a relationship of l+m+n1+n2=100 is satisfied.

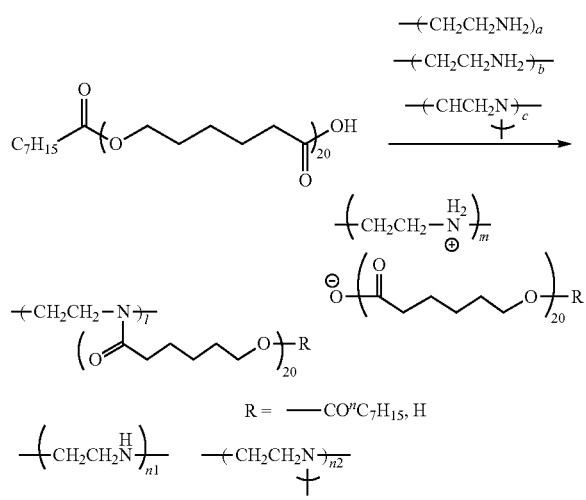

(4) Preparation of Dispersing Agent 4
Synthesis of Polyester (i-2)

Polyester (i-2) was obtained in the same manner as in the synthesis of the polyester (i-1), except for changing the amount of carboxylic acid shown in Table 3.

Synthesis of Dispersing Agent 4 (Polyethyleneimine Derivative (J-2))

A polyethyleneimine derivative (J-2) was obtained by performing the synthesis which is the same as that of the compound J-1, except for using polyethyleneimine shown in Table 2 and the obtained polyester (i-2). The polyethyleneimine derivative (J-2) is called a "dispersing agent 4".

The weight-average molecular weight of the dispersing agents 1 and 2 was measured by a method described above as the measurement method of the weight-average molecular weight of the compound represented by General Formula 1.

As a result of the measurement, the weight-average molecular weight of the dispersing agent 1 was 9,200 and the weight-average molecular weight of the dispersing agent 2 was 6,300.

The weight-average molecular weight of the dispersing agent 3 (polyethyleneimine derivative (J-1)) and the dispersing agent 4 (polyethyleneimine derivative (J-2)) was a value shown in Table 3, when the value was acquired by performing reference polystyrene conversion of a value measured by GPC under the measurement conditions of the specific example described above.

The weight-average molecular weight other than that described above is a value acquired by performing reference polystyrene conversion of a value measured by GPC under the following measurement conditions.

GPC device: HLC-8120 (manufactured by Tosoh Corporation)
Column: TSK gel Multipore HXL-M (manufactured by Tosoh Corporation, 7.8 mm (internal diameter)×30.0 cm)
Eluent: Tetrahydrofuran (THF)

8. Measurement of Activation Volume

The powder in a powder lot which is the same as that of ferromagnetic hexagonal barium ferrite powder used in the preparation of the magnetic layer forming composition was used as a measurement sample of the activation volume. The magnetic field sweep rates of the Hc measurement part at time points of 3 minutes and 30 minutes were measured by using an oscillation sample type magnetic-flux meter (manufactured by Toei Industry Co., Ltd.), and the activation volume was calculated from the relational expression described above. The measurement was performed in the environment of 23° C.±1° C. The calculated activation volume is shown in Table 4.

9. Measurement of cos θ

A cross section observation sample was cut out from each magnetic tape of Examples and Comparative Examples, and cos θ described above was acquired by using this sample by the method described above. In each magnetic tape of Examples and Comparative Examples, acquired cos θ is shown in Table 4. In each magnetic tape of Examples and Comparative Examples, a percentage of hexagonal ferrite particles having the aspect ratio and the length in the long axis direction of the ranges described above which is a measurement target of cos θ occupying all of the hexagonal ferrite particles observed in the STEM image, was approximately 80% to 95% based on the particle number.

The cross section observation sample used for the measurement of cos θ was manufactured by the following method.

(i) Manufacturing of Sample Including Protective Film

A sample including a protective film (laminated film of a carbon film and a platinum film) was manufactured by the following method.

A sample having a size of a width direction 10 mm×longitudinal direction 10 mm of the magnetic tape was cut out from the magnetic tape which is a target acquiring the cos θ, with a blade. The width direction of the sample described below is a direction which was a width direction of the magnetic tape before the cutting out. The same applies to the longitudinal direction.

A protective film was formed on the surface of the magnetic layer of the cut-out sample to obtain a sample including a protective film. The formation of the protective film was performed by the following method.

A carbon film (thickness of 80 nm) was formed on the surface of the magnetic layer of the sample by vapor deposition, and a platinum (Pt) film (thickness of 30 nm)

was formed on the surface of the formed carbon film by sputtering. The vapor deposition of the carbon film and the sputtering of the platinum film were respectively performed under the following conditions.

Vapor Deposition Conditions of Carbon Film
Deposition source: carbon (core of a mechanical pencil having a diameter of 0.5 mm)
Degree of vacuum in a chamber of a vapor deposition device: equal to or smaller than $2 \times 10^{-3}$ Pa
Current value: 16 A
Sputtering Conditions of Platinum Film
Target: Pt
Degree of vacuum in a chamber of a sputtering device: equal to or smaller than 7 Pa
Current value: 15 mA (ii) Manufacturing Cross Section Observation Sample A sample having a thin film shape was cut out from the sample including a protective film manufactured in the section (i), by FIB processing using a gallium ion (Ga$^+$) beam. The cutting out was performed by performing the following FIB processing two times. An acceleration voltage of the FIB processing was 30 kV.

In a first FIB processing, one end portion (that is, portion including one side surface of the sample including a protective film in the width direction) of the sample including a protective film on the longitudinal direction, including the area from the surface of the protective film to a region of a depth of approximately 5 μm was cut. The cut-out sample includes the area from the protective film to a part of the non-magnetic support.

Then, a microprobe was loaded on a cut-out surface side (that is, sample cross section side exposed by the cutting out) of the cut-out sample and the second FIB processing was performed. In the second FIB processing, the surface side opposite to the cut-out surface side (that is, one side surface in the width direction) was irradiated with a gallium ion beam to perform the cutting out of the sample. The sample was fixed by bonding the cut-out surface of the second FIB processing to the end surface of the mesh for STEM observation. After the fixation, the microprobe was removed.

In addition, the surface of the sample fixed to the mesh, from which the microprobe is removed, was irradiated with a gallium ion beam at the same acceleration voltage described above, to perform the FIB processing, and the sample fixed to the mesh was further thinned.

The cross section observation sample fixed to the mesh described as described above was observed by a scanning transmission electron microscope, and the cos θ was acquired by the method described above. The cos θ acquired as described above is shown in Table 4.

10. Evaluation of Squareness Ratio (SQ)

The squareness ratio of each magnetic tape manufactured was measured at a magnetic field strength of 1194 kA/m (15 kOe) by using a variation sample type fluxmeter. The measurement results are shown in Table 4.

11. Measurement and Calculation of Difference ($l_{99.9} - l_{0.1}$)

In each magnetic tape of Examples and Comparative Examples, the difference ($l_{99.9} - l_{0.1}$) was acquired by the following method.

The servo pattern (magnetized region) was extracted by performing the rough measurement regarding the measurement range of 90 μm×90 μm of the surface of the magnetic layer of the magnetic tape on which the servo pattern is formed, at a pitch of 100 nm, by using Dimension 3100 manufactured by Bruker in a frequency modulation mode as a magnetic force microscope, and by using SSS-MFMR (nominal radius of curvature of 15 nm) manufactured by Nanoworld. A distance between the surface of the magnetic layer and a tip of the probe at the time of the magnetic force microscope observation was equal to or smaller than 20 nm. The measurement range includes 5 servo patterns of the A burst formed according to the LTO Ultrium format, and thus, these 5 servo patterns were extracted.

A magnetic profile was obtained by performing the measurement regarding the vicinity of the boundary between the magnetized region and non-magnetized region of the edge of each servo pattern on a downstream side with respect to the running direction, at a pitch of 5 nm by using the magnetic force microscope and the probe. The obtained magnetic profile is tilted by an angle α=12°, and thus, rotation correction was performed so as to satisfy the angle α=0° by the analysis software.

The measurement was performed at three different portions on the surface of the magnetic layer. Each measurement range included 5 servo patterns of the A burst.

After that, the difference ($l_{99.9} - l_{0.1}$) was acquired by the method described above by using the analysis software. As the analysis software, MATLAB manufactured by MathWorks can be used. The difference ($l_{99.9} - l_{0.1}$) acquired as described above is shown in Table 4.

12. Measurement of PES

Regarding each magnetic tape of Examples and Comparative Examples, the servo pattern was read by a verify head on the servo writer using the formation of the servo pattern. The verify head is a reading magnetic head for confirming quality of the servo pattern formed in the magnetic tape, an element for reading is disposed at a position corresponding to the position of the servo pattern (position of the magnetic tape in the width direction), in the same manner as the magnetic head of the well-known magnetic tape device (drive).

A well-known PES operation circuit which calculates the head positioning accuracy of the servo system as PES from an electric signal obtained by reading the servo pattern by the verify head is connected to the verify head. The PES operation circuit calculates displacement of the input electric signal (pulse signal) in a width direction of the magnetic tape, and calculates a value obtained by applying a highpass filter (cut off value: 500 cycles/m) with respect to time variation information (signal) of this displacement, as PES. The calculated PES is shown in Table 4.

TABLE 4

| | Ferromagnetic hexagonal ferrite powder activation volume [nm³] | Type | Dispersing agent | Content [part] | Magnetic solution beads dispersion conditions | | | |
|---|---|---|---|---|---|---|---|---|
| | | | | | First stage | | Second stage | |
| | | | | | Dispersion retention time [h] | Beads diameter [mm] | Dispersion retention time [h] | Beads diameter [mm] |
| Comparative Example 1 | 2500 | — | — | — | 10 | 0.5 | — | — |

TABLE 4-continued

| | | | | | | | |
|---|---|---|---|---|---|---|---|
| Comparative Example 2 | 2000 | — | — | 10 | 0.5 | — | — |
| Comparative Example 3 | 1800 | — | — | 10 | 0.5 | — | — |
| Comparative Example 4 | 1600 | — | — | 10 | 0.5 | — | — |
| Comparative Example 5 | 1300 | — | — | 10 | 0.5 | — | — |
| Comparative Example 6 | 1600 | — | — | 10 | 0.5 | — | — |
| Comparative Example 7 | 1600 | 2,3-dihydroxynaphthalene | 12.0 | 10 | 0.5 | 10 | 0.1 |
| Example 1 | 1600 | Dispersion liquid 1 | 6.0 | 10 | 0.5 | 10 | 0.1 |
| Example 2 | 1600 | Dispersion liquid 1 | 12.0 | 10 | 0.5 | 30 | 0.1 |
| Example 3 | 1600 | Dispersion liquid 1 | 12.0 | 10 | 0.5 | 10 | 0.1 |
| Example 4 | 1600 | Dispersion liquid 2 | 6.0 | 10 | 0.5 | 10 | 0.1 |
| Example 5 | 1600 | Dispersion liquid 3 | 6.0 | 10 | 0.5 | 10 | 0.1 |
| Example 6 | 1600 | Dispersion liquid 4 | 6.0 | 10 | 0.5 | 10 | 0.1 |
| Example 7 | 1300 | Dispersion liquid 1 | 12.0 | 10 | 0.5 | 10 | 0.1 |

| | Magnetic solution beads dispersion conditions Third stage | | | Servo write | Evaluation result | | | |
|---|---|---|---|---|---|---|---|---|
| | Dispersion retention time [h] | Beads diameter [mm] | Vertical orientation process | head Leakage field [kA/m] | SQ [—] | Cos θ [—] | Servo pattern difference ($l_{99.9}-l_{0.1}$) [nm] | PES [nm] |
| Comparative Example 1 | — | — | Not performed | 247 | 0.58 | 0.68 | 158 | 8.5 |
| Comparative Example 2 | — | — | Not performed | 247 | 0.58 | 0.68 | 163 | 8.5 |
| Comparative Example 3 | — | — | Not performed | 247 | 0.55 | 0.68 | 162 | 8.6 |
| Comparative Example 4 | — | — | Not performed | 247 | 0.54 | 0.65 | 242 | 13.1 |
| Comparative Example 5 | — | — | Not performed | 247 | 0.54 | 0.65 | 288 | 14.5 |
| Comparative Example 6 | — | — | Not performed | 366 | 0.54 | 0.65 | 229 | 11.7 |
| Comparative Example 7 | — | — | Performed | 247 | 0.78 | 0.80 | 207 | 11.3 |
| Example 1 | — | — | Performed | 247 | 0.73 | 0.87 | 142 | 8.6 |
| Example 2 | — | — | Performed | 247 | 0.74 | 0.96 | 88 | 8.1 |
| Example 3 | 10 | 0.05 | Performed | 247 | 0.74 | 0.98 | 80 | 8.0 |
| Example 4 | — | — | Performed | 247 | 0.73 | 0.87 | 128 | 8.4 |
| Example 5 | — | — | Performed | 247 | 0.73 | 0.85 | 175 | 8.7 |
| Example 6 | — | — | Performed | 247 | 0.73 | 0.85 | 172 | 8.6 |
| Example 7 | 10 | 0.05 | Performed | 247 | 0.73 | 0.95 | 92 | 8.2 |

The PES acquired by the method described above which is equal to or smaller than 9.0 nm means that it is possible to position the recording head with a high accuracy by head tracking of the timing-based servo system.

When Comparative Examples 1 to 3 and Comparative Examples 4 to 7 are compared to each other, it can be confirmed that a phenomenon in which the PES greatly exceeds 9.0 nm, that is, a decrease in head positioning accuracy occurs in the magnetic tape (Comparative Examples 4 to 7) in which an activation volume of the ferromagnetic hexagonal ferrite powder included in the magnetic layer is equal to or smaller than 1,600 $nm^3$. In addition, it can be also confirmed that it is difficult to prevent a decrease in head positioning accuracy by improving recording performance of the servo write head (see Comparative Example 6).

With respect to this, in the magnetic tapes of Examples 1 to 7, although the difference ($l_{99.9}-l_{0.1}$) is equal to or smaller than 180 nm and the activation volume of the ferromagnetic hexagonal ferrite powder included in the magnetic layer is equal to or smaller than 1,600 $nm^3$, the PES can be equal to or smaller than 9.0 nm. That is, in the magnetic tape of Examples 1 to 7, it was possible to improve the head positioning accuracy of the timing-based servo system.

In addition, from the result shown in Table 4, it can be confirmed that the cos θ, the difference ($l_{99.9}-l_{0.1}$), and the PES satisfy an excellent correlation in which, when the cos θ increases, the difference ($l_{99.9}-l_{0.1}$) is decreased and the PES is decreased. With respect to this, such a correlation was not observed between the squareness (SQ), the difference ($l_{99.9}-l_{0.1}$), and the PES as shown in Table 4.

An aspect of the invention can be effective in technical fields of magnetic tapes for high-density recording.

What is claimed is:

1. A magnetic tape comprising:
   a non-magnetic support;
   a magnetic layer including ferromagnetic powder and a binder formed on the non-magnetic support,
   wherein the magnetic layer includes a timing-based servo pattern, and
   an edge shape of the timing-based servo pattern specified by a magnetic force microscope observation is a shape in which a difference, $l_{99.9}-l_{0.1}$, between a value $l_{99.9}$ of a cumulative frequency function of 99.9% of a position deviation width from an ideal shape in a longitudinal direction of the magnetic tape and a value $l_{0.1}$ of the cumulative frequency function of 0.1% is equal to or smaller than 180 nm.

2. The magnetic tape according to claim 1, wherein the timing-pattern servo pattern is a linear servo pattern which continuously or discontinuously extends from one side to the other side in the width direction of the magnetic tape.

3. The magnetic tape according to claim 2, wherein the timing-based servo pattern is a linear servo pattern which continuously extends from one side to the other side in a width direction of the magnetic tape and is tilted by an angle α with respect to the width direction, and has the ideal shape which is a linear shape extending in a direction of the angle α.

4. The magnetic tape according to claim 3, wherein the ferromagnetic powder is ferromagnetic hexagonal ferrite powder, and a tilt cos θ of the ferromagnetic hexagonal ferrite powder with respect to a surface of the magnetic layer acquired by cross section observation performed by using a scanning transmission electron microscope is 0.85 to 1.00.

5. The magnetic tape according to claim 4, wherein the cos θ is 0.89 to 1.00.

6. The magnetic tape according to claim 2, wherein the ferromagnetic powder is ferromagnetic hexagonal ferrite powder, and a tilt cos θ of the ferromagnetic hexagonal ferrite powder with respect to a surface of the magnetic layer acquired by cross section observation performed by using a scanning transmission electron microscope is 0.85 to 1.00.

7. The magnetic tape according to claim 6, wherein the cos θ is 0.89 to 1.00.

8. The magnetic tape according to claim 1, wherein the ferromagnetic powder is ferromagnetic hexagonal ferrite powder, and a tilt cos θ of the ferromagnetic hexagonal ferrite powder with respect to a surface of the magnetic layer acquired by cross section observation performed by using a scanning transmission electron microscope is 0.85 to 1.00.

9. The magnetic tape according to claim 8, wherein the cos θ is 0.89 to 1.00.

10. The magnetic tape according to claim 1, the magnetic layer further includes a polyester chain-containing compound having a weight-average molecular weight of 1,000 to 80,000.

11. The magnetic tape according to claim 1, wherein the difference, $l_{99.9}-l_{0.1}$, is equal to or smaller than 100 nm.

12. The magnetic tape according to claim 1, further comprising:
a non-magnetic layer including non-magnetic powder and a binder, between the non-magnetic support and the magnetic layer.

13. A magnetic tape device comprising:
a magnetic tape;
a magnetic head; and
a servo head, wherein
the magnetic tape is a magnetic tape comprising:
a non-magnetic support;
a magnetic layer including ferromagnetic powder and a binder formed on the non-magnetic support,
wherein the magnetic layer includes a timing-based servo pattern, and
an edge shape of the timing-based servo pattern specified by a magnetic force microscope observation is a shape in which a difference, $l_{99.9}-l_{0.1}$, between a value $l_{99.9}$ of a cumulative frequency function of 99.9% of a position deviation width from an ideal shape in a longitudinal direction of the magnetic tape and a value $l_{0.1}$ of the cumulative frequency function of 0.1% is equal to or smaller than 180 nm.

14. The magnetic tape device according to claim 13, wherein the timing-pattern servo pattern is a linear servo pattern which continuously or discontinuously extends from one side to the other side in the width direction of the magnetic tape.

15. The magnetic tape device according to claim 14, wherein the timing-based servo pattern is a linear servo pattern which continuously extends from one side to the other side in a width direction of the magnetic tape and is tilted by an angle α with respect to the width direction, and has the ideal shape which is a linear shape extending in a direction of the angle α.

16. The magnetic tape device according to claim 13, wherein the ferromagnetic powder is ferromagnetic hexagonal ferrite powder, and a tilt cos θ of the ferromagnetic hexagonal ferrite powder with respect to a surface of the magnetic layer acquired by cross section observation performed by using a scanning transmission electron microscope is 0.85 to 1.00.

17. The magnetic tape device according to claim 16, wherein the cos θ is 0.89 to 1.00.

* * * * *